US008199406B2

(12) United States Patent
Takenaka et al.

(10) Patent No.: US 8,199,406 B2
(45) Date of Patent: Jun. 12, 2012

(54) OPTICAL ELEMENT AND METHOD FOR MANUFACTURING THE SAME

(75) Inventors: Hiroya Takenaka, Miyagi (JP);
Tsutomu Nagahama, Miyagi (JP);
Masashi Enomoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/014,268

(22) Filed: Jan. 26, 2011

(65) Prior Publication Data
US 2011/0188125 A1    Aug. 4, 2011

(30) Foreign Application Priority Data

Jan. 29, 2010   (JP) ................................ P2010-019127

(51) Int. Cl.
G02B 27/14    (2006.01)
G02B 5/28    (2006.01)
(52) U.S. Cl. ........ 359/634; 359/530; 359/589; 359/599; 428/690; 349/113
(58) Field of Classification Search .................. 359/634, 359/601, 883, 359, 838, 529, 530, 589, 599, 359/360, 585; 349/96, 113; 430/321; 427/162
See application file for complete search history.

(56) References Cited

U.S. PATENT DOCUMENTS

| 4,816,714 | A | | 3/1989 | Walsh | |
|---|---|---|---|---|---|
| 5,711,824 | A | * | 1/1998 | Shinohara et al. | 136/259 |
| 5,891,264 | A | * | 4/1999 | Shinohara et al. | 136/261 |
| 6,285,426 | B1 | | 9/2001 | Akins et al. | |
| 7,088,404 | B2 | * | 8/2006 | Otake et al. | 349/113 |
| 7,368,863 | B2 | * | 5/2008 | Baba et al. | 313/112 |
| 7,506,987 | B2 | * | 3/2009 | Nilsen | 359/530 |
| 7,605,883 | B2 | * | 10/2009 | Yamaki et al. | 349/96 |
| 7,703,931 | B2 | * | 4/2010 | Nilsen | 359/530 |
| 7,758,973 | B2 | * | 7/2010 | Baba et al. | 428/690 |
| 7,894,019 | B2 | * | 2/2011 | Yamaki et al. | 349/96 |
| 7,982,380 | B2 | * | 7/2011 | Kamiyama et al. | 313/111 |
| 2005/0254130 | A1 | | 11/2005 | Graf et al. | |
| 2010/0020401 | A1 | | 1/2010 | Fujimoto et al. | |
| 2010/0277801 | A1 | * | 11/2010 | Nakajima | 359/530 |
| 2011/0310487 | A1 | * | 12/2011 | Nagahama et al. | 359/599 |

FOREIGN PATENT DOCUMENTS

| JP | 4066101 | | 1/2008 |
|---|---|---|---|
| WO | 9812581 | A1 | 3/1998 |
| WO | 0138906 | A2 | 5/2001 |
| WO | 2006051496 | A2 | 5/2006 |
| WO | 2006067573 | A1 | 6/2006 |

OTHER PUBLICATIONS

Search Report and Written Opinion dated Sep. 22, 2011, for corresponding Singapore Appln. No. 201100436-3.
EP Search Report for corresponding 11000449.6 dated Apr. 14, 2011; 5 pages.

* cited by examiner

*Primary Examiner* — Loha Ben
(74) *Attorney, Agent, or Firm* — K&L Gates LLP

(57) ABSTRACT

An optical element includes: a first optical layer having a concavo-convex surface; a wavelength-selective reflective layer provided on the concavo-convex surface of the first optical layer; a second optical layer provided on the concavo-convex surface on which the wavelength-selective reflective layer is provided so as to fill the concavo-convex surface, and in the optical element described above, the wavelength-selective reflective layer includes a metal layer, a protective layer provided on the metal layer and containing a metal oxide as a primary component, and a high refractive index layer provided on the protective layer and containing a metal oxide other than zinc oxide as a primary component, and the wavelength-selective reflective layer selectively directionally reflects light in a specific wavelength band while transmitting light other than that in the specific wavelength band.

18 Claims, 32 Drawing Sheets

OPTICAL ELEMENT AND METHOD FOR MANUFACTURING THE SAME

CROSS REFERENCES TO RELATED APPLICATIONS

The present application claims priority to Japanese Priority Patent Application JP 2010-019127 filed in the Japan Patent Office on Jan. 29, 2010, the entire contents of which are hereby incorporated by reference.

BACKGROUND

The present application relates to an optical element and a method for manufacturing the same. In particular, the present application relates to an optical element that selectively directionally reflects light in a specific wavelength band while transmitting light other than that in the specific wavelength band.

In recent years, building glass for high-rise buildings and houses and window glass for vehicles have been increasingly provided with layers for absorbing or reflecting some of sunlight. The glass described above is one of energy-conservation measures in order to prevent global warming and aims to reduce the load on air-conditioning systems that is applied thereto by an increase in indoor temperature when optical energy emitted from the sun enters an indoor space through a window. The optical energy emitted from sunlight primarily includes light in the visible region having a wavelength range of 380 to 780 nm and light in the near-infrared region having a wavelength range of 780 to 2,100 nm. In particular, since being irrelevant to human visibility, the transmittance of a window in the latter wavelength range, that is, in the near-infrared region, is an important factor that determines whether the window has highly transparency and highly heat-shielding properties.

As a method for shielding near-infrared light while maintaining the transparency in the visible region, for example, there may mentioned a method for providing window glass with a layer having a high reflectance in the near-infrared region. For example, Japanese Patent No. 4066101 has disclosed a laminated structural film including an oxide layer, a metal layer, and a dielectric material layer. Japanese Patent No. 4066101 has also disclosed that since the laminated structural film is used as a reflective layer, various properties, such as high visible light transmission properties, low radiation properties, high heat ray reflecting properties, and desirable reflective appearance, can be imparted to an optical element.

However, since this type of reflective layer is provided on flat window glass, specular reflection of incident sunlight can only be performed. Hence, light coming from the sky and specularly reflected reaches another outdoor building or the ground and is changed into heat by absorption, and as a result, an ambient temperature is increased. Accordingly, around the periphery of a building in which the reflective layers as described above are adhered to all windows, various problems occur, that is, for example, since a local increase in temperature occurs, a heat island phenomenon is promoted in an urban area, and lawns are not grown only in an area irradiated with reflected light.

SUMMARY

Accordingly, it is desirable to provide an optical element that selectively directionally reflects light in a specific wavelength band while transmitting light other than that in the specific wavelength band and a method for manufacturing the optical element.

According to an embodiment, there is provided an optical element which includes a first optical layer having a concavo-convex surface; a wavelength-selective reflective layer provided on the concavo-convex surface of the first optical layer; and a second optical layer provided on the concavo-convex surface on which the wavelength-selective reflective layer is provided so as to fill the concavo-convex surface. In this optical element, the wavelength-selective reflective layer includes a metal layer, a protective layer provided on the metal layer and containing a metal oxide as a primary component, and a high refractive index layer provided on the protective layer and containing a metal oxide other than zinc oxide as a primary component, and the wavelength-selective reflective layer selectively directionally reflects light in a specific wavelength band while transmitting light other than that in the specific wavelength band.

According to an embodiment, there is provided a method for manufacturing an optical element which includes the steps of: forming a wavelength-selective reflective layer on a concavo-convex surface of a first optical layer; and forming a second optical layer on the concavo-convex surface on which the wavelength-selective reflective layer is formed so as to fill the concavo-convex surface. In the method described above, the step of forming a wavelength-selective reflective layer includes the substeps of: forming a metal layer; forming a protective layer which contains a metal oxide as a primary component on the metal layer; and forming a high refractive index layer which contains a metal oxide other than zinc oxide as a primary component on the protective layer, and the wavelength-selective reflective layer selectively directionally reflects light in a specific wavelength band while transmitting light other than that in the specific wavelength band.

According to an embodiment, light in a specific wavelength band can be directionally reflected and is not allowed to enter a predetermined space, and light other than that in the specific wavelength band can be introduced into the predetermined space. In addition, reflected light in a specific direction other than the specular reflection exists, and the intensity thereof can be made sufficiently higher than the intensity of diffuse reflection which has no directivity.

As described above, according to an embodiment, light in a specific wavelength band is selectively directionally reflected, and at the same time, light other than that in the specific wavelength band can be transmitted.

Additional features and advantages are described herein, and will be apparent from the following Detailed Description and the figures.

DETAILED DESCRIPTION

The present application will be described below in greater detail with reference to the drawings according to an embodiment.

The present inventors carried out intensive research in order to solve the above problems of the related art. As a result, the present inventors invented an optical element including a first optical layer having a concavo-convex surface, a wavelength-selective reflective layer formed on the concavo-convex surface of the first optical layer, and a second optical layer formed on the concavo-convex surface on which the wavelength-selective reflective layer is formed so as to fill the concavo-convex surface. In this optical element, of light incident on an incident surface thereof, light in a specific wavelength band is selectively directionally reflected, and at the same time, light other than that in the specific wavelength can be transmitted.

Figure 1A:
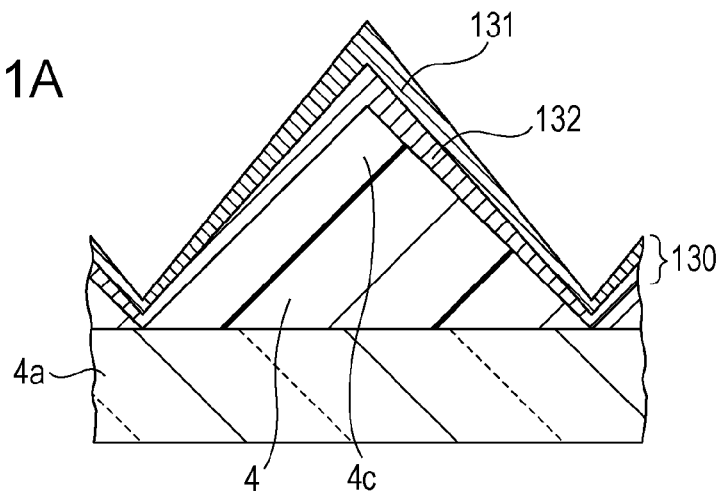
FIG. 1A is a cross-sectional view illustrating a first structural example of an optical element proposed by the present inventors.

FIG. 1A is a cross-sectional view illustrating a first structural example of an optical element proposed by the present inventors. As shown in FIG. 1A, this optical element has the structure in which a wavelength-selective reflective layer 130 is formed on a concavo-convex surface of a first optical layer 4. The wavelength-selective reflective layer 130 includes a metal layer 132 formed on the concavo-convex surface of the first optical layer 4 and a high refractive index layer 131 formed on the metal layer 132.

Figure 2A:
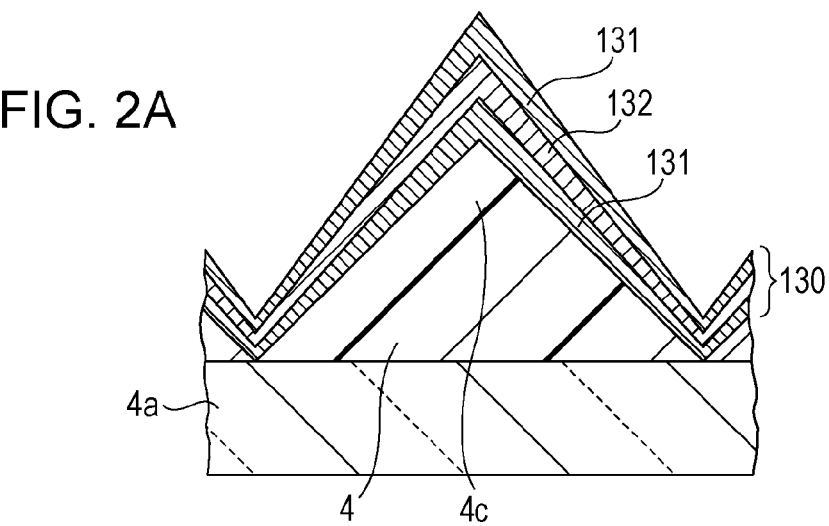
FIG. 2A is a cross-sectional view illustrating a second structural example of the optical element proposed by the present inventors.

FIG. 2A is a cross-sectional view illustrating a second structural example of the optical element proposed by the present inventors. As shown in FIG. 2A, this optical element includes the structure in which a wavelength-selective reflective layer 130 is formed on a concavo-convex surface of a first optical layer 4. The wavelength-selective reflective layer 130 includes a high refractive index layer 131 formed on the concavo-convex surface of the first optical layer 4, a metal layer 132 formed on the high refractive index layer 131, and a high refractive index layer 131 formed on the metal layer 132.

Figure 1B:
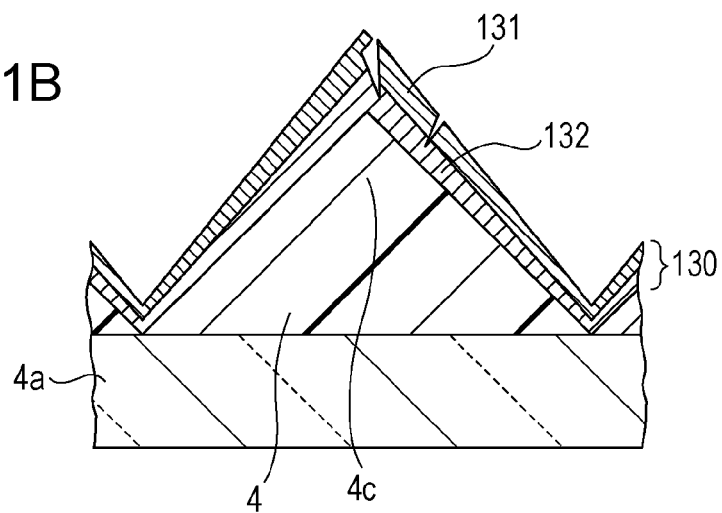
FIG. 1B is a cross-sectional view illustrating degradation of a wavelength-selective reflective layer caused by generation of cracks.
Figure 2B:
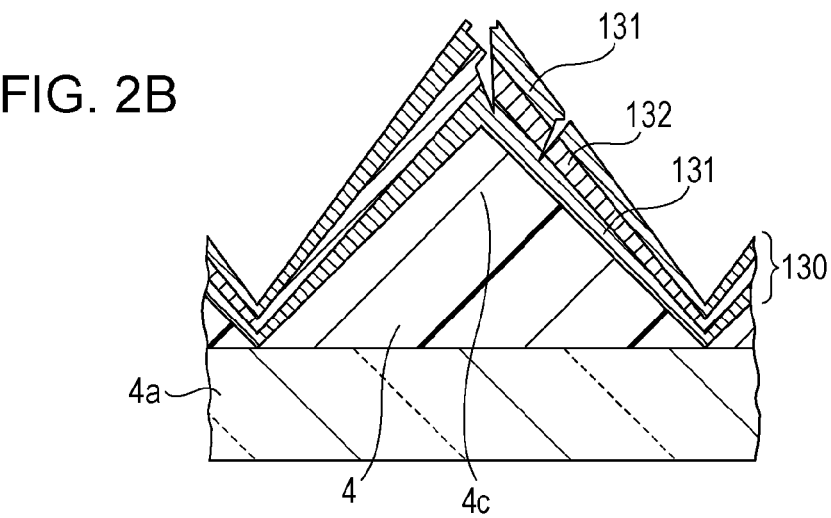
FIG. 2B is a cross-sectional view illustrating degradation of a wavelength-selective reflective layer caused by generation of cracks.

In the optical elements of the first and the second structural examples described above, as a material for the high refractive index layer 131, when a zinc oxide-based compound (such as zinc oxide (ZnO) or zinc oxide added with gallium (Ga) and an aluminum (Al) (hereinafter referred to as "GAZO")) is used, cracks are liable to be generated in a vertex area of a convex portion and/or an inclined surface portion of the concavo-convex surface due to the influence of a film stress. When cracks are generated, moisture and/or air are liable to enter the inside therethrough, the metal layer 132 included in the wavelength-selective reflective layer 130 is degraded, and as a result, a reflex function is degraded (see FIGS. 1B and 2B).

Figure 1C:
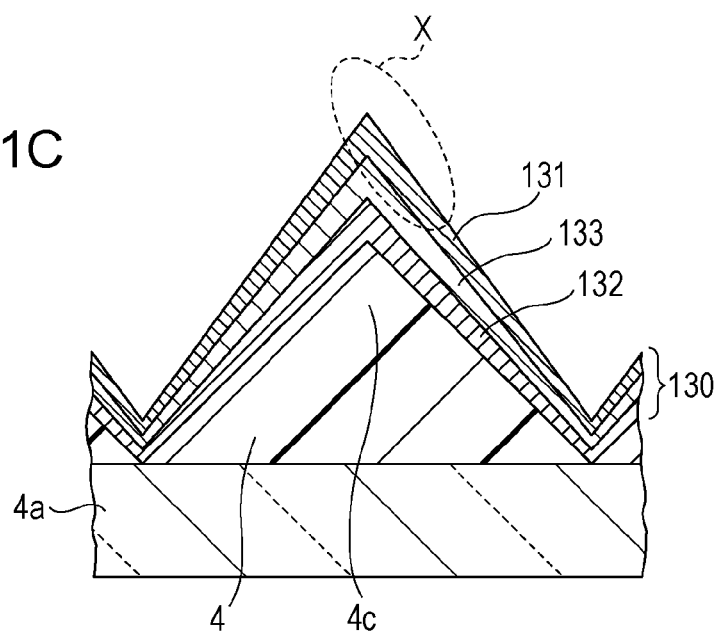
FIG. 1C is a cross-sectional view illustrating degradation of the wavelength-selective reflective layer caused by oxygen deficiency irregularity.
Figure 2C:
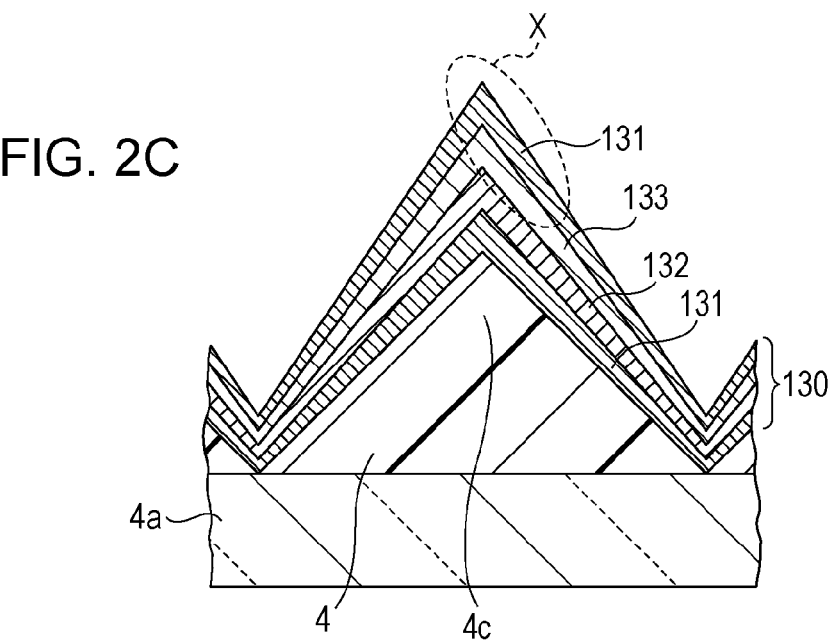
FIG. 2C is a cross-sectional view illustrating degradation of the wavelength-selective reflective layer caused by oxygen deficiency irregularity.

Heretofore, for a plate-shaped selective reflective film, a method is used in which a thin metal layer made, for example, of Ti having a thickness of approximately 2 nm is formed on a metal layer, and a high refractive index layer is further formed on an upper surface of the thin metal layer under oxygen supply conditions. By this method, since being oxidized, the thin metal layer functions as a protective layer, and as a result, the metal layer is suppressed from being degraded by oxidation. However, through intensive research carried out by the present inventors in order to apply this method to film formation on the structure described above, it was found that the optimal thickness of the protective metal layer satisfying the performance is not present. This reason for this is believed that the thickness of the wavelength-selective reflective layer 130 on the concavo-convex shape is larger at a vertex portion than that at a bottom portion by approximately 2 times due to the influences of shadowing and the like. It was finally found that when the thickness of the protective metal layer is small, since a sufficient protective function may not be obtained at the bottom portion at which the thickness is small, degradation of the metal layer 132 occurs by oxidation, and on the other hand, when the thickness of the protective metal layer is large, oxygen deficiency irregularity is liable to be generated in a vertex portion of a protective layer 133 which has a large thickness, so that degradation of spectral properties caused by the absorption of light occurs (see the regions X shown in FIGS. 1C and 2C).

Accordingly, the present inventors carried out intensive research in order to suppress the generation of cracks and also in order to suppress the degradation of spectral properties. As a result, it was finally found that a material (low stress material) containing a metal oxide other than zinc oxide as a primary component is used as a material for the high refractive index layer 131, the material for the protective layer 133 of the wavelength-selective reflective layer 130 is changed to a metal oxide material, and further the film formation conditions of the protective layer 133 are adjusted.

Embodiments of the present application will be described in the following order with reference to the drawings.

1. First Embodiment (Example in which structures are one-dimensionally arranged.)

2. Second Embodiment (Example in which structures are two-dimensionally arranged.)

3. Third Embodiment (Example in which an optical film containing light scattering material is provided.)

4. Fourth Embodiment (Example in which a self-cleaning effect layer is provided.)

<1. First Embodiment>

[Structure of Optical Film]

Figure 3A:
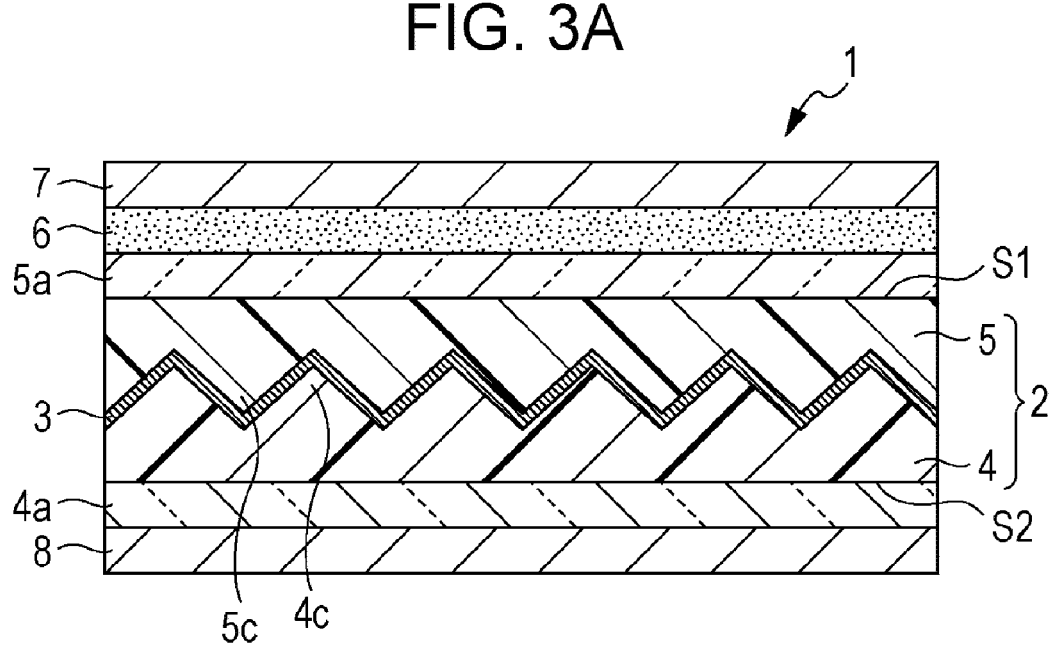
FIG. 3A is a cross-sectional view showing one structural example of an optical film according to a first embodiment.
Figure 3B:
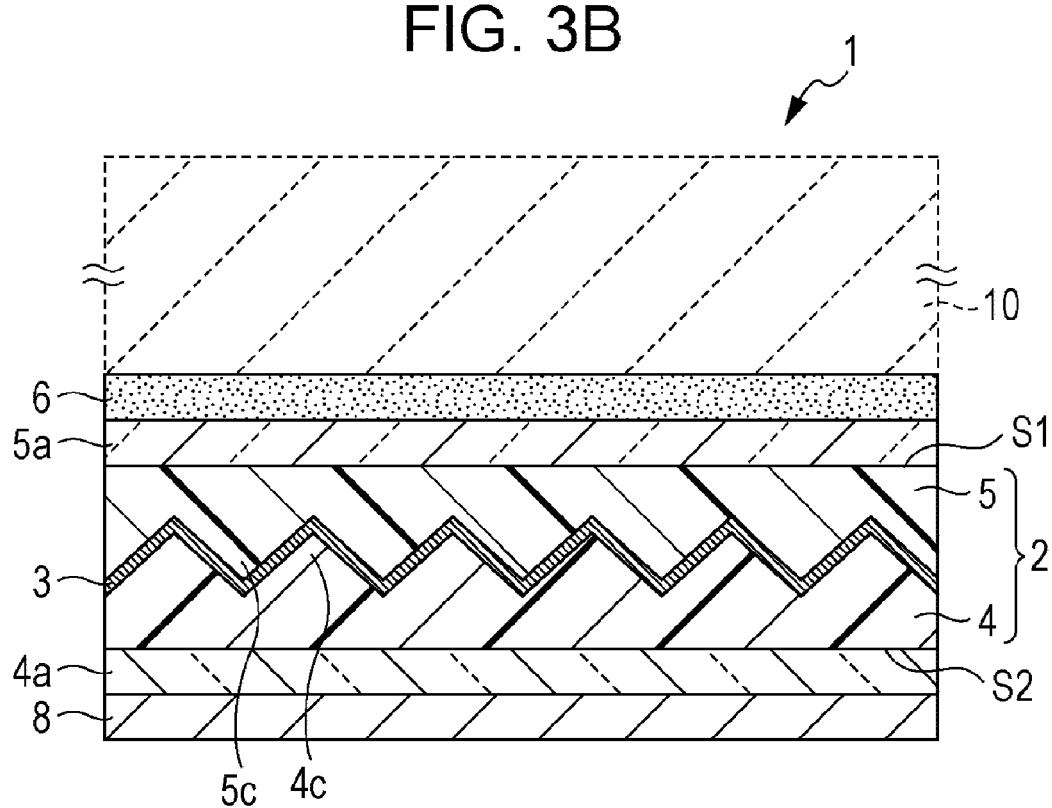
FIG. 3B is a cross-sectional view showing an example in which the optical film according to the first embodiment is adhered to an adherend.

FIG. 3A is a cross-sectional view showing one structural example of an optical film according to a first embodiment. FIG. 3B is a cross-sectional view showing an example in which the optical film according to the first embodiment is adhered to an adherend. An optical film 1 functioning as an optical element is an optical film having so-called directional reflection properties. As shown in FIG. 3A, this optical film 1 includes an optical layer 2 having a concavo-convex interface therein and a wavelength-selective reflective layer 3 provided along the interface of this optical layer 2. The optical layer 2 includes a first optical layer (also called a shaped resin layer) 4 having a first surface of a concavo-convex surface shape and a second optical layer (called an embedding resin layer) 5 having a second surface of a concavo-convex shape. The interface inside the optical layer is formed from the first surface and the second surface disposed to face each other and each having a concavo-convex shape. In particular, the optical film 1 includes the first optical layer 4 having a concavo-convex surface, the wavelength-selective reflective layer 3 formed on the concavo-convex surface of the first optical layer 4, and the second optical layer 5 formed on the wavelength-selective reflective layer 3 so as to fill the concavo-convex surface on which the wavelength-selective reflective layer 3 is formed. The optical film 1 has an incident surface 51 on which sunlight or the like is incident and an emission surface S2 from which, of the light incident on this incident surface 51, light which transmits the optical film 1 is emitted.

If necessary, the optical film 1 may further includes a first base member 4a on the emission surface S2 of the optical layer 2. In addition, if necessary, the optical film 1 may further includes a second base member 5a on the incident surface 51 of the optical layer 2. When the first base member 4a and/or the second base member 5a is included in the optical film 1 as described above, in the state in which the first base member 4a and/or the second base member 5a is formed as a part of the optical film 1, the following optical properties, such as transparency and a transmission color, are preferably satisfied.

If necessary, the optical film 1 may further include a bonding layer 6. This bonding layer 6 is formed on one of the incident surface S1 and the emission surface S2 of the optical film 1 which is to be adhered to a window material 10. The optical film 1 is adhered to the window material 10, which is an adherend, at an indoor or an outdoor side with this bonding layer 6 interposed therebetween. As the bonding layer 6, for example, there may be used an adhesion layer (such as a UV curable resin or a two-component liquid resin) containing an adhesive as a primary component or a tacky layer (such as PSA (Pressure Sensitive Adhesive)) containing a tacky agent as a primary component. When the bonding layer 6 is a tacky layer, a peeling layer 7 is preferably further provided on the bonding layer 6. The reason for this is that by the structure as described above, by simply peeling the peeling layer 7, the optical film 1 can be easily adhered to an adherend, such as the window material 10, with the bonding layer 6 interposed therebetween.

The optical film 1 may further include a primer layer (not shown) between the second base member 5a and the bonding layer 6 and/or the second optical layer 5 in order to improve bonding properties between the second base member 5a and the bonding layer 6 and/or the second optical layer 5. In addition, in order to improve the bonding properties at the same portion as described above, a common physical pre-treatment is preferably performed with or without using the primer layer described above. As the common physical pre-treatment, for example, a plasma treatment or a corona treatment may be mentioned.

The optical film 1 may further include a barrier layer (not shown) on the incident surface S1 or the emission surface S2 to be adhered to an adherend, such as the window material 10, or between the above surface and the wavelength-selective reflective layer 3. When the barrier layer is provided as described above, diffusion of moisture from the incident surface S1 or the emission surface S2 to the wavelength-selective reflective layer 3 can be suppressed, and degradation of a metal and the like contained in the wavelength-selective reflective layer 3 can be suppressed. As a result, the durability of the optical film 1 can be improved.

The optical film 1 may further include a hard coat layer 8 in order to impart scratch resistance and the like to the surface of the optical film 1. This hard coat layer 8 is preferably formed on one of the incident surface S1 and the emission surface S2 of the optical film 1 opposite to that adhered to an adherend, such as the window material 10.

The optical film 1 preferably has flexibility since it can be easily adhered to an adherend, such as the window material 10. In this case, a sheet is included in the category of the film. That is, an optical sheet may also be included in the optical film 1.

The optical film 1 has transparency. The transparency preferably satisfies the range of transmission image clarity which will be described later. The difference in refractive index between the first optical layer 4 and the second optical layer 5 is preferably 0.010 or less, more preferably 0.008 or less, and even more preferably 0.005 or less. When the difference in refractive index is more than 0.010, the transmission image tends to blur. When the difference in refractive index is in a range of more than 0.008 to 0.010, although depending on the outside brightness, no problems may occur in daily life. When the difference in refractive index is in a range of more than 0.005 to 0.008, although a diffraction pattern of a very bright object, such as a light source, is disturbing, an outdoor scene can be clearly seen. When the difference in refractive index is 0.005 or less, the diffraction pattern is hardly disturbing. Of the first optical layer 4 and the second optical layer 5, the optical layer to be adhered to the window material 10 or the like may contain a tacky agent as a primary component. By the structure as described above, the optical film 1 can be adhered to the window material 10 or the like by one of the first optical layer 4 and the second optical layer 5, which contains a tacky agent as a primary component. In addition, when the structure as described above is formed, the difference in refractive index of the tacky agent is preferably in the range described above.

The first optical layer 4 preferably has the same optical properties, such as the refractive index, as those of the second optical layer 5. In more particular, the first optical layer 4 and the second optical layer 5 are preferably formed of the same material which has transparency in the visible region. When the first optical layer 4 and the second optical layer 5 are formed of the same material, the refractive indexes thereof are equal to each other, and hence, the transparency of visible light can be improved. However, even if the same material is used as a starting raw material, the refractive indexes of the layers finally obtained may be different from each other due to curing conditions and the like in a film forming process, and hence, a careful attention is necessary. On the other hand, when the first optical layer 4 and the second optical layer 5 are formed from different materials, since the refractive indexes thereof are different from each other, light is refracted at the wavelength-selective reflective layer 3 functioning as the border, and a transmission image tends to blur. In particular, when an object similar to a point light sources, such as a distant electrical lamp, is observed, a diffraction pattern is liable to be clearly observed. In addition, in order to adjust the refractive index value, an additive may be added to the first optical layer 4 and/or the second optical layer 5.

The first optical layer 4 and the second optical layer 5 both preferably have transparency in the visible region.

Incidentally, there are two types of definitions of the transparency, that is, one definition means no light absorption and the other definition means no light scattering. In general, the transparency indicates only the former; however, the optical film 1 according to the first embodiment preferably has the above two optical properties. Since a currently used retroreflector aims that reflected light reflected at a display, such as a road sign or closing of a night-time worker, can be easily viewed, even if having scattering properties, when the retroreflector is in close contact with an underlayer reflector, the reflected light reflected thereby can be viewed. This is the same principle as that in which, for example, in order to impart antiglare properties, even if an antiglare treatment having scattering properties is performed on a front surface of an image display apparatus, an image can be viewed. However, the optical film 1 according to the first embodiment has a feature of transmitting light other than light having a specific wavelength, which is to be directionally reflected, and is adhered to a transmission object which primarily transmits light having this transmission wavelength, and the transmitted light is observed; hence, the optical film 1 preferably has no light scattering properties. However, in accordance with the application, the scattering properties may be intentionally imparted to the second optical layer 5.

The optical film 1 is preferably used by adhesion thereof to a rigid body, such as the window material 10, having transmission properties primarily to transmitted light having a wavelength other than the specific wavelength with a tacky agent interposed therebetween. As the window material 10, for example, a building window material for a high-rise building or a housing or a window material for a vehicle may be mentioned. When being applied to a building window material, the optical film 1 is particularly preferably applied to the window material 10 arranged to face any direction between the east to the west through the south (such as in any direction between the southeast to the southwest). The reason for this is that when the window material 10 is arranged at the position as described above, heat rays can be more effectively reflected. The optical film 1 can be used not only for a single layer window glass but also for a special glass, such as a multilayer glass. In addition, the window material 10 is not limited to a material formed of glass, and a polymer material having transparency may also be used. The optical layer 2 preferably has transparency in the visible region. The reason for this is that since the optical layer 2 has transparency as described above, when the optical film 1 is adhered to the window material 10, such as window glass, visible light can be transmitted, and lighting by sunlight can be ensured. In addition, as the surface to be adhered, besides an inside surface of the glass, an outside surface thereof may also be used.

In addition, the optical film 1 may be used together with another heat ray shielding film, and for example, an optical absorption coating film may also be provided at the interface between air and the optical film 1 (that is, on the outermost surface of the optical film 1). In addition, the optical film 1 may also be used together with a hard coat layer, an ultraviolet protection layer, a surface antireflective layer, and the like. When being used together with the optical film 1, these functional layers are preferably provided at the interface between the optical film 1 and air. However, since an ultraviolet protection layer is necessarily arranged closer to a sun side than the optical film 1, when the optical film 1 is used on a window glass surface at an indoor side, the ultraviolet protection layer is preferably provided between this window glass surface and the optical film 1. In this case, an ultraviolet absorber may also be kneaded in a bonding layer provided between the window glass surface and the optical film 1.

In addition, in accordance with the application of the optical film 1, the optical film 1 may be colored in order to impart design characteristics thereto. When the design characteristics is imparted as described above, the optical layer 2 is preferably formed to absorb only light in a specific wavelength band without degrading the transparency.

Figure 4:
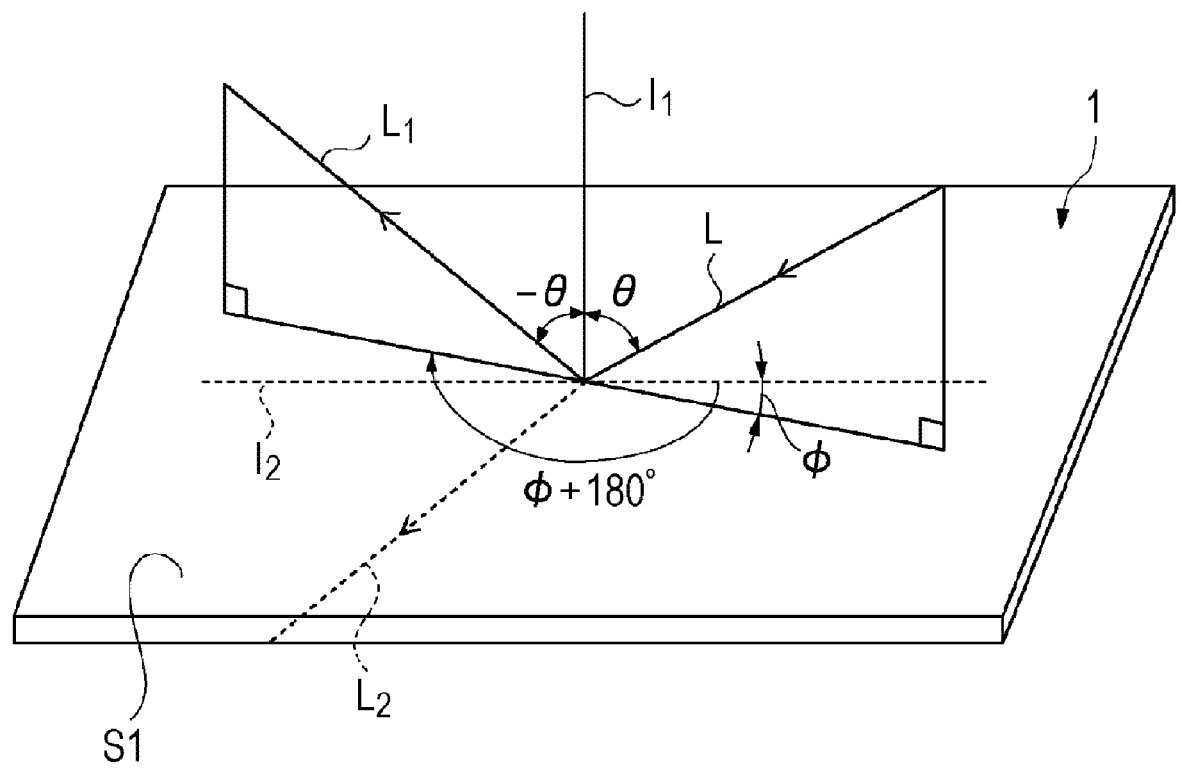
FIG. 4 is a perspective view showing the relationship between incident light incident on an optical film and reflected light reflected by the optical film.

FIG. 4 is a perspective view showing the relationship between incident light incident on the optical film 1 and reflected light reflected by the optical film 1. The optical film 1 has an incident surface S1 on which light L is incident. Of the light L incident on the incident surface S1 at an incident angle $(\theta, \phi)$, the optical film 1 selectively directionally reflects light $L_1$ in a specific wavelength band in a direction other than a specular reflection direction $(-\theta, \phi+180°)$ while transmitting light $L_2$ other than that in the specific wavelength band. In addition, the optical film 1 has transparency to the light other than that in the specific wavelength band. As the transparency, the transmission image clarity is preferably in the range which will be described later. In this embodiment, $\theta$ indicates an angle formed between a normal $l_1$ to the incident surface S1 and the incident light L or the reflected light $L_1$. In addition, $\phi$ indicates an angle formed between a specific straight line $l_2$ within the incident surface S1 and a component of the incident light L or the reflected light $L_1$ projected on the incident surface S1. In addition, the specific straight line $l_2$ within the incident surface is an axis at which the reflection intensity in a $\phi$ direction is maximized when the incident angle $(\theta, \phi)$ is fixed, and the optical film 1 is rotated around the normal $l_1$ to the incident surface S1 thereof. However, when there are at least two axes (directions) at which the reflection intensity is maximized, one of them is selected as the straight line $l_2$. In addition, an angle $\theta$ rotated clockwise around the normal $l_1$ is represented by "+$\theta$", and an angle $\theta$ rotated anticlockwise is represented by "−$\theta$." An angle $\phi$ rotated clockwise around the straight line $l_2$ is represented by "+$\phi$", and an angle $\phi$ rotated anticlockwise is represented by "−$\phi$".

The light in the specific wavelength band which is selectively directionally reflected and the specific light to be transmitted are changed depending on the application of the optical film 1. For example, when the optical film 1 is applied to the window material 10, the light in the specific wavelength band which is selectively dimensionally reflected is preferably near-infrared light, and the specific wavelength to be transmitted is preferably visible light. In particular, the light in the specific wavelength band which is selectively dimensionally reflected is preferably near-infrared light having a primary wavelength band of 780 to 2,100 nm. By reflecting near-infrared light, when an optical element is adhered to a window material, such as a glass window, an increase in temperature in a building can be suppressed. Hence, air-conditioning cooling load can be reduced, and energy saving can be performed. In this embodiment, the directional reflection indicates reflection in a specific direction other than the specular reflection, and the intensity of the directional reflection is sufficiently higher than the intensity of the diffuse reflection which has no directivity. In this embodiment, the reflection indicates that the reflectance in a specific wavelength band, for example, in the near-infrared region, is preferably 30% or more, more preferably 50% or more, and even more preferably 80% or more. The transmission indicates that the transmittance in a specific wavelength band region, for example, in the visible region, is preferably 30% or more, more preferably 50% or more, and even more preferably 70% or more.

In the optical film 1, a directional reflection direction $\phi$o is preferably in a range of −90° to 90°. The reason for this is that when the optical film 1 is adhered to the window material 10, of light coming from the sky, light in a specific wavelength band can be returned in a skyward direction. When there are no high-rise buildings in the vicinity, the optical film 1 in this range is effective. In addition, the directional reflection direction is preferably in the vicinity of $(\theta, -\phi)$. The vicinity indicates preferably within 5° from $(\theta, -\phi)$, more preferably within 3°, and even more preferably within 2°. The reason for this is that when the range of the directional refection direction is set as described above, and the optical film 1 is adhered to the window material 10, of light coming from the sky over buildings having approximately equivalent heights, light in a specific wavelength band can be efficiently returned skyward over the other buildings. In order to realize the directional reflection as described above, a three-dimensional structure, such as a part of a sphere, a part of a hyperbola, a triangular pyramid, a quadrangular pyramid, or a cone, is preferably used. Light incident in a $(\theta, \phi)$ direction $(-90°<\phi<90°)$ can be reflected in accordance with the shape in a $(\theta o, \phi o)$ direction $(0°<\theta o<90°, -90°<\phi o<90°)$. Alternatively, a columnar body extended in one direction is preferable. Light incident in a (θ, φ) direction (−90°<φ<90°) can be reflected in accordance with the inclined angle of the columnar shape in a (θo, −φ) direction (0°<θo<90°).

In the optical film 1, the directional reflection of light in a specific wavelength band is preferably in the vicinity of retroreflection, that is, the reflection direction of light in a specific wavelength band with respect to the light incident on the incident surface S1 at an incident angle (θ, φ) is preferably in the vicinity of (θ, φ). The reason for this is that when the optical film 1 is adhered to the window material 10, of light coming from the sky, light in a specific wavelength band can be returned skyward. In this embodiment, the vicinity is preferably within 5°, more preferably within 3°, and even more preferably within 2°. The reason for this is that when the reflection direction is within the range described above, and the optical film 1 is adhered to the window material 10, of light coming from the sky, light in a specific wavelength band can be efficiently returned skyward. In addition, when an infrared radiation portion and a light receiving portion are adjacent to each other, such as an infrared sensor or an infrared imaging device, the retroreflection direction is necessarily equal to the incident direction; however, when sensing is not necessarily performed in a specific direction as in the case of the present application, the retroreflection direction may not be strictly made equal to the incident direction.

In the optical film 1, the value of the transmission image clarity measured using an optical comb with a width of 0.5 mm in a wavelength band having transmission properties is preferably 50 or more, more preferably 60 or more, and even more preferably 75 or more. When the value of the transmission image clarity is less than 50, the transmission image tends to blur. When the value is in a range of 50 to less than 60, although depending on the outside brightness, no problems may occur in daily life. When the value is in a range of 60 to less than 75, although a diffraction pattern of a very bright object, such as a light source, is disturbing, an outdoor scene can be clearly seen. When the value is 75 or more, the diffraction pattern is hardly disturbing. Furthermore, the total value of the transmission image clarity measured using an optical comb with a width of 0.125 mm, 0.5 mm, 1.0 mm, and 2.0 mm is preferably 230 or more, more preferably 270 or more, and even more preferably 350 or more. When the total value of the transmission image clarity is less than 230, the transmission image tends to blur. When the total value is in a range of 230 to less than 270, although depending on the outside brightness, no problems may occur in daily life. When the total value is in a range of 270 to less than 350, although a diffraction pattern of a very bright object, such as a light source, is disturbing, an outdoor scene can be clearly seen. When the total value is 350 or more, the diffraction pattern is hardly disturbing. In this embodiment, the value of the transmission image clarity is measured in accordance with JIS K7105 using ICM-1T manufactured by Suga Test Instruments Co., Ltd. However, when a wavelength to be desirably transmitted is different from a D65 light-source wavelength, measurement is preferably performed after correction is performed using a filter for the wavelength to be desirably transmitted.

In the optical film 1, a haze in a wavelength band having transmission properties is preferably 6% or less, more preferably 4% or less, and even more preferably 2% or less. The reason for this is that when the haze is more than 6%, transmitted light is scattered and blurred. In this embodiment, the haze is measured in accordance with a measuring method specified by JIS K7136 using HM-150 manufactured by Murakami Color Research Laboratory Co., Ltd.

However, when a wavelength to be desirably transmitted is different from the D65 light-source wavelength, measurement is preferably performed after correction is performed using a filter for the wavelength to be desirably transmitted. The incident surface S1 of the optical film 1 has a smoothness so as not to degrade the transmission image clarity, and preferably, the incident surface S1 and the emission surface S2 both have the smoothness as described above. In particular, an arithmetic average roughness Ra of each of the incident surface S1 and the emission surface S2 is preferably 0.08 μm or less, more preferably 0.06 μm or less, and even more preferably 0.04 μm or less. In addition, the arithmetic average roughness Ra described above is calculated as a roughness parameter by measuring the surface roughness of the incident surface and obtaining a roughness curve from a two-dimensional profile curve. In addition, the measurement conditions are set in accordance with JIS B0601: 2001. A measurement apparatus and measurement conditions are shown below.

Measurement apparatus: full automatic microprofile-measuring instrument Surfcorder ET4000A (manufactured by Kosaka Laboratory Ltd.)

In addition, λc is set to 0.8 mm; an evaluation length is set to 4 mm; a cutoff is set to 5 times; and a data sampling interval is set to 0.5 μm.

The transmission color of the optical film 1 is preferably as neutral as possible and, even if being colored, the transmission color preferably has a light color tone that appears cool, such as blue, blue-green, or green. In order to obtain the color tone as described above, the chromaticity coordinates x and y of the transmitted light incident on the incident surface S1, passing through the optical layer 2 and the wavelength-selective reflective layer 3, and radiating from the emission surface S2, and the chromaticity coordinates x and y of the reflected light preferably satisfy, for example, 0.20<x<0.35 and 0.20<y<0.40, more preferably 0.25<x<0.32 and 0.25<y<0.37, and even more preferably 0.30<x<0.32 and 0.30<y<0.35 in the case of illumination of the D65 light source. Furthermore, in order not to make the color tone look reddish, y>x-0.02 is preferably satisfied, and y>x is more preferably satisfied. In addition, if the reflection color tone varies with the incident angle, for example, when the optical film 1 is applied to a building window, it is not preferable since the color tone looks differently from place to place or appears to change when viewed during walking. In order to suppress the change in color tone as described above, the absolute value of the difference in the chromaticity coordinate x of light incident on the incident surface S1 or the emission surface S2 at an incident angle θ in a range of 0° to 60° and specularly reflected by the optical layer 2 and the wavelength-selective reflective layer 3 and the absolute value of the difference in the chromaticity coordinate y of the light are each preferably 0.05 or less, more preferably 0.03 or less, and even more preferably 0.01 or less at each primary surface of the optical film 1. The above numerical limitations of the chromaticity coordinates x and y of the reflected light are preferably satisfied for both the incident surface S1 and the emission surface S2.

Hereinafter, the first optical layer 4, the second optical layer 5, and the wavelength-selective reflective layer 3, which form the optical film 1, will be sequentially described.

(First Optical Layer, Second Optical Layer)

The first optical layer 4 is a layer, for example, to support and protect the wavelength-selective reflective layer 3. Since imparting flexibility to the optical film 1, the first optical layer 4 is formed of, for example, a layer containing a resin as a primary component. For example, one of the two primary surfaces of the first optical layer 4 is a smooth surface, and the other surface is a concavo-convex surface (a first surface). The wavelength-selective reflective layer 3 is formed on this concavo-convex surface.

The second optical layer 5 is a layer to protect the wavelength-selective reflective layer 3 by embedding the first surface (concavo-convex surface) of the first optical layer 4 on which the wavelength-selective reflective layer 3 is formed. In order to impart the flexibility to the optical film 1, the second optical layer 5 is formed, for example, of a layer containing a resin as a primary component. For example, one of the two primary surfaces of the second optical layer 5 is a smooth surface, and the other surface is a concavo-convex surface (a second surface). The concavo-convex surface of the first optical layer 4 and the concavo-convex surface of the second optical layer 5 have the relationship in which the concavo-convex shapes are reversed to each other.

The concavo-convex surface of the first optical layer 4 is formed, for example, of at least two structures 4c which are one-dimensionally arranged. The concavo-convex surface of the second optical layer 5 is formed, for example, of at least two structures 5c which are one-dimensionally arranged (see FIGS. 5A to 6B). Since the structure 4c of the first optical layer 4 and the structure 5c of the second optical layer 5 are only different from each other such that the concavo-convex shapes thereof are reversed, hereinafter, the structure 4c of the first optical layer 4 will be described.

In the optical film 1, the pitch P of the structures 4c is, for example, in a range of 5 μm to 5 mm, preferably in a range of 30 μm to 5 mm, more preferably in a range of 10 to less than 250 μm, and even more preferably in a range of 20 to 200 μm. When the pitch of the structures 4c is less than 5 μm, it is difficult to form a desired shape thereof, and in addition, it is also generally difficult to obtain steep wavelength selection properties of the wavelength-selective reflective layer 3; hence, the transmission wavelength may be partially reflected in some cases. When the reflection as described above occurs, since diffraction is generated, and high-order reflection is also viewed, the transparency tends to look not so good. In addition, if the pitch of the structures 4c is more than 5 mm, when the shape of the structure 4c necessary for the directional reflection is taken into consideration, a necessary thickness becomes large, the flexibility is lost, and as a result, it becomes difficult to adhere the optical film 1 to a rigid body, such as the window material 10. In addition, when the pitch of concave portions is set to less than 250 μm, since the flexibility is further increased, a roll-to-roll manufacturing process can be easily performed, and a batch manufacturing process may not be necessary. In order to apply the optical element according to an embodiment to building materials, such as a window, the optical element is necessary to have a length of approximately several meters, and hence, a roll-to-roll manufacturing process is suitably performed rather than a batch manufacturing process.

In addition, the shape of the structure 4c formed in the surface of the first optical layer 4 is not limited to one type, and the structures 4c may be formed in the surface of the first optical layer 4 to have at least two types of shapes. When the structures 4c having at least two types of shapes are formed in the surface, a predetermined pattern formed of the structures 4c having at least two types of shapes may be periodically repeated. In addition, depending on desired properties, the structures 4c having at least two types of shapes may be randomly formed (aperiodically).

Figure 5A:
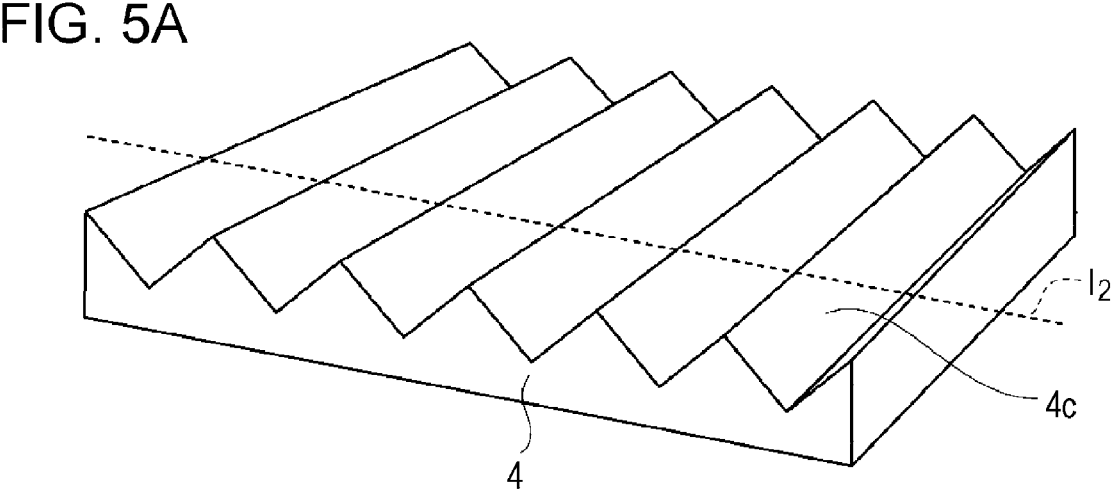
FIGS. 5A to 5C are perspective views each showing a shape example of the structure formed in a first optical layer.
Figure 5B:
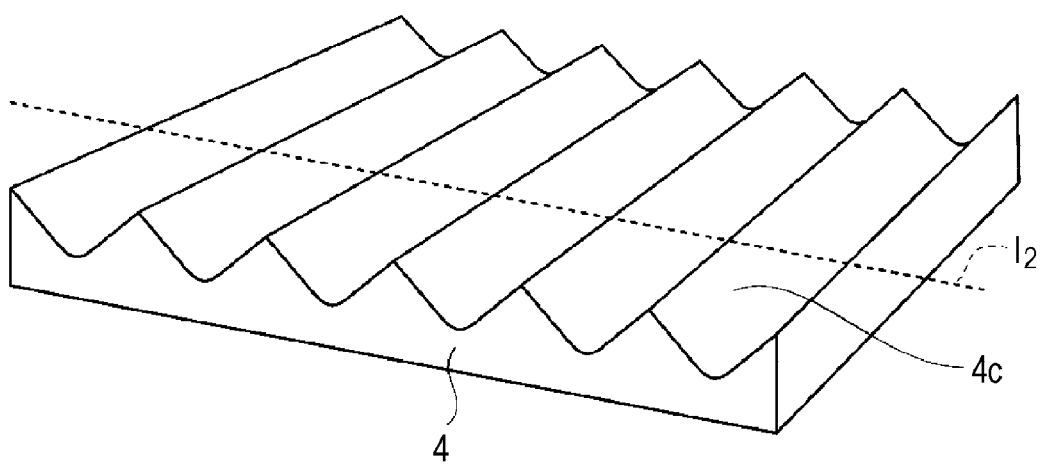
Figure 5C:
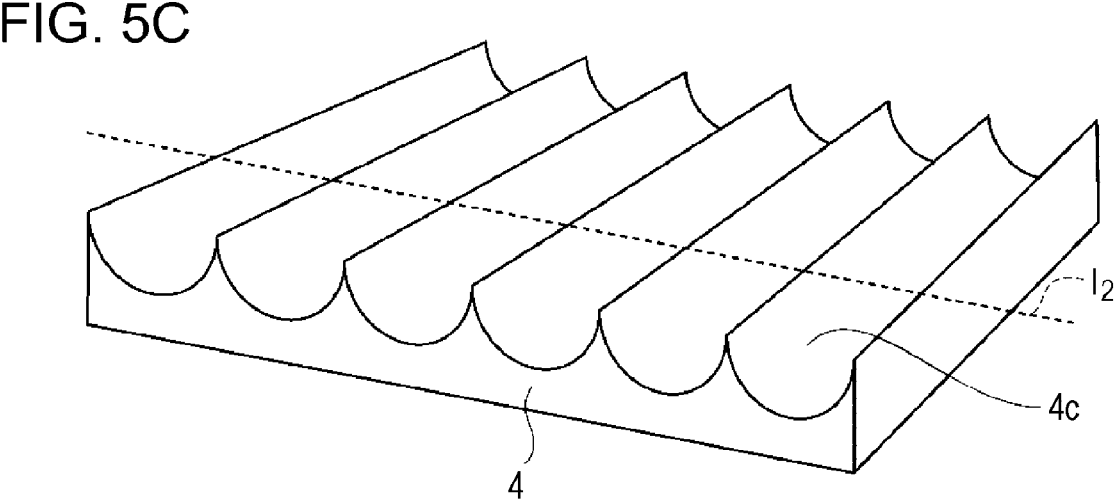

FIGS. 5A to 5C are perspective views each showing a shape example of the structure formed in the first optical layer. The structures 4c are each a columnar concave portion extended in one direction and are one-dimensionally arranged in one direction. Since being formed on the structures 4c, the wavelength-selective reflective layer 3 has the same shape as the surface shape of the structures 4c.

As the shape of the structure 4c, for example, there may be mentioned a prism shape shown in FIG. 5A, a shape having a round portion at a valley between prisms shown in FIG. 5B, a lenticular shape shown in FIG. 5C, or a reversed shape thereof. In this case, the lenticular shape indicates a shape in which the cross-section perpendicular to a ridgeline of the convex portion is a part of an arc shape or an almost arc shape, an elliptical arc shape or an almost elliptical arc shape, or a parabolic shape or an almost parabolic shape. Therefore, a cylindrical shape is also categorized in the lenticular shape. In addition, a round shape (R) may be formed at a ridgeline portion, and the ratio RIP, that is, the ratio of a curvature radius R to the pitch P of the structure 4c is preferably 7% or less, more preferably 5% or less, and even more preferably 3% or less. The shape of the structure 4c is not limited to the shapes shown in FIGS. 5A to 5C and the reversed shapes thereof, and a toroidal shape, a hyperbolic columnar shape, an elliptical columnar shape, a polygonal columnar shape, and a free-form shape may also be used. In addition, the vertex of the prism shape or the lenticular shape may be formed to have a polygonal shape (such as a pentagonal shape). When the structure 4c is formed to have a prism shape, an inclined angle θ of the prism-shaped structure 4c is 45° or the like. When applied to the window material 10, the structure 4c preferably has a flat surface or a curved surface having an inclined angle of 45° or more in order to return light coming from the sky in a skyward direction as much as possible by reflection. The reason the shape as described above is formed is that since the incident light is almost returned skyward by one reflection, even if the reflectance of the wavelength-selective reflective layer 3 is not so high, the incident light can be efficiently reflected in a skyward direction, and light absorption in the wavelength-selective reflective layer 3 can be reduced.

Figure 6A:
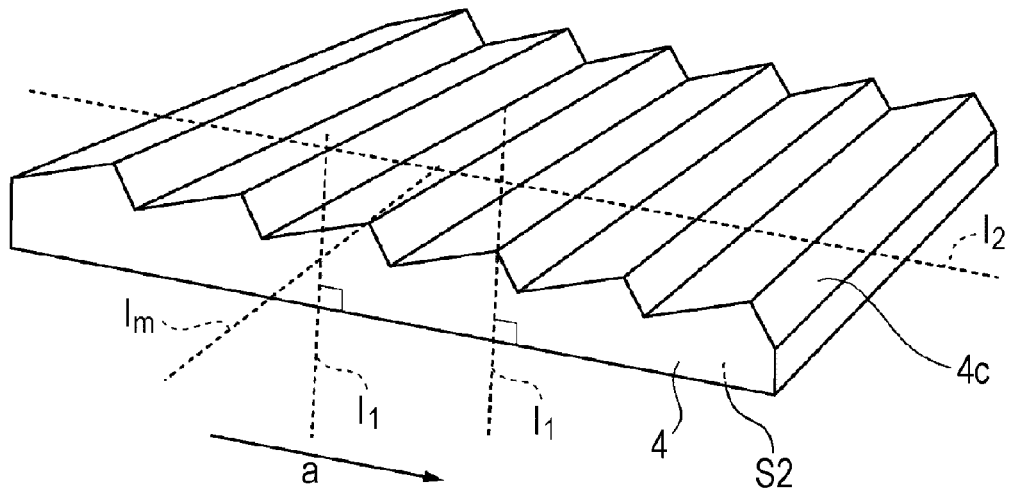
FIG. 6A is a perspective view showing a shape example of each of structures formed in the first optical layer.
Figure 6B:
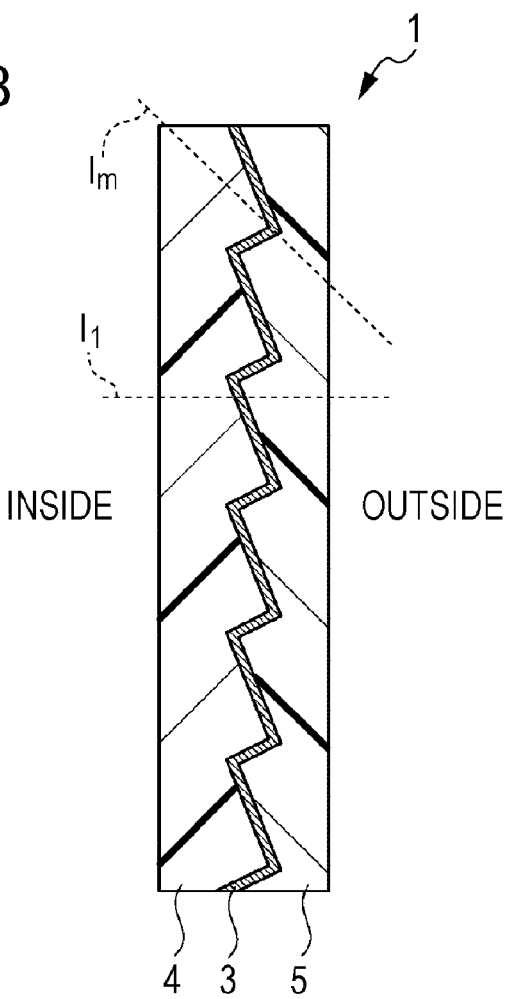
FIG. 6B is a cross-sectional view showing one structural example of an optical film including the first optical layer in which the structures shown in FIG. 6A are formed.

In addition, as shown in FIG. 6A, the structure 4c may have an asymmetric shape with respect to the normal $l_1$ to the incident surface S1 or the emission surface S2 of the optical film 1. In this case, a primary axis $l_m$ of the structure 4c is inclined in an arrangement direction a of the structure 4c with respect to the normal $l_1$. Here, the primary axis $l_m$ of the structure 4c indicates a straight line passing through a central point of the base of a cross-section of the structure 4c and the vertex thereof. When the optical film 1 is adhered to the window material 10 arranged approximately perpendicular to the ground, as shown in FIG. 6B, the primary axis $l_m$ of the structure 4c is preferably inclined to a lower side (ground side) of the window material 10 with respect to the normal $l_1$. The reason for this is that in general, since a larger amount of heat enters through a window about in early afternoon, and the height of the sun is larger than an angle of 45° in many cases, by using the shape described above, light incident at these high angles as described above can be efficiently reflected upward. An asymmetrical prism shape of the structure 4c with respect to the normal $l_l$ is shown by way of example in FIGS. 6A and 6B. In addition, the structure 4c having a shape other than a prism shape may also have an asymmetrical shape with respect to the normal $l_l$. For example, a corner cube body may have an asymmetric shape with respect to the normal I1.

The first optical layer 4 preferably includes a resin as a primary component in which a decrease in storage modulus at 100° C. is small and in which the storage modulus at 25° C. is not considerably different from that at 100° C. In particular, a resin having a storage modulus of $3 \times 10^9$ Pa or less at 25° C. and a storage modulus of $3 \times 10^7$ Pa or more at 100° C. is preferably contained. In addition, although being preferably formed of one type resin, the first optical layer 4 may include at least two types of resins. In addition, if necessary, at least one additive may be contained.

When a resin is used as a primary component in which a decrease in storage modulus at 100° C. is small and the storage modulus at 25° C. and that at 100° C. are not so much different from each other, even when a process including heating with or without pressure application is performed after the formation of the concavo-convex surface (the first surface) of the first optical layer 4, a designed interface shape can be mostly maintained. On the other hand, when a resin is used as a primary component in which a decrease in storage modulus at 100° C. is large and the storage modulus at 25° C. and that at 100° C. are significantly different from each other, a designed interface shape is considerably deformed, and for example, the optical film 1 may be curled in some cases.

As the process including heating, besides a process, such as an annealing treatment, in which heat is directly applied to the optical film 1 or constituent members thereof, for example, there may be mentioned a process in which when a thin film is formed or a resin composition is cured, the temperature of a film forming surface is locally increased and is indirectly applied to the thin film or the resin composition and a process in which the temperature of a mold is increased by energy ray radiation and is indirectly applied to an optical film. In addition, the effect obtained by limiting the numerical value range of the storage modulus described above is not particularly limited to a specific type of resin and can be obtained from any type of a thermoplastic resin, a thermosetting resin, and an energy ray curable resin.

The storage modulus of the first optical layer 4 can be confirmed, for example, as described below. When the surface of the first optical layer 4 is exposed, the storage modulus of its exposed surface can be confirmed by measurement using a microhardness tester. In addition, when the first base member 4a or the like is formed on the surface of the first optical layer 4, after the first base member 4a or the like is peeled off to expose the surface of the first optical layer 4, the storage modulus of the exposed surface can be confirmed by measurement using a microhardness tester.

As a method for suppressing a decrease in modulus at a high temperature, in the case of a thermoplastic resin, for example, a method for adjusting the length of a side chain or the type thereof may be mentioned, and in the case of a thermosetting resin and an energy ray curable resin, for example, a method for adjusting the number of cross-linking points and the molecular structure of a cross-linking agent may be mentioned. However, it is preferable that necessary performance of a resin material itself is not degraded by the structural change as describe. For example, depending on the type of cross-linking agent, a resin may become fragile since the modulus thereof at approximately room temperature is increased, and a film may be warped or curled since the shrinkage thereof is increased; hence, the type of cross-linking agent is appropriately selected in accordance with desired properties.

When the first optical layer 4 includes a crystalline polymer material as a primary component, a resin is preferably used as a primary component in which the glass transition point is higher than the highest temperature in a manufacturing process and a decrease in storage modulus at the highest temperature in the manufacturing process is small. On the other hand, if a resin is used in which the glass transition point is in a range of a room temperature of 25° C. to the highest temperature in a manufacturing process and a decrease in storage modulus at the highest temperature in the manufacturing process is large, it becomes difficult to maintain a designed ideal interface shape in the manufacturing process.

When the first optical layer 4 includes an amorphous polymer material as a primary component, a resin is preferably used as a primary component in which the melting point is higher than the highest temperature in a manufacturing process and a decrease in storage modulus at the highest temperature in the manufacturing process is small. On the other hand, if a resin is used in which the melting point is in a range of a room temperature of 25° C. to the highest temperature in a manufacturing process and a decrease in storage modulus at the highest temperature in the manufacturing process is large, a designed ideal interface shape may be difficult to be maintained in the manufacturing process.

In this embodiment, the highest temperature in a manufacturing process indicates the highest temperature of the concavo-convex surface (the first surface) of the first optical layer 4 in the manufacturing process. It is preferable when the second optical layer 5 also satisfies the numerical value range of the storage modulus and the temperature range of the glass transition point described above.

That is, at least one of the first optical layer 4 and the second optical layer 5 preferably contains a resin having a storage modulus of $3\times10^9$ Pa or less at 25° C. The reason for this is that since the flexibility can be imparted to the optical film 1 at a room temperature of 25° C., the optical film 1 can be manufactured by a roll-to-roll manufacturing method.

The first base member 4a and the second base member 5a have, for example, transparency. Although the base member preferably has a film shape in order to impart flexibility to the optical film 1, the base member is not particularly limited to this shape. As a material for the first base member 4a and the second base member 5a, for example, a common polymer material may be used. As the common polymer material, for example, there may be mentioned a triacetyl cellulose (TAC), a polyester (TPEE), a poly(ethylene terephthalate) (PET), a polyimide (PI), a polyamide (PA), an aramid, a polyethylene (PE), a polyacrylate, a polyethersulfone, a polysulfone, a polypropylene (PP), a diacetyl cellulose, a poly(vinyl chloride), an acryl resin (PMMA), a polycarbonate (PC), an epoxy resin, a urea resin, a urethane resin, or a melamine resin; however, the polymer material is not particularly limited to the above materials. In view of the productivity, the thickness of the first base member 4a and that of the second base member 5a are each preferably in a range of 38 to 100 μm; however, the thickness is not limited thereto. The first base member 4a and the second base member 5a each preferably have energy ray transparency. The reason for this is that as describe below, an energy ray curable resin provided between the wavelength-selective reflective layer 3 and the first base member 4a or the second base member 5a can be cured by irradiation of energy rays from the first base member 4a or the second base member 5a side.

The first optical layer 4 and the second optical layer 5 have, for example, transparency. The first optical layer 4 and the second optical layer 5 can be obtained, for example, by curing a resin composition. As the resin composition, in view of the ease of manufacture, an energy ray curable resin to be cured by light, electron rays, or the like or a thermosetting resin to be cured by heat is preferably used. As the energy ray curable resin, a photosensitive resin composition to be cured by light is preferable, and an ultraviolet curable resin composition to be cured by ultraviolet light is most preferable. In order to improve the adhesion between the wavelength-selective reflective layer 3 and the first optical layer 4 or the second optical layer 5, the resin composition preferably further contains a compound containing phosphoric acid, a compound containing succinic acid, and/or a compound containing butyrolactone. As the compound containing phosphoric acid, for example, a (meth)acrylate containing phosphoric acid may be used, and a (meth)acrylic monomer containing phosphoric acid as a functional group or an oligomer thereof may be preferably used. As the compound containing succinic acid, for example, a (meth)acrylate containing succinic acid may be used, and a (meth)acrylic monomer containing succinic acid as a functional group or an oligomer thereof may be preferably used. As the compound containing butyrolactone, for example, a (meth)acrylate containing butyrolactone may be used, and a (meth)acrylic monomer containing butyrolactone as a functional group or an oligomer thereof may be preferably used.

The ultraviolet curable resin composition contains, for example, a (meth)acrylate and a photopolymerization initiator. In addition, if necessary, the ultraviolet curable resin composition may further contain a light stabilizer, a flame retarder, a leveling agent, an antioxidant, and the like.

As the acrylate, a monomer having at least two (meth) acryloyl groups and/or an oligomer thereof is preferably used. As this monomer and/or the oligomer thereof, for example, a urethane (meth)acrylate, an epoxy (meth)acrylate, a polyester (meth)acrylate, a polyol (meth)acrylate, a polyether (meth)acrylate, or a melamine (meth)acrylate may be used. Here, the (meth)acryloyl group indicates one of an acryloyl group and a methacryloyl group. In this embodiment, the oligomer indicates a molecule having a molecular weight in a range of 500 to 60,000.

As the photopolymerization initiator, a compound appropriately selected from common materials may be used. As the common material, for example, a benzophenone derivative, an acetophenone derivative, and an anthraquinone derivative may be used alone or in combination. The amount of the polymerization initiator is preferably in a range of 0.1 to 10 percent by mass in a solid content. When the amount is less than 0.1 percent by mass, photocurability is degraded, and practical industrial production may not be suitably performed. On the other hand, when the amount of the polymerization initiator is more than 10 percent by mass, and the amount of irradiation light is small, an odor tends to remain in a coating film. In this case, the solid content indicates all the components forming a cured hard coat layer. In particular, for example, an acrylate, a photopolymerization initiator, and the like are collectively called the solid content.

A resin to which the structure can be transferred by energy ray irradiation, heat, and the like is preferably used, and as long as the above-described request for the refractive index is satisfied, any type of resin, for example, a heat curable resin or an ionizing radiation curable resin such as a vinyl resin or an epoxy resin, or a thermoplastic resin such as polycarbonate or acrylate may be used.

An oligomer may be added in order to decrease the curing shrinkage. A polyisocyanate or the like may also be included as a curing agent. In addition, in consideration of adhesion to the first optical layer 4 and the second optical layer 5, at least one of a monomer having a hydroxyl group, a carboxyl group, or a phosphoric group; a polyalcohol compound; a carboxylic acid; a silane, an aluminum or a titanium coupling agent; and various chelating agents may also be added.

The resin composition preferably further contains a cross-linking agent. As this cross-linking agent, in particular, a cyclic cross-linking agent is preferably used. The reason for this is that by using a cross-linking agent, heat resistance can be imparted to the resin without considerably changing the storage modulus at room temperature. If the storage modulus at room temperature considerably changes, the optical film 1 will become fragile, and production of the optical film 1 by a roll-to-roll process or the like becomes difficult. As the cyclic cross-linking agent, for example, there may be mentioned dioxane glycol diacrylate, tricyclodecane dimethanol diacrylate, tricyclodecane dimethanol dimethacrylate, ethylene oxide-modified isocyanuric acid diacrylate, ethylene oxide-modified isocyanuric acid triacrylate, or caprolactone-modified tris(acryloxyethyl) isocyanurate.

The first base member 4a or the second base member 5a preferably has a lower water vapor transmission rate than that of the first optical layer 4 or the second optical layer 5. For example, when the first optical layer 4 is formed from an energy ray curable resin, such as a urethane acrylate, the first base member 4a is preferably formed, for example, of a poly(ethylene terephthalate) (PET) having energy ray transmission properties and a lower water vapor transmission rate than that of the first optical layer 4. Accordingly, diffusion of moisture from the incident surface S1 or the emission surface S2 to the wavelength-selective reflective layer 3 can be suppressed, so that degradation of a metal or the like contained in the wavelength-selective reflective layer 3 can be suppressed. Therefore, the durability of the optical film 1 can be improved. In addition, the water vapor transmission rate of a PET having a thickness of 75 μm is approximately 10 g/m2/day (40° C., 90% RH).

It is preferable that at least one of the first optical layer 4 and the second optical layer 5 includes a functional group having high polarity, and that the content thereof in the first optical layer 4 is different from that in the second optical layer 5. It is preferable that the first optical layer 4 and the second optical layer 5 both contain a phosphoric acid compound, (such as a phosphoric ester), and that the content thereof in the first optical layer 4 is different from that in the second optical layer 5. The content of a phosphoric acid compound in the first optical layer 4 is preferably different from that in the second optical layer 5 by two times or more, more preferably 5 times or more, and even more preferably by 10 times or more.

When at least one of the first optical layer 4 and the second optical layer 5 contains a phosphoric acid compound, the wavelength-selective reflective layer 3 preferably contains an oxide, a nitride, or an oxynitride in a surface thereof which is in contact with at least one of the first optical layer 4 and the second optical layer 5 which contains a phosphoric acid compound. In particular, the wavelength-selective reflective layer 3 preferably has a layer containing zinc oxide or a niobium oxide which is in contact with at least one of the first optical layer 4 and the second optical layer 5 which contains a phosphoric acid compound. The reason for this is to improve the adhesion between at least one of these optical layers and the wavelength-selective reflective layer 3.

Since imparting design characteristics to the optical film 1, the window material 10, and the like, at least one of the first optical layer 4 and the second optical layer 5 preferably has properties of absorbing light having a specific wavelength in the visible region. Although a pigment to be dispersed in the resin may be any one of an organic-based pigment and an inorganic-based pigment, in particular, an inorganic pigment having inherent high weather resistance is preferably used. In particular, for example, there may be mentioned inorganic pigments, such as zircon gray (Co, Ni-doped $ZrSiO_4$), praseodymium yellow (Pr-doped $ZrSiO_4$), chromium titanium yellow (Cr, Sb-doped $TiO_2$ or Cr, W-doped $TiO_2$), chrome green (such as $Cr_2O_3$), peacock blue ((CoZn)O (AlCr)$_2O_3$), Victoria green (Al, Cr)$_2O_3$), dark blue (CoO—$Al_2O_3$—$SiO_2$), banadium zirconium blue (V-doped $ZrSiO_4$), chrome tin pink (Cr-doped CaO—$SnO_2$—$SiO_2$), manganese pink (Mn-doped $Al_2O_3$), and salmon pink (Fe-doped $ZrSiO_4$); and organic pigments, such as an azo pigment and a phthalocyanine pigment.

(Wavelength-Selective Reflective Layer)

The wavelength-selective reflective layer 3 is preferably a wavelength-selective reflective layer which selectively directionally reflects light in a specific wavelength band while transmitting light other than that in the specific wavelength band. The reason for this is that when the optical film 1 is adhered to an adherend, such as a window material, light in the specific wavelength band is prevented from entering a predetermined space by directional reflection, and light other than that in the specific wavelength band can be introduced into the predetermined space.

Figure 7A:
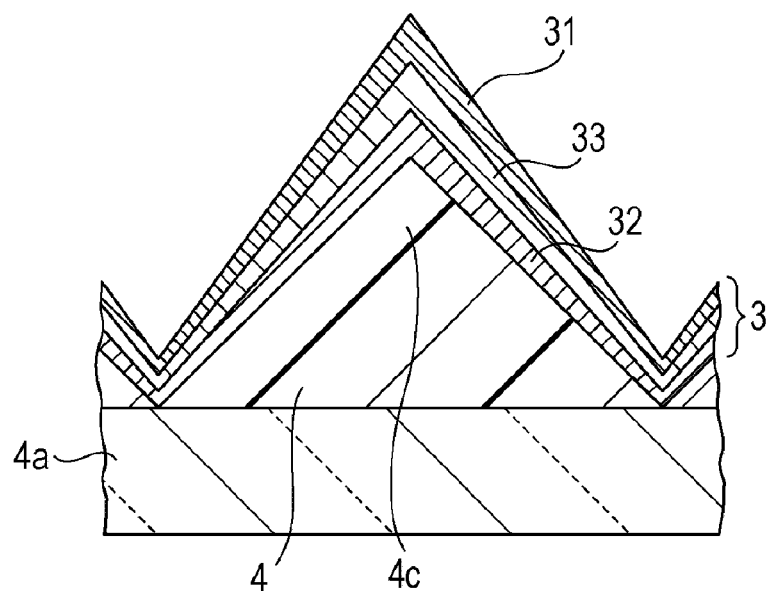
FIGS. 7A and 7B are cross-sectional views each showing one structural example of a wavelength-selective reflective layer of the optical film according to the first embodiment.

FIG. 7A is a cross-sectional view showing one structural example of the wavelength-selective reflective layer 3. As shown in FIG. 7A, the wavelength-selective reflective layer 3 has a laminate structure in which a metal layer 32, a protective layer 33, and a high refractive index layer 31 are sequentially laminated on the concavo-convex surface of the first optical layer 4. In addition, if necessary, at least two of the above laminate structures may be laminated to form the wavelength-selective reflective layer 3. When at least two of the above laminate structures are laminated as described above, the wavelength selectivity can be enhanced.

Figure 7B:
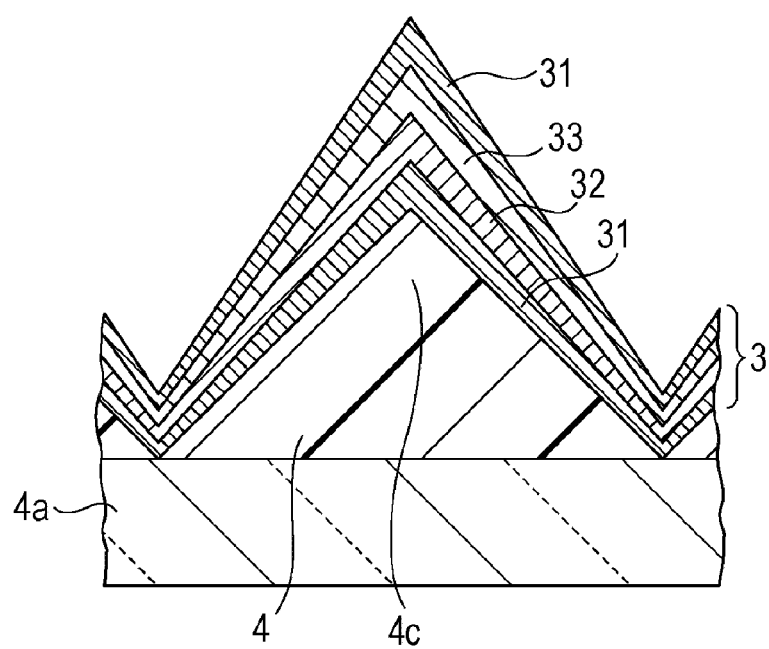

FIG. 7B is a cross-sectional view showing another structural example of the wavelength-selective reflective layer 3. As shown in FIG. 7B, the wavelength-selective reflective layer 3 may further include another high refractive index layer 31 between the concavo-convex surface of the first optical layer 4 and the metal layer 32. When the high refractive index layer 31 is further included as described above, reflection of visible light can be further suppressed.

The refractive index of the high refractive index layer 31 is preferably in a range of 1.7 to 2.6. The refractive index described above is more preferably in a range of 1.8 to 2.6 and even more preferably in a range of 1.9 to 2.6. The reason for this is that the antireflection in the visible region is realizable by a film having a small thickness in which no cracks are likely to be generated. In this case, the refractive index is at a wavelength of 550 nm. The high refractive index layer 31 is a layer containing, for example, a metal oxide as a primary component. As the metal oxide, in order to reduce a stress of the layer and to suppress the generation of cracks, a metal oxide other than zinc oxide is preferably used. In particular, at least one selected from the group consisting of niobium oxide (such as niobium pentoxide), tantalum oxide (such as tantalum pentoxide), and titanium oxide is preferably used. The thickness of the high refractive index layer 31 is preferably in a range of 10 to 120 nm, more preferably in a range of 10 to 100 nm, and even more preferably in a range of 10 to 80 nm. When the thickness is less than 10 nm, visible light tends to be easily reflected. On the other hand, when the thickness is more than 120 nm, a decrease in transmittance and the generation of cracks are liable to occur.

As the metal layer 32, for example, a metal material having a high reflectance in the infrared region may be used. As the metal material described above, for example, an elemental substance, such as Au, Ag, Cu, Al, Ni, Cr, Ti, Pd, Co, Si, Ta, W, Mo, or Ge, or an alloy containing at least two of the elemental substances mentioned above is contained as a primary component. In addition, in consideration of the practicability of the above metal material, a Ag-based, a Cu-based, an Al-based, a Si-based, or a Ge-based metal material is preferably used among those mentioned above. In addition, when an alloy is used as a material for the metal layer 32, the metal layer 32 preferably contains as a primary component AlCu, AlTi, AlCr, AlCo, AlNdCu, AlMgSi, AgPdCu, AgPdTi, AgCuTi, AgPdCa, AgPdMg, AgPdFe, AgNdCu, AgBi, Ag, SiB, or the like. In addition, in order to suppress corrosion of the metal layer 32, a material, such as Ti and/or Nd, is preferably added to the metal layer 32. In particular, when Ag is used as a material for the metal layer 32, the above-mentioned material is preferably added. In addition, the thickness of the metal layer 32 is preferably in a range of 6 to 30 nm, more preferably in a range of 7 to 25 nm, and even more preferably in a range of 8 to 20 nm. When the thickness is less than 6 nm, since the metal of the metal layer 32 becomes in the form of islands or grains, the reflect function thereof tends to degrade. On the other hand, when the thickness is more than 30 nm, the transmittance tends to decrease.

The protective layer 33 is a protective layer which suppresses the degradation of the metal layer 32 in a step of forming the high refractive index layer 31. As the protective layer 33, for example, a ZnO-based oxide primarily composed of a metal oxide containing at least an oxide of Zn is used. As the ZnO-based oxide, for example, at least one selected from the group consisting of zinc oxide (ZnO), gallium (Ga) and aluminum (Al)-doped zinc oxide (GAZO), aluminum (Al)-doped zinc oxide (AZO), and gallium (Ga)-doped zinc oxide (GAZO) may be used. The thickness of the protective layer 33 is preferably in a range of 3 to 30 nm, more preferably in a range of 4 to 20 nm, and even more preferably in a range of 5 to 15 nm. When the thickness is less than 3 nm, the metal layer 32 tends to degrade in the step of forming the high refractive index layer 31. On the other hand, when the thickness is more than 30 nm, cracks are liable to be generated. This layer may also contain at least one dopant, such as aluminum (Al) or gallium (Ga) as described above. The reason for this is that when the high refractive index layer 31, which is a metal oxide layer, is formed by a sputtering method or the like, the film quality and the smoothness are improved.

(Function of Optical Film)

Figure 8A:
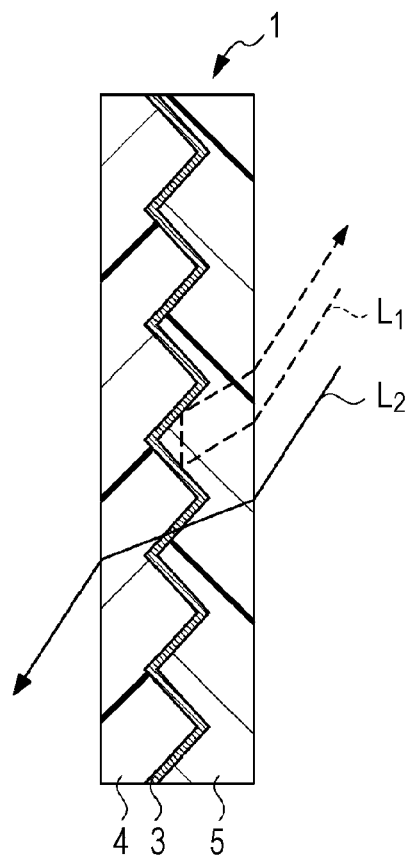
FIGS. 8A and 8B are cross-sectional views each illustrating one example of a function of the optical film.
Figure 8B:
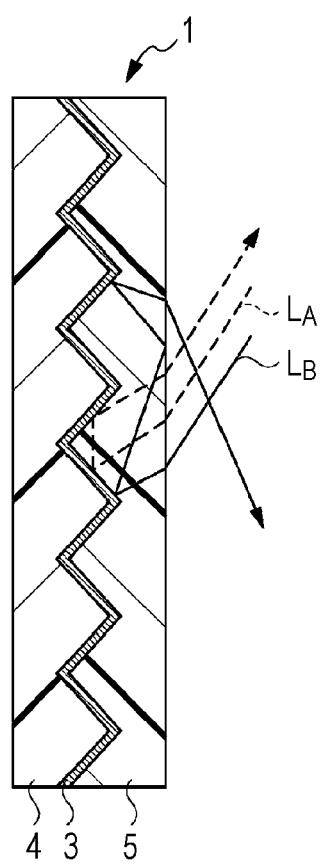

FIGS. 8A and 8B are cross-sectional views each illustrating one example of the function of an optical film. Here, the case in which the structure has a prism shape of an inclined angle of 45° will be described by way of example. As shown in FIG. 8A, although some of near-infrared light $L_1$ of sunlight incident on this optical film 1 is directionally reflected skyward in a direction approximately equivalent to the incident direction, visible light $L_2$ transmits the optical film 1.

In addition, as shown in FIG. 8B, the light incident on the optical film 1 and reflected on the reflective layer surface of the wavelength-selective reflective layer 3 is separated into a component $L_A$ reflected skyward and a component $L_B$ not reflected skyward at a ratio in accordance with the incident angle. In addition, after being specularly reflected at the interface between the second optical layer 5 and air, the component $L_B$ not reflected skyward is finally reflected in a direction different from the incident direction.

When the incident angle of light is represented by α, the refractive index of the first optical layer 4 is represented by n, and the reflectance of the wavelength-selective reflective layer 3 is represented by R, the ratio of the component $L_A$ reflected skyward to all the incident components is represented by the following formula (1).

$$x = (\sin(45-\alpha')+\cos(45-\alpha')/\tan(45+\alpha'))/(\sin(45-\alpha')+\cos(45-\alpha')) \times R2 \quad (1)$$

In the above formula, $\alpha' = \sin^{-1}(\sin \alpha/n)$ holds.

Figure 9A:
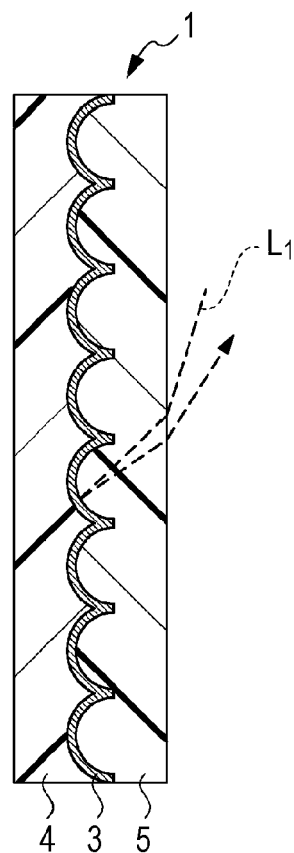
FIG. 9A and FIG. 9B are cross-sectional views each illustrating one example of the function of the optical film.
Figure 9B:
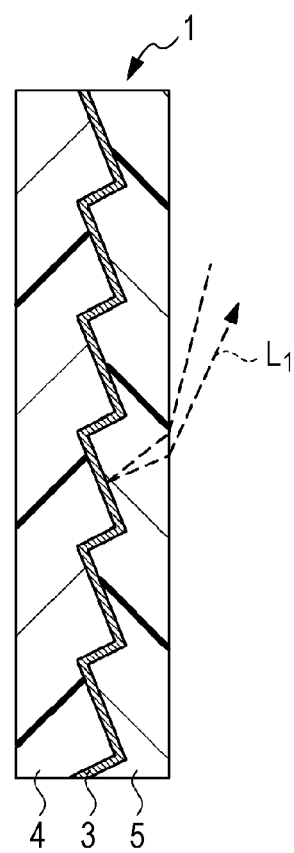

If the ratio of the component $L_B$ not reflected skyward increases, the ratio of the incident light reflected skyward will decrease. In order to increase the ratio of the skyward reflection, appropriate designing of the shape of the wavelength-selective reflective layer 3, that is, appropriate designing of the shape of the structure 4c of the first optical layer 4, is effective. For example, in order to increase the ratio of the skyward reflection, the shape of the structure 4c preferably has the lenticular shape shown in FIG. 5C or the asymmetrical shape shown in FIG. 6A. By the structures described above, although light may not be reflected in the completely same direction as that of the incident light, the ratio of light reflected upward to the light incident above a building window material and the like can be increased. Since one reflection of the incident light by the wavelength-selective reflective layer 3 is enough as shown in FIG. 9A and FIG. 9B, the two shapes shown in FIGS. 5C and 6A can increase a final reflection component as compared to that by the shape as shown in each of FIGS. 8A and 8B in which reflection is performed twice (or 3 times or more). For example, when two-time reflection is used, if the reflectance of the wavelength-selective reflective layer 3 is assumed 80% at a certain wavelength, the skyward reflectance is theoretically 64%, and when the reflection is performed once, the skyward reflectance is 80%.

Figure 10A:
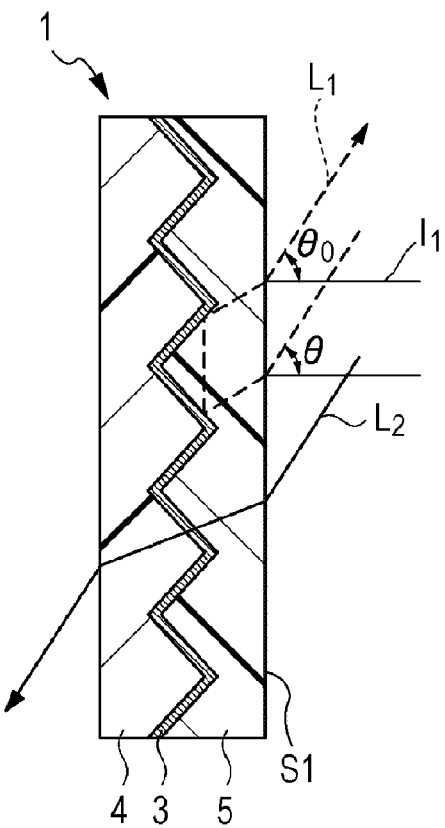
FIG. 10A is a cross-sectional view illustrating one example of the function of the optical film.
Figure 10B:
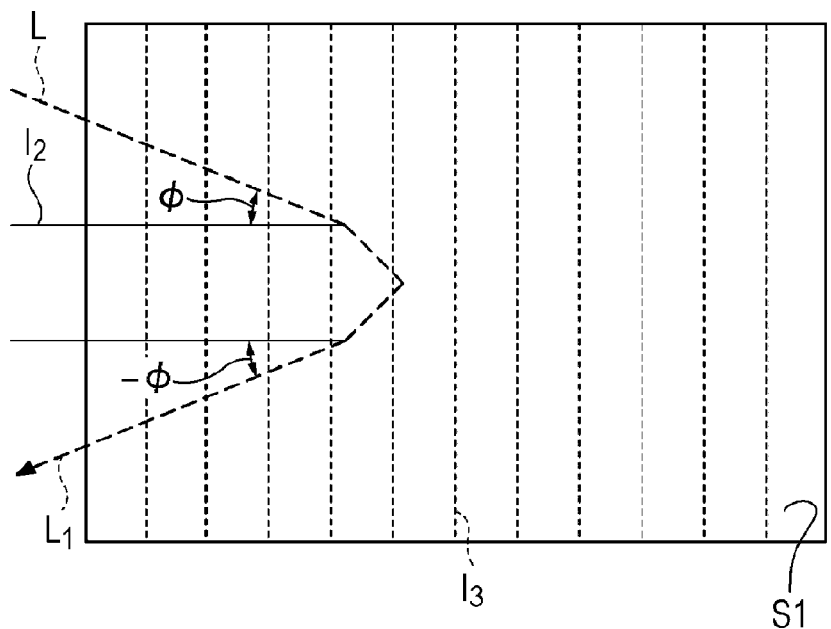
FIG. 10B is a plan view illustrating one example of the function of the optical film.

FIGS. 10A and 10B show the relationship of a ridgeline $l_3$ of the columnar structure 4c with the incident light L and the reflected light $L_1$. It is preferable that of the incident light L incident on the incident surface S1 at an incident angle ($\theta$, $\phi$), the optical film 1 selectively directionally reflects the light $L_1$ in a specific wavelength band in a direction ($\theta o$, $-\phi$) ($0°<\theta o<90°$) while transmitting the light $L_2$ other than that in the specific wavelength band. The reason for this is that when the relationship as described above is satisfied, the light in the specific wavelength band can be reflected skyward. In this case, $\theta$ indicates an angle formed between the normal $l_1$ to the incident surface S1 and the incident light L or the reflected light $L_1$. In addition, $\phi$ indicates an angle formed between the straight line $l_2$ which perpendicularly intersects the ridgeline $l_3$ of the columnar structure 4c in the incident surface S1 and a component of the incident light L or the reflected light $L_1$ which is projected on the incident surface S1. In addition, an angle $\theta$ rotated clockwise around the normal $l_1$ is represented by "+$\theta$", and an angle $\theta$ rotated anticlockwise is represented by "-$\theta$". An angle $\phi$ rotated clockwise around the straight line $l_2$ is represented by "+$\phi$", and an angle $\phi$ rotated anticlockwise is represented by "-$\phi$."

[Manufacturing Apparatus of Optical Film]

Figure 11:
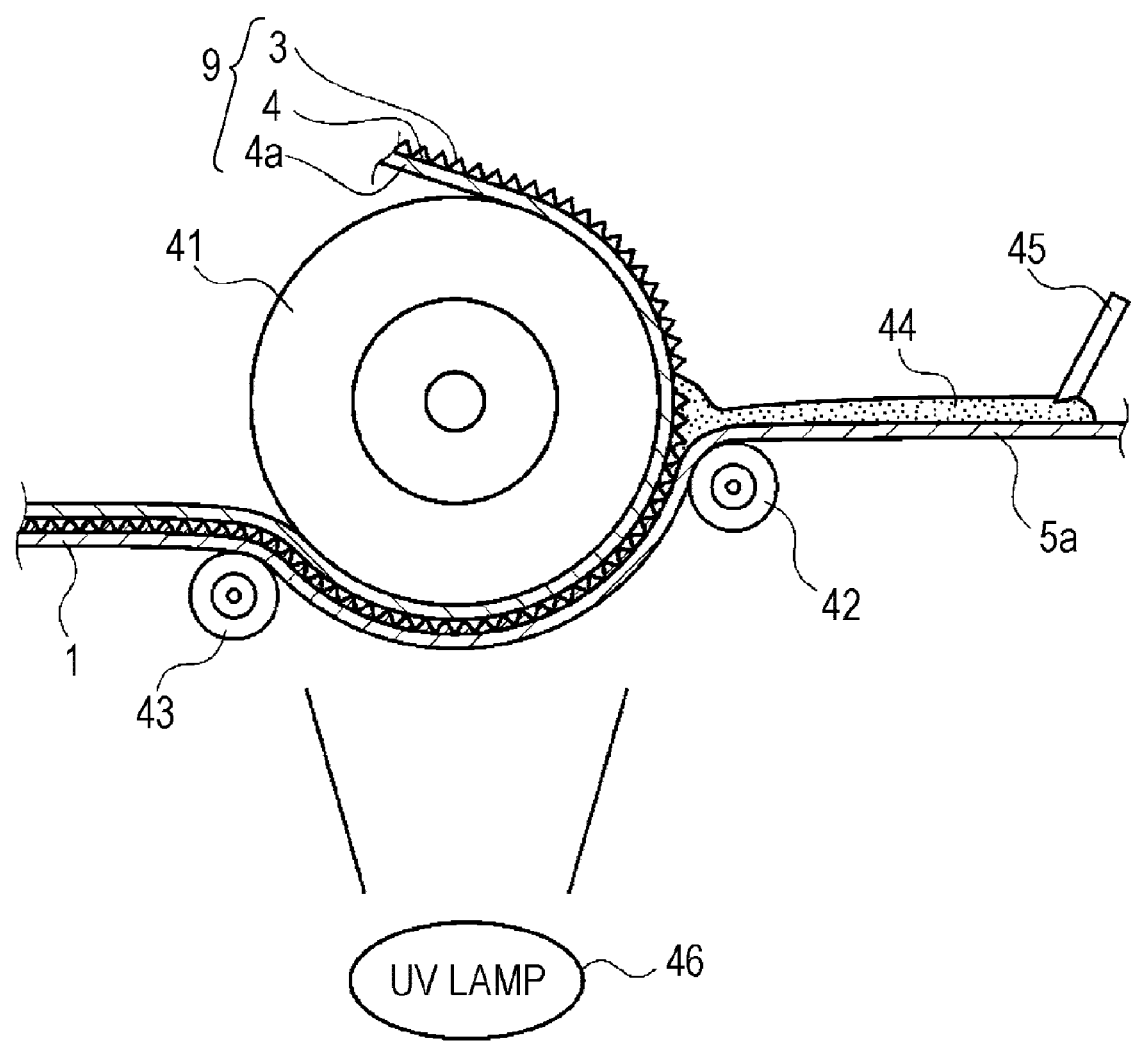
FIG. 11 is a schematic view showing one structural example of a manufacturing apparatus for manufacturing an optical film according to the first embodiment.

FIG. 11 is a schematic view showing one structural example of a manufacturing apparatus for manufacturing an optical film according to the first embodiment. As shown in FIG. 11, this manufacturing apparatus includes laminate rolls 41 and 42, a guide roll 43, a coating device 45, and an irradiation device 46.

The laminate rolls 41 and 42 are arranged so as to nip an optical layer 9 provided with a reflective layer and the second base member 5a. The optical layer 9 provided with a reflective layer is formed by forming the wavelength-selective reflective layer 3 on one primary surface of the first optical layer 4. In addition, as the optical layer 9 provided a reflective layer, the first base member 4a may be formed on a primary surface of the first optical layer 4 other than the surface on which the wavelength-selective reflective layer 3 is formed. In this example, the case is shown in which the wavelength-selective reflective layer 3 is formed on one primary surface of the first optical layer 4, and the first base member 4a is formed on the other primary surface thereof. The guide roll 43 is arranged at a transport path of this manufacturing apparatus so as to transport the belt-shaped optical film 1. Materials for the laminate rolls 41 and 42 and the guide roll 43 are not particularly limited, and in accordance with desired roll properties, for example, a metal, such as stainless steel, a rubber, or a silicone may be appropriately used.

For example, a device having a coating unit, such as a coater, may be used as the coating device 45. As the coater, in consideration of the physical properties and the like of a resin composition to be applied, for example, a gravure coater, a wire bar coater, or a die coater may be appropriately used. The irradiation device 46 is an irradiation device which radiates ionizing rays, such as electron rays, ultraviolet rays, visible rays, or gamma rays. In this example, the case in which a UV lamp which radiates ultraviolet rays is used as the irradiation device 46 is shown.

[Method for Manufacturing Optical Film]

Hereinafter, with reference to FIGS. 11 to 14C, one example of a method for manufacturing an optical film according to the first embodiment will be described. In addition, in consideration of the productivity, a manufacturing process shown below is preferably performed partially or entirely by a roll-to-roll method as shown in FIG. 11. However, the step of forming a mold is performed independently.

Figure 12A:
FIGS. 12A to 12C are cross-sectional views each illustrating one example of a method for manufacturing an optical film according to the first embodiment.
Figure 12B:
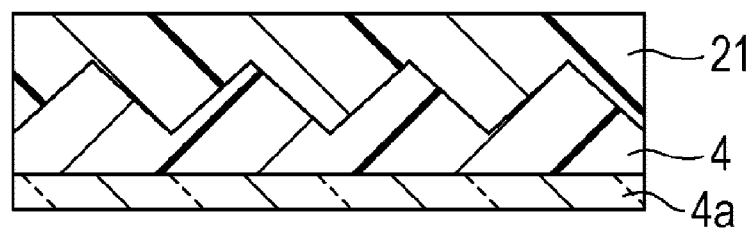

First, as shown in FIG. 12A, a mold 21 having the same concavo-convex shape as that of the structure 4c or a mold (replica) having a reversed shape thereof is formed, for example, by cutting tool processing or laser processing. Next, as shown in FIG. 12B, the concavo-convex shape of the above mold 21 is transferred to a film-shaped resin material, for example, using a melt extrusion method or a transfer method. As the transfer method, for example, there may be mentioned a method in which an energy ray curable resin is poured in a mold and is then cured by irradiation of energy rays, a method in which a shape is transferred to a resin by applying heat and/or pressure thereto, and a method in which a resin film is supplied from a roll, and a mold shape is transferred thereto by applying heat (lamination transfer method). Accordingly, as shown in FIG. 12C, the first optical layer 4 is formed so that one primary surface thereof has the structures 4c.

Figure 12C:
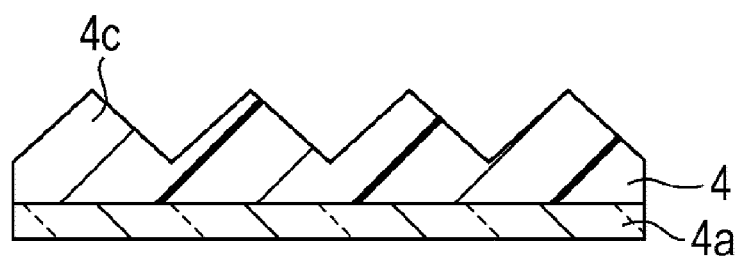

In addition, as shown in FIG. 12C, the first optical layer 4 may be formed on the first base member 4a. In this case, for example, a method is used in which after the film-shaped first base member 4a is supplied from a roll, and an energy ray curable resin is applied on this base member, the resin is pressed on the mold so that the shape thereof is transferred and is cured by irradiation of energy rays. In addition, the resin preferably further contains a cross-linking agent. The reason for this is that heat resistance can be imparted to the resin without considerably changing the storage modulus at room temperature.

Figure 13A:
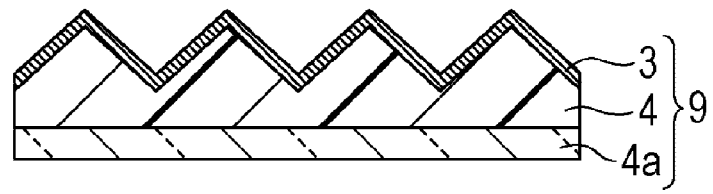
FIGS. 13A to 13C are cross-sectional views each illustrating one example of the method for manufacturing an optical film according to the first embodiment.

Next, as shown in FIG. 13A, the wavelength-selective reflective layer 3 is formed on one primary surface of the first optical layer 4. As a method for forming the wavelength-selective reflective layer 3, for example, a sputtering method, a deposition method, or a CVD (Chemical Vapor Deposition) method may be mentioned.

First, the first optical layer 4 in which the one primary surface thereof has the structures 4c is transported into a vacuum chamber in which a target primarily composed of a metal oxide, such as niobium pentoxide, is provided. Next, the target is sputtered while a process gas is introduced into the vacuum chamber, so that the high refractive index layer 31 is formed on one primary surface (concavo-convex surface) of the first optical layer 4.

Next, the first optical layer 4 provided with the high refractive index layer 31 on one primary surface is transported into a vacuum chamber in which a target primarily composed of a metal material having a high reflectance in the infrared region is provided. Next, while a process gas is introduced into the vacuum chamber, the target is sputtered, so that the metal layer 32 is formed on the high refractive index layer 31.

Next, the first optical layer 4 provided with the metal layer 32 on one primary surface is transported into a vacuum chamber in which a target primarily composed of a ZnO-based oxide is provided. Next, the target is sputtered while a process gas (inert gas) is introduced into the vacuum chamber, so that the protective layer 33 is formed on the metal layer 32. As described above, since the target primarily composed of a Zn-based oxide is sputtered using an inert gas, such as Ar, degradation of the metal layer 32 used as an underlayer can be suppressed.

Next, the first optical layer 4 provided with the protective layer 33 on one primary surface is transported into a vacuum chamber in which a target primarily composed of a metal oxide, such as niobium pentoxide, is provided. Next, the target is sputtered while a process gas is introduced into the vacuum chamber, so that the high refractive index layer 31 is formed on the protective layer 33. Accordingly, the targeted wavelength-selective reflective layer 3 is formed.

Next, if necessary, the metal layer 32, the protective layer 33, and the high refractive index layer 31 may be repeatedly laminated at least twice. In this case, the wavelength-selective reflective layer 3 is formed by laminating at least two repeating units each including the metal layer 32, the protective layer 33, and the high refractive index layer 31.

Figure 13B:
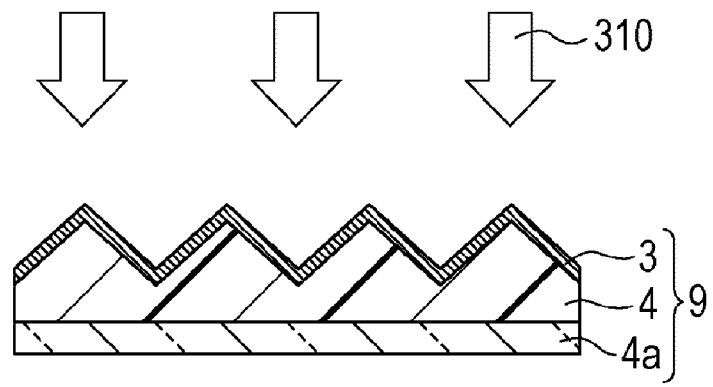
Figure 13C:
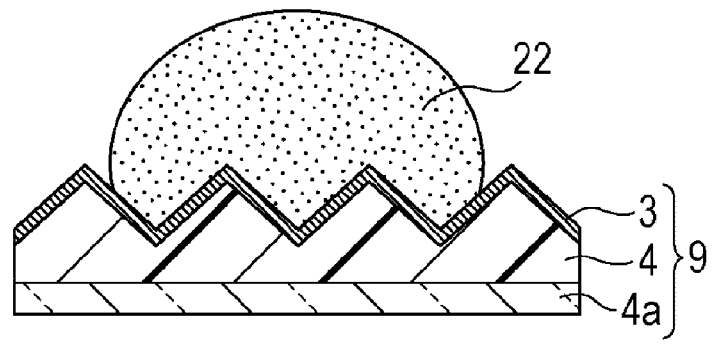
Figure 14A:
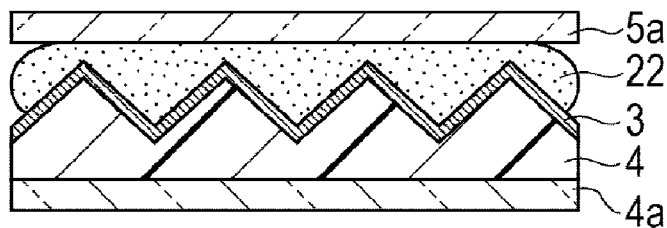
FIGS. 14A to 14C are cross-sectional views each illustrating one example of the method for manufacturing an optical film according to the first embodiment.
Figure 14B:
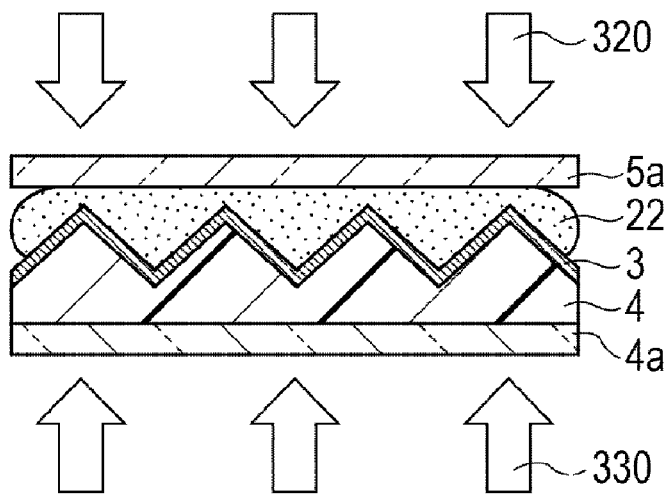
Figure 14C:
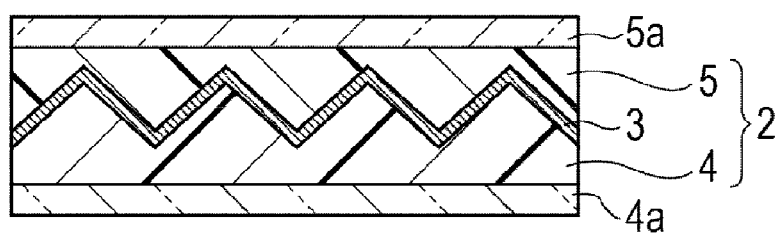

Next, as shown in FIG. 13B, if necessary, an annealing treatment 310 is performed on the wavelength-selective reflective layer 3. The temperature of the annealing treatment is in a range, for example, of 100° C. to 250° C. Next, as shown in FIG. 13C, an uncured resin 22 is applied on the wavelength-selective reflective layer 3. As the resin 22, for example, an energy ray curable resin or a thermosetting resin may be used. As the energy ray curable resin, an ultraviolet curable resin is preferable. Next, as shown in FIG. 14A, a laminate is formed by placing the second base member 5a on the resin 22. Next, as shown in FIG. 14B, while the resin 22 is cured, for example, with irradiation of energy rays 320 or heat application 320, a pressure 330 is applied to the laminate. As the energy rays, for example, electron rays, ultraviolet rays, visible rays, gamma rays, or electron rays may be used, and in view of production facilities, ultraviolet rays are preferable. An accumulated irradiation amount is preferably selected in consideration of curing properties of the resin, suppression of yellowing of the resin and the base members, and the like. The pressure applied to the laminate is preferably in a range of 0.01 to 1 MPa. When the pressure is less than 0.01 MPa, travelling performance of a film may cause a problem. On the other hand, when the pressure is more than 1 MPa, a metal roll is necessarily used as a nip roll, and pressure irregularity may be liable to be generated. Accordingly, as shown in FIG. 14C, the second optical layer 5 is formed on the wavelength-selective reflective layer 3, so that the optical film 1 is obtained.

By using the manufacturing apparatus shown in FIG. 11, a method for forming the optical film 1 will be particularly described. First, the second base member 5a is fed from a base member supply roll (not shown), and this second base member 5a thus fed is allowed to pass under the coating device 45. Next, an ionizing ray curable resin 44 is applied by the coating device 45 on the second base member 5a passing thereunder. Next, the second base member 5a on which the ionizing ray curable resin 44 is applied is transported to the laminate rolls. On the other hand, the optical layer 9 provided with a reflective layer is fed from an optical layer supply roll (not shown) towards the laminate rolls 41 and 42.

Next, the second base member 5a and the optical layer 9 provided with a reflective layer, which are transported, are held between the laminate rolls 41 and 42 so that air bubbles are not trapped between the second base member 5a and the optical layer 9 provided with a reflective layer, and the optical layer 9 provided with a reflective layer is laminated on the second base member 5a. Next, while the second base member 5a on which the optical layer 9 provided with a reflective layer is laminated is transported along a peripheral surface of the laminate roll 41, the ionizing ray curable resin 44 is cured by irradiation of ionizing rays from a second base member 5a side using the irradiation device 46. Accordingly, the second base member 5a and the optical layer 9 provided with a reflective layer are adhered to each other with the ionizing ray curable resin 44 interposed therebetween, so that the targeted long optical film 1 is formed. Next, the belt-shaped optical film 1 thus formed is wound by a winding roll (not shown). As a result, an original fabric formed by winding the belt-shaped optical film 1 is obtained.

When the process temperature for forming the above second optical layer is set to t° C., the cured first optical layer 4 preferably has a storage modulus of $3 \times 10^7$ Pa or more at (t−20)° C. In this case, the process temperature t indicates, for example, a heating temperature of the laminate roll 41. Since the first optical layer 4 is provided, for example, on the first base member 4a and is transported along the laminate roll 41 with the first base member 4a interposed therebetween, it is experientially understood that the temperature actually applied to the first optical layer 4 is approximately (t−20)° C. Therefore, when the storage modulus at (t−20)° C. of the first optical layer 4 is set to $3 \times 10^7$ Pa or more, the concavo-convex shape of the interface inside the optical layer can be suppressed from deformation caused by heating with or without pressure application.

In addition, the first optical layer 4 preferably has a storage modulus of $3 \times 10^9$ Pa or less at 25° C. Accordingly, flexibility can be imparted to the optical film at room temperature. Therefore, the optical film 1 can be formed by a manufacturing process, such as a roll-to-roll process.

In consideration of the heat resistances of resins used for the optical layer and the base members, the process temperature t is preferably 200° C. or less. However, when a resin having high heat resistance is used, the process temperature t may be set to 200° C. or more.

As described above, according to the optical film 1 of the first embodiment, the wavelength-selective reflective layer 3 has the structure in which the metal layer 32, the protective layer 33, and the high refractive index layer 31 are sequentially laminated in this order on the concavo-convex surface of the first optical layer 4. The high refractive index layer 31 is primarily composed of a metal oxide other than zinc oxide. Therefore, the stress of the layer can be reduced, and the generation of cracks can be suppressed. In addition, when the protective layer 33 is formed by a sputtering method using a target primarily composed of a metal oxide, degradation of the metal layer 32 used as an underlayer can be suppressed.

Modified Examples

Hereinafter, modified examples of the above embodiment will be described.

First Modified Example

Figure 15A:
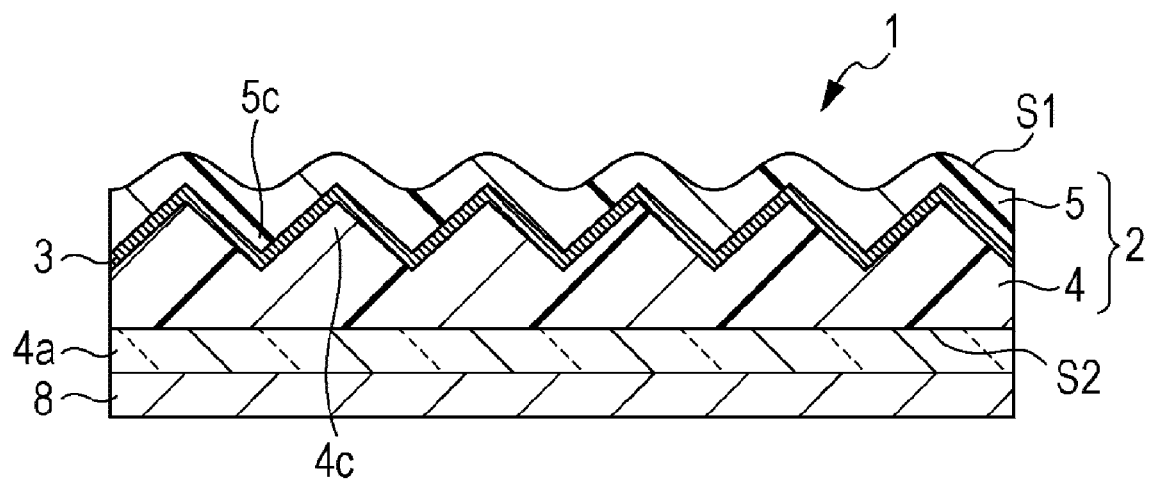
FIG. 15A is a cross-sectional view showing a first modified example according to the first embodiment.

FIG. 15A is a cross-sectional view showing a first modified example according to the first embodiment of the present invention. As shown in FIG. 15A, an optical film 1 according to this first modified example has an incident surface S1 having a concavo-convex shape. The concavo-convex shape of this incident surface S1 and a concavo-convex shape of a first optical layer 4 are formed, for example, so that both the concavo-convex shapes may correspond to each other, and the position of the vertex of each convex portion and the position of the bottom of each concave portion of the incident surface coincide with those of the first optical layer 4. The concavo-convex shape of the incident surface S1 is preferably gentler than the concavo-convex shape of the first optical layer 4.

Second Modified Example

Figure 15B:
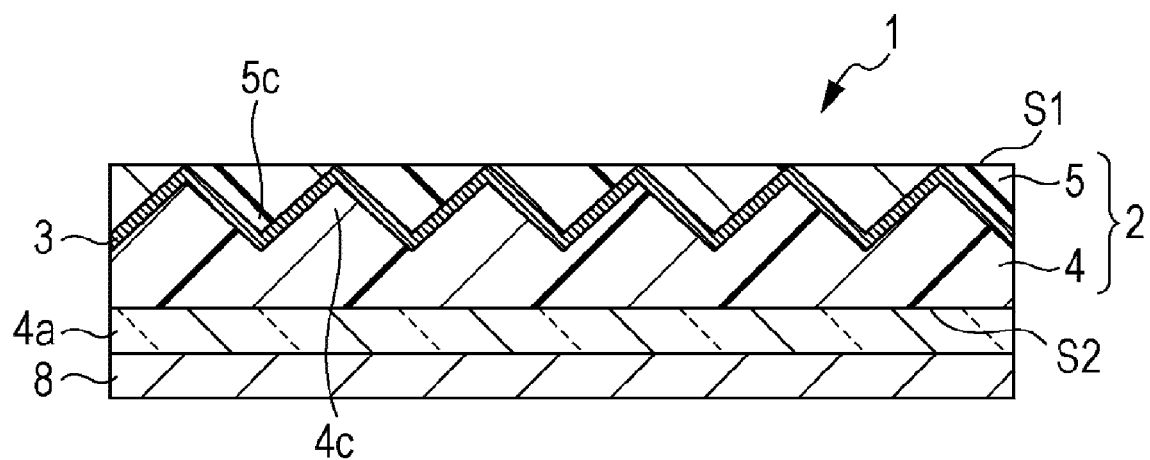
FIG. 15B is a cross-sectional view showing a second modified example according to the first embodiment.

FIG. 15B is a cross-sectional view showing a second modified example according to the first embodiment of the present invention. As shown in FIG. 15B, in an optical film 1 according to this second modified example, the position of the vertex of each convex portion of a concavo-convex surface of a first optical layer 4 on which a wavelength-selective reflective layer 3 is formed is formed to have a height approximately equivalent to the height of an incident surface S1 of the first optical layer 4.

<2. Second Embodiment>

FIGS. 16A to 19B are views each showing an example of the structure of an optical film according to a second embodiment of the present invention. In the second embodiment, elements corresponding to those in the first embodiment are designated by the same reference numerals as those in the first embodiment. In the second embodiment, structures 4c are two-dimensionally arranged in one primary surface of a first optical layer 4, and this is a point different from that of the first embodiment.

Figure 16A:
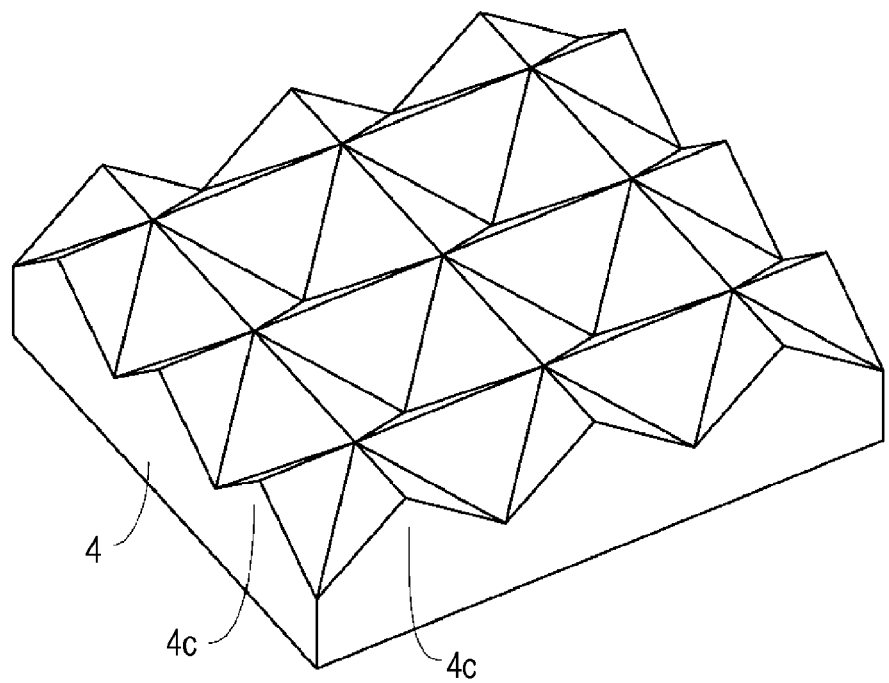
FIG. 16A is a perspective view showing a first structural example of a first optical layer of an optical film according to a second embodiment.
Figure 16B:
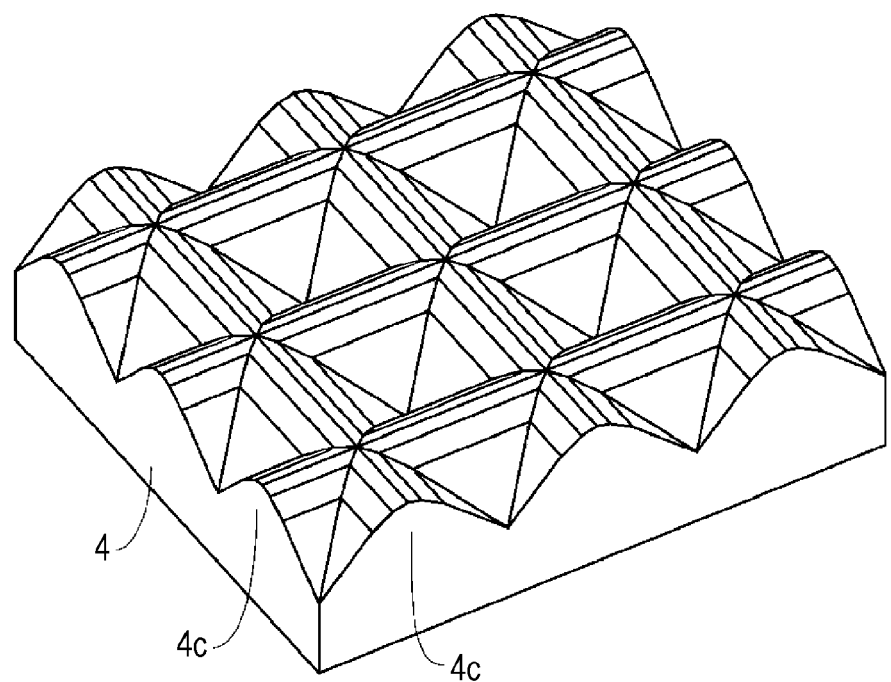
FIG. 16B is a perspective view showing a second structural example of the first optical layer of the optical film according to the second embodiment.

As shown in FIGS. 16A and 16B, for example, one primary surface of the first optical layer 4 is formed so that columnar structures (pillar shaped structures) 4c are arranged to orthogonally intersect each other. In particular, first structures 4c arranged in a first direction and second structures 4c arranged in a second direction perpendicular to the first direction are arranged so as to penetrate each other through side surfaces thereof. For example, the columnar structure 4c is a convex portion or a concave portion having a columnar shape, such as a prism shaper (FIG. 12A) or a lenticular shape (FIG. 12B).

Figure 17A:
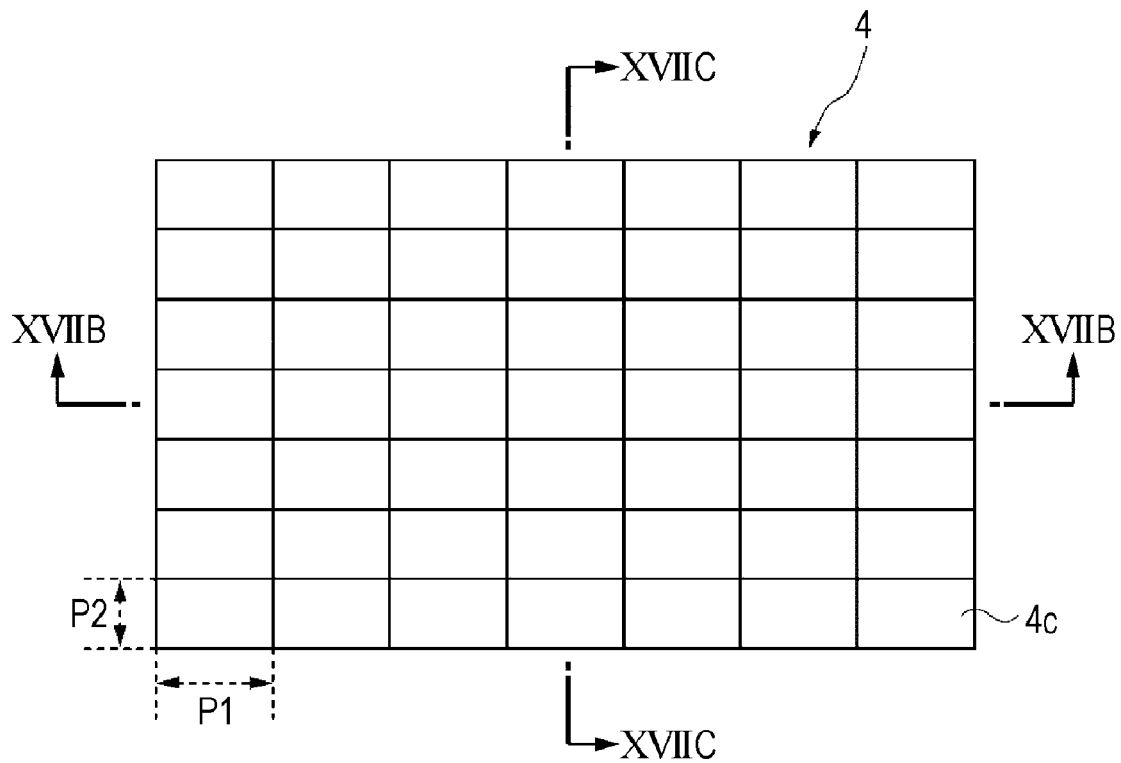
FIG. 17A is a plan view showing a third structural example of the first optical layer of the optical film according to the second embodiment.
Figure 17B:
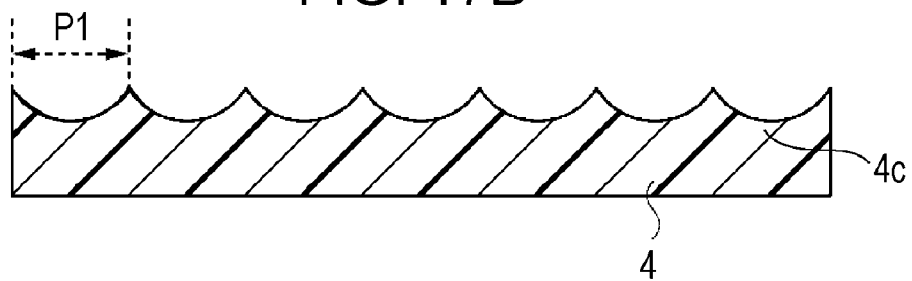
FIG. 17B is a cross-sectional view of the first optical layer shown in FIG. 17A taken along the line XVIIB-XVIIB.
Figure 17C:
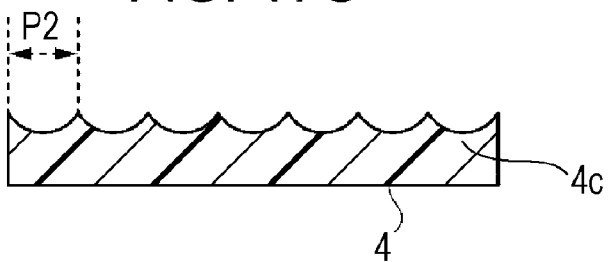
FIG. 17C is a cross-sectional view of the first optical layer shown in FIG. 17A taken along the line XVIIC-XVIIC.
Figure 18A:
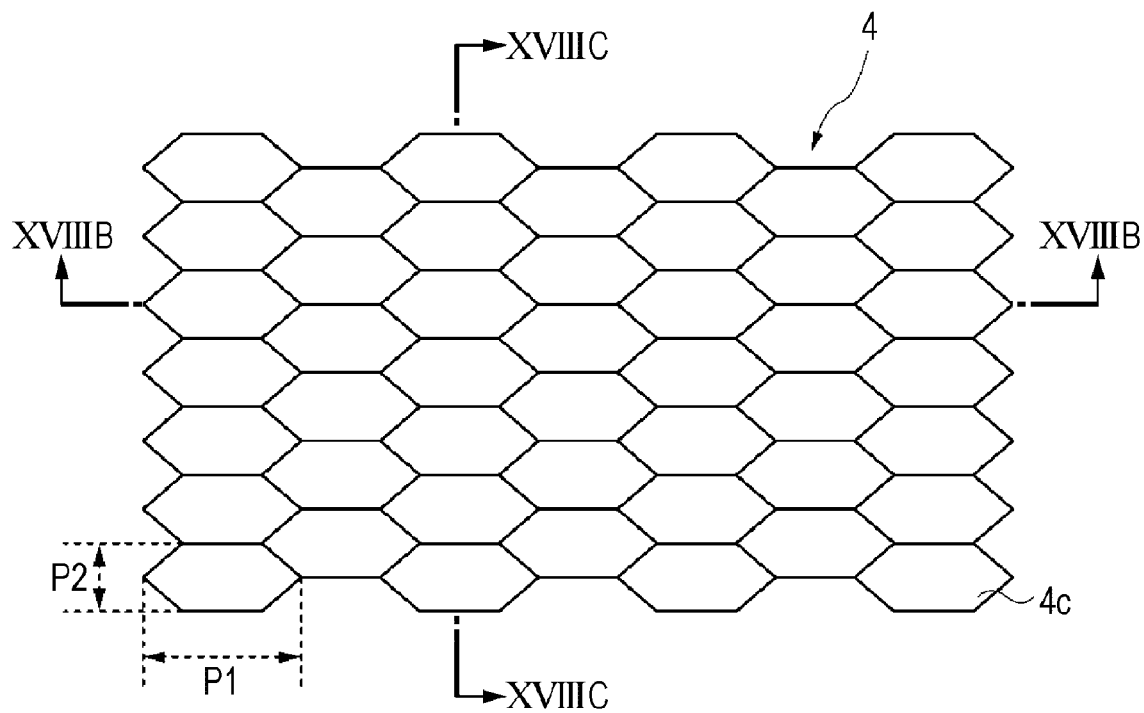
FIG. 18A is a plan view showing a fourth structural example of the first optical layer of the optical film according to the second embodiment.
Figure 18B:
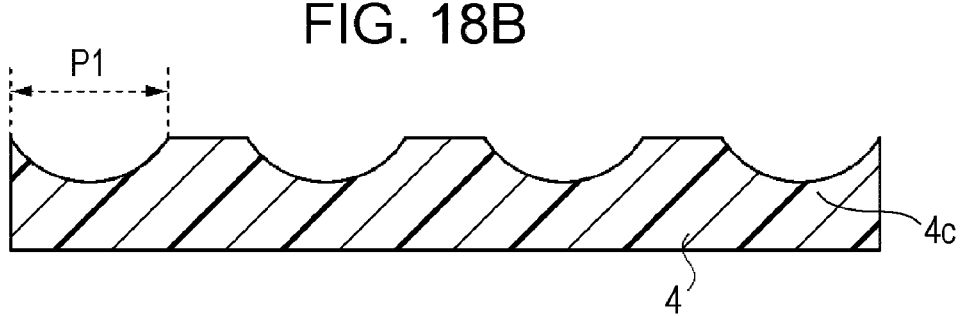
FIG. 18B is a cross-sectional view of the first optical layer shown in FIG. 18A taken along the line XVIIIB-XVIIIB.
Figure 18C:
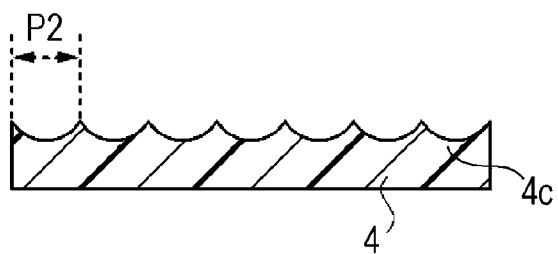
FIG. 18C is a cross-sectional view of the first optical layer shown in FIG. 18A taken along the line XVIIIC-XVIIIC.
Figure 19A:
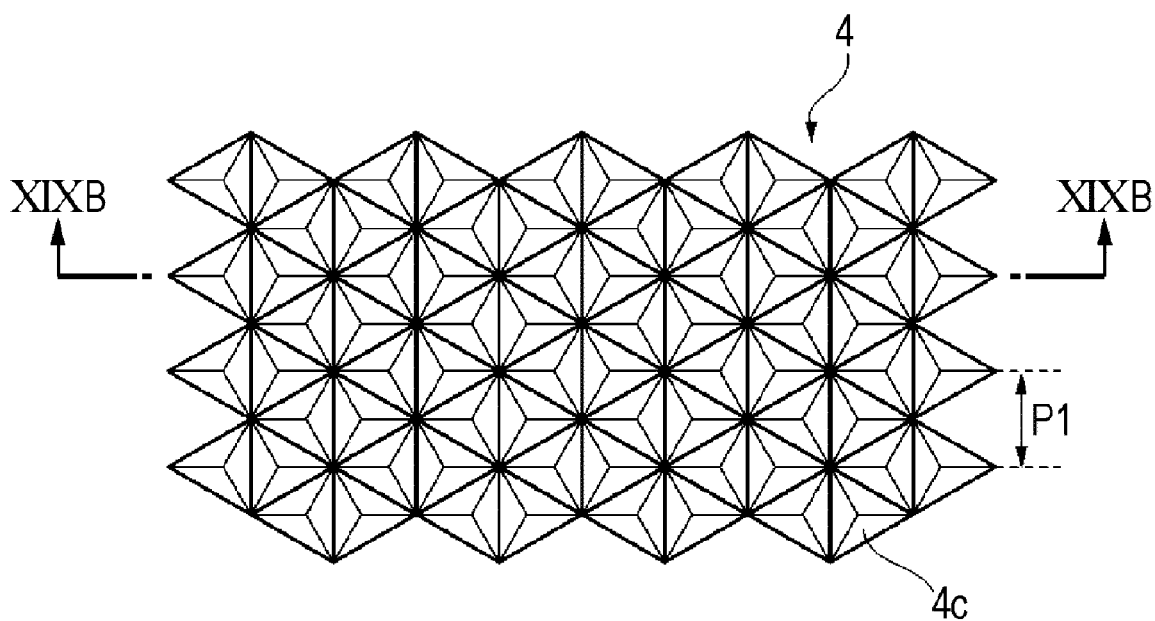
FIG. 19A is a plan view showing a fifth structural example of the first optical layer of the optical film according to the second embodiment.
Figure 19B:
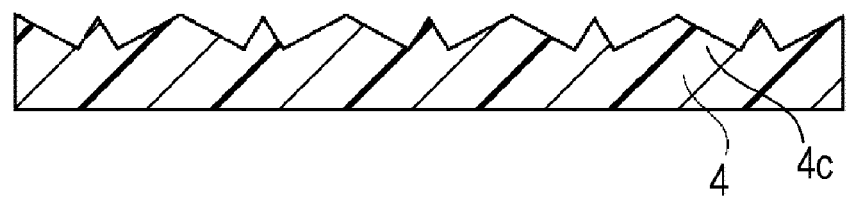
FIG. 19B is a cross-sectional view of the first optical layer shown in FIG. 19A taken along the line XIXB-XIXB.

In addition, for example, structures 4c each having a spherical shape or a corner cube shape may be two-dimensionally arranged in one primary surface of the first optical layer 4 in a closest-packed state so as to form a close-packed array, such as a square close-packed array, a delta close-packed array, or a hexagonal close-packed array. As shown in FIGS. 17A to 17C, for example, the square close-packed array is formed by arranging structures 4c each having a quadrangular bottom surface (such as a square shape) in a square close-packed state. For example, as shown in FIGS. 18A to 18C, the hexagonal close-packed array is formed by arranging structures 4c each having a hexagonal bottom surface in a hexagonal close-packed state. For example, as shown in FIGS. 19A and 19B, the delta close-packed array is formed by arranging structures 4c each having a triangle bottom surface (such as a triangular pyramid) in a closest-packed state.

The structure 4c is a convex portion or a concave portion of a corner cube shape, a hemispherical shape, a semi-ellipsoidal shape, a prism shape, a free-form shape, a polygonal shape, a conical shape, a polygonal pyramid shape, a truncated cone shape, a paraboloidal surface shape, or the like. The bottom of the structure 4c has, for example, a circular shape, an elliptical shape, or a polygonal shape, such as a triangular shape, a quadrangular shape, a hexagonal shape, or an octagonal shape. A pitch P1 and a pitch P2 of the structure 4c are preferably appropriately selected in accordance with desired optical properties. In addition, when the primary axis of the structure 4c is inclined with respect to the normal orthogonal to an incident surface of an optical film 1, it is preferable that the primary axis of the structure 4c is inclined in at least one arrangement direction of the two-dimensional arrangement of the structures 4c. When the optical film 1 is adhered on a window material arranged in a direction approximately perpendicular to the ground, it is preferable that the primary axis of the structure 4c is inclined to a lower side of the window material (ground side) with respect to the normal.

When the structure 4c has a corner cube shape, if a ridgeline R is large, the primary axis is preferably inclined skyward, and in order to suppress downward reflection, the primary axis is preferably inclined to the ground side. Since being obliquely incident on a film, sunlight is not likely to reach the back of the structure, and hence, the shape thereof at an incident light side is important. That is, when R of a ridgeline portion is large, the amount of retroreflection light is decreased, and hence, by inclining the primary axis skyward, this phenomenon can be suppressed. In addition, in the corner cube body, when reflection is performed three times at a reflection surface, the retroreflection can be realized; however, light partially leak in a direction other than that of the retroreflection when reflection is performed twice. By inclining the corner cube to the ground side, a large part of this leakage light can be returned skyward. As described above, in accordance with the shape and/or the purpose, the primary axis may be inclined in any direction.

<3. Third Embodiment>

In a third embodiment, light having a specific wavelength is directionally reflected, light having a wavelength other than the specific wavelength is scattered, and this is a point different from that of the first embodiment. An optical film 1 includes a light scattering material scattering incident light. This scattering material is provided, for example, at least one of places located on a surface of an optical layer 2, in the optical layer 2, and between a wavelength-selective reflective layer 3 and the optical layer 2. The light scattering material is preferably provided at least one of places located between the wavelength-selective reflective layer 3 and a first optical layer 4, in the first optical layer 4, and on the surface thereof. When being adhered to a support member, such as a window material, the optical film 1 may be applied to either an indoor side or an outdoor side. When the optical film 1 is adhered to the outdoor side, a light scattering material scattering light having a wavelength other than the specific wavelength is preferably provided only between the wavelength-selective reflective layer 3 and the support member, such as a window material. The reason for this is that when the light scattering material is present between the wavelength-selective reflective layer 3 and an incident surface, directional reflection properties are lost. In addition, when the optical film 1 is adhered to the indoor side, the light scattering material is preferably provided between the wavelength-selective reflective layer 3 and an emission surface opposite to the adhesion surface.

Figure 20A:
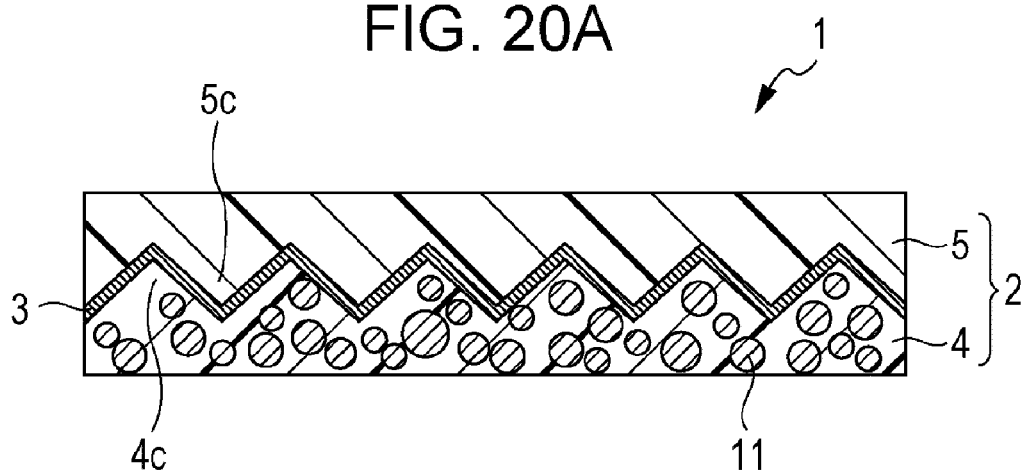
FIG. 20A is a cross-sectional view showing a first structural example of an optical film according to a third embodiment.

FIG. 20A is a cross-sectional view showing a first structural example of the optical film 1 according to the third embodiment of the present invention. As shown in FIG. 20A, the first optical layer 4 contains a resin and fine particles 11. The fine particles 11 have a different refractive index from that of the resin which is a primary component of the first optical layer 4. As the fine particles 11, for example, at least one type of organic particles and inorganic particles may be used. In addition, hollow fine particles may also be used as the fine particles 11. As the fine particles 11, for example, inorganic particles, such as silica or alumina, or organic particles, such as a polystyrene, an acrylic resin, or a copolymer thereof, may be mentioned, and silica fine particles are particularly preferable.

Figure 20B:
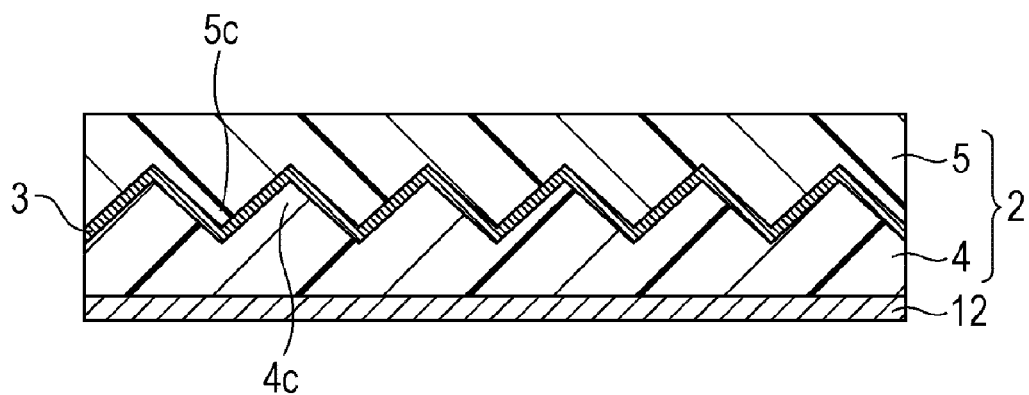
FIG. 20B is a cross-sectional view showing a second structural example of the optical film according to the third embodiment.

FIG. 20B is a cross-sectional view showing a second structural example of the optical film 1 according to the third embodiment of the present invention. As shown in FIG. 20B, the optical film 1 further includes a light diffusion layer 12 on the surface of the first optical layer 4. The light diffusion layer 12 contains, for example, a resin and fine particles. As the fine particles, the same particles as those described above may be used.

Figure 20C:
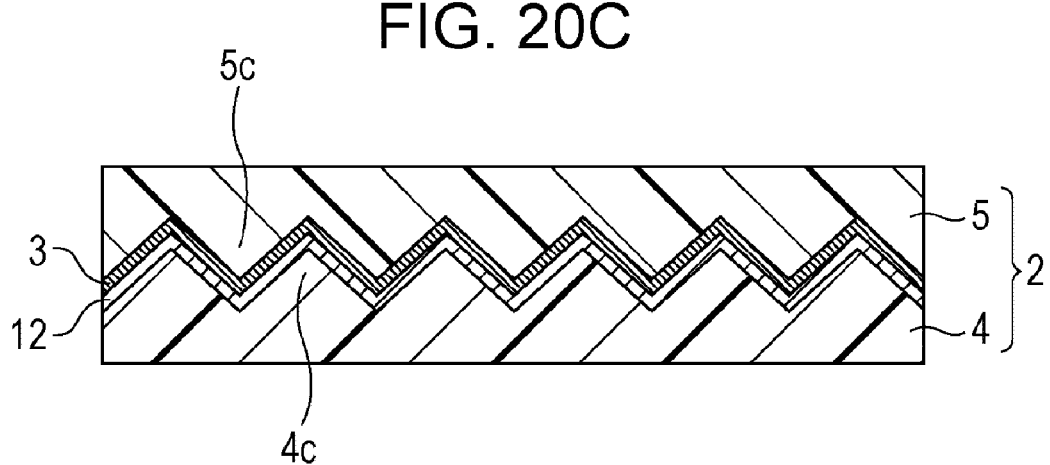
FIG. 20C is a cross-sectional view showing a third structural example of the optical film according to the third embodiment.

FIG. 20C is a cross-sectional view showing a third structural example of the optical film 1 according to the third embodiment of the present invention. As shown in FIG. 20C, the optical film 1 further includes a light diffusion layer 12 between the wavelength-selective reflective layer 3 and the first optical layer 4. The light diffusion layer 12 contains, for example, a resin and fine particles. As the fine particles, the same particles as those described above may be used.

According to the third embodiment, light, such as infrared light, having a specific wavelength can be directionally reflected, and light, such as visible light, having a wavelength other than the specific wavelength, can be scattered. Therefore, when the optical film 1 is made clouded as described above, design characteristics may be imparted thereto.

<4. Fourth Embodiment>

According to this embodiment, a self-cleaning effect layer (not shown) having a cleaning effect is further provided on an incident surface of an optical film 1. The self-cleaning effect layer contains, for example, a photocatalyst. As the photocatalyst, for example, $TiO_2$ may be used.

As described above, light in a specific wavelength band is partially reflected by the optical film 1. For example, when the optical film 1 is used outdoors or in a very dirty room, light is scattered by dust attached to the surface of the optical film 1, and directional reflection properties thereof will be lost; hence, the surface of the optical film 1 preferably maintains optically transparency at any time. Therefore, it is preferable that the surface is excellent, for example, in water-repellent or hydrophilic properties and automatically exhibits a cleaning effect.

According to this embodiment, since the self-cleaning effect layer is formed on the incident surface of the optical film 1, for example, water-repellent or hydrophilic properties can be imparted to the incident surface. Therefore, adhesion of stains or the like to the incident surface is suppressed, and degradation in directional reflection properties can be suppressed.

EXAMPLES

Hereinafter, although the present invention will be particularly described with reference to the examples, the present invention is not limited only to these examples.

Example 1

Figure 21A:
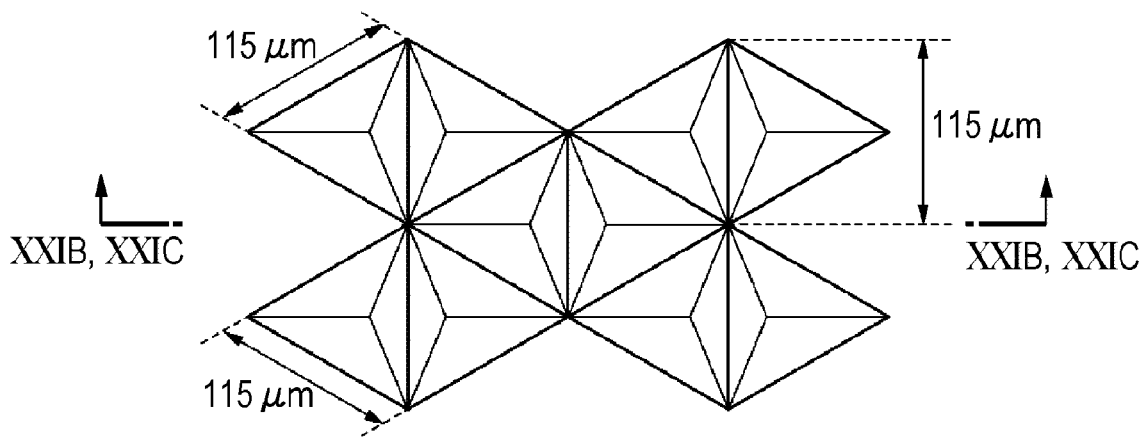
FIG. 21A is a plan view showing the shape of a mold master for forming optical films of Examples 1 to 8 and Comparative Examples 1 to 5.
Figure 21B:
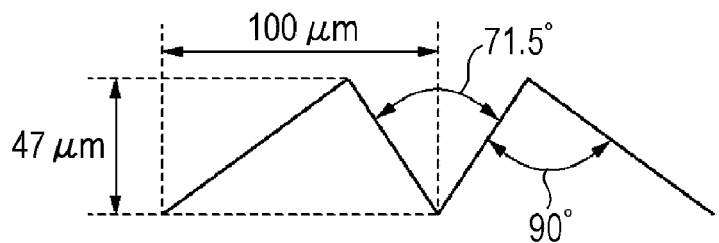
FIGS. 21B and 21C are each a cross-sectional view of the mold master shown in FIG. 21A taken along the line XXIB, XXIC-XXIB, XXIC.
Figure 21C:
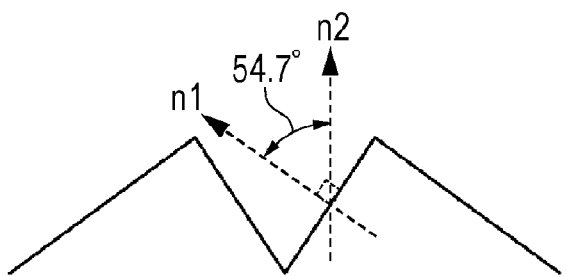

First, a mold roll made from Ni—P having fine triangular pyramid shapes shown in FIGS. 21A to 21C was formed by machining using a cutting tool. Next, after a urethane acrylate resin (Aronix, refractive index after curing: 1.533, manufactured by Toagosei Company, Limited) was applied on a PET film (A4300, manufactured by Toyobo Co., Ltd.) having a thickness of 75 μm and was cured by irradiation of UV light from a PET film side while being in close contact with the mold roll, a laminate of the resin and the PET was peeled off from the mold roll. Accordingly, a resin layer (hereinafter, referred as a shaped resin layer) having triangular pyramid shapes was formed on the PET film. Next, a wavelength-selective reflective layer having a film thickness structure shown in Table 1 was formed by a sputtering method on the surface having the triangular pyramid shapes formed by the mold roll. A protective layer was formed by a direct current pulse sputtering method using a GAZO oxide target containing $Ga_2O_3/Al_2O_3/ZnO=0.57/0.31/99.12$ at % (on an atomic percent basis), which was formed by doping ZnO with $Ga_2O_3$ and $Al_2O_3$, and 100% of an argon gas as a sputtering gas. A metal layer was formed by a direct current sputtering method using an alloy target containing $Ag/Nd/Cu=99.0/0.4/0.6$ at % and 100% of an argon gas as a sputtering gas. A high refractive index layer was formed by a direct current pulse sputtering method using a $Nb_2O_5$ ceramic target and a mixed gas atmosphere containing an argon gas and an oxygen gas in an amount of 20% with respect to the amount of the argon gas as a sputtering gas. The transmission image clarities measured using optical combs were 68 at a width of 0.125 mm, 83 at a width of 0.5 mm, 91 at a width of 1.0 mm, 97 at a width of 2.0 mm, and 339 as the total. Accordingly, a targeted optical film was obtained. In addition, as for the transmission image clarity, the transparency obtained in each of the following other examples was equivalent to that obtained in Example 1.

Example 2

An optical film was obtained in a manner similar to that in Example 1 except that the film thickness structure of the wavelength-selective reflective layer was formed as shown in Table 1.

Example 3

An optical film was obtained in a manner similar to that in Example 1 except that the film thickness structure of the wavelength-selective reflective layer was formed as shown in Table 1.

Example 4

An optical film was obtained in a manner similar to that in Example 1 except that the film thickness structure of the wavelength-selective reflective layer was formed as shown in Table 1. In addition, in order to form the metal layer, an alloy target containing $Ag/Bi=99.0/1.0$ at % was used.

Example 5

An optical film was obtained in a manner similar to that in Example 1 except that the film thickness structure of the wavelength-selective reflective layer was formed as shown in Table 1. In addition, in order to form the metal layer, an alloy target containing Ag/Pd/Cu=99.0/0.4/0.6 at % was used.

Example 6

An optical film was obtained in a manner similar to that in Example 1 except that the film thickness structure of the wavelength-selective reflective layer was formed as shown in Table 1. In addition, the high refractive index layer was formed by a direct current pulse sputtering method using a metal target of Ta and a mixed gas atmosphere containing an argon gas and an oxygen gas in an amount of 18% with respect to the amount of the argon gas as a sputtering gas.

Example 7

An optical film was obtained in a manner similar to that in Example 1 except that the film thickness structure of the wavelength-selective reflective layer was formed as shown in Table 1.

Example 8

An optical film was obtained in a manner similar to that in Example 1 except that the film thickness structure of the wavelength-selective reflective layer was formed as shown in Table 1.

Comparative Example 1

An optical film was obtained in a manner similar to that in Example 1 except that the film thickness structure of the wavelength-selective reflective layer was formed as shown in Table 1.

Comparative Example 2

An optical film was obtained in a manner similar to that in Example 1 except that the film thickness structure of the wavelength-selective reflective layer was formed as shown in Table 1. In addition, the high refractive index layer was formed by a direct current pulse sputtering method using a ZnO target and 100% of an argon gas as a sputtering gas.

Comparative Example 3

An optical film was obtained in a manner similar to that in Example 1 except that the film thickness structure of the wavelength-selective reflective layer was formed as shown in Table 1.

Comparative Example 4

An optical film was obtained in a manner similar to that in Example 1 except that the film thickness structure of the wavelength-selective reflective layer was formed as shown in Table 1. In addition, the protective layer was formed by a direct current sputtering method using a metal target of Ta and 100% of an argon gas as a sputtering gas.

Comparative Example 5

An optical film was obtained in a manner similar to that in Example 1 except that the film thickness structure of the wavelength-selective reflective layer was formed as shown in Table 1. In addition, the protective layer was formed by a direct current sputtering method using a metal target of Ta and 100% of an argon gas as a sputtering gas.

Cracks, spectral properties, and oxidation of the metal layer of each of the optical films obtained in Examples and Comparative Examples were evaluated as described below.

(Crack Evaluation)

Figure 23A:
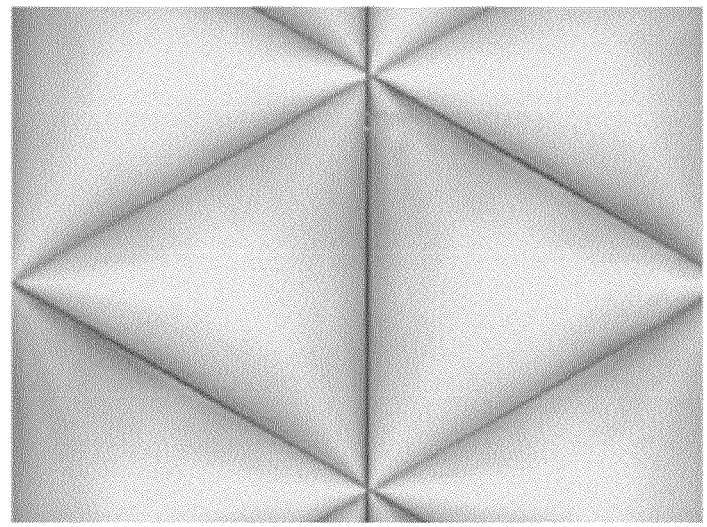
FIG. 23A is a top view showing an observation result of a wavelength-selective reflective layer of the optical film of Example 1.
Figure 23B:
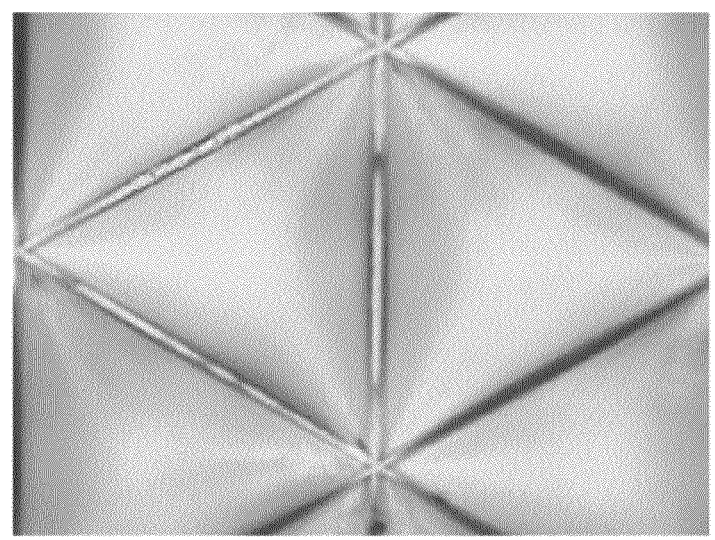
FIG. 23B is a top view showing an observation result of a wavelength-selective reflective layer of the optical film of Comparative Example 1.
Figure 24A:
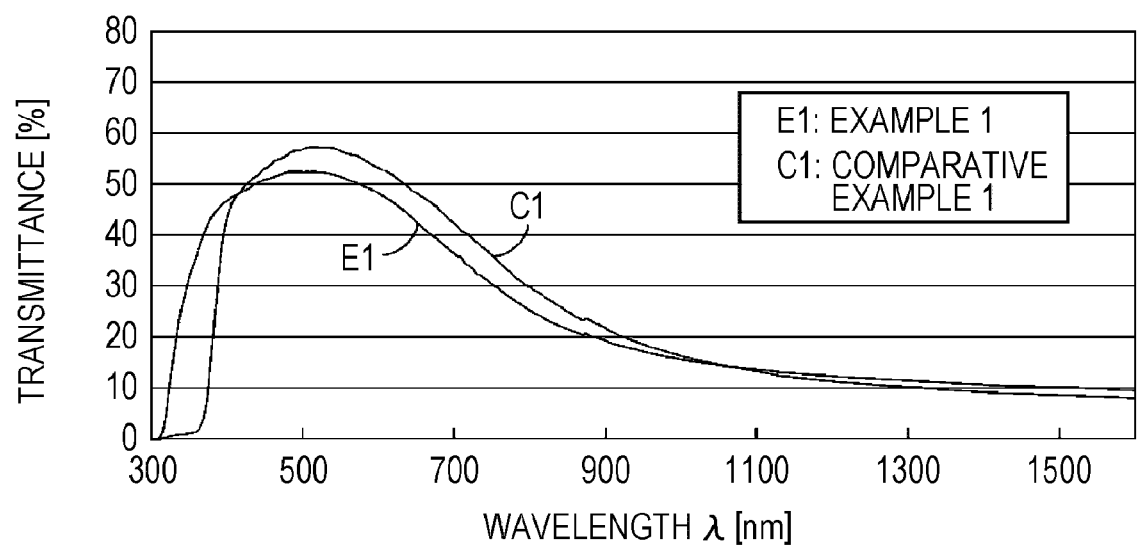
FIG. 24A is a graph showing transmission properties of the optical films of Example 1 and Comparative Example 1.
Figure 24B:
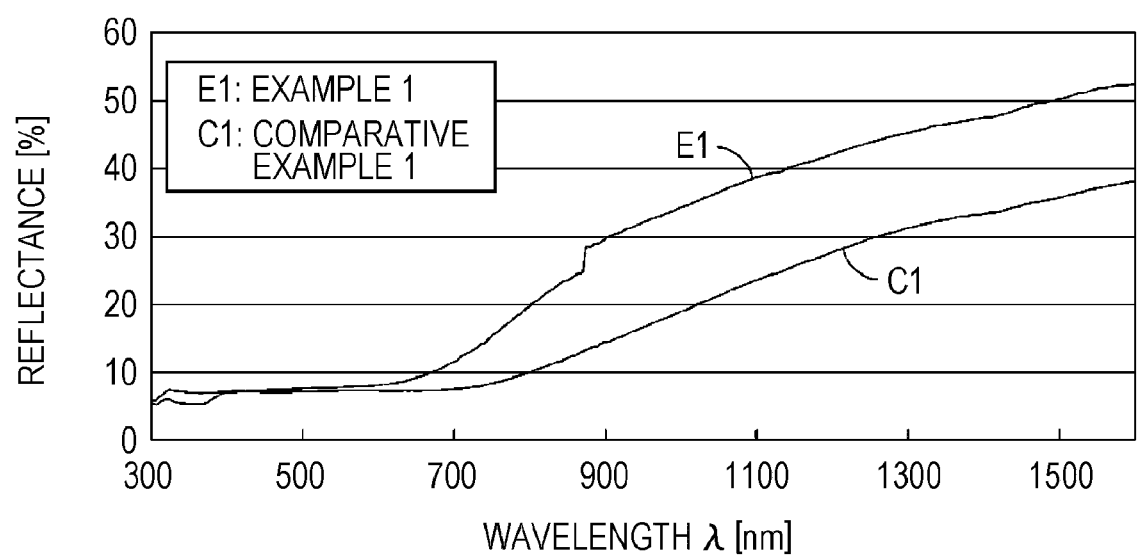
FIG. 24B is a graph showing reflection properties of the optical films of Example 1 and Comparative Example 1.
Figure 25A:
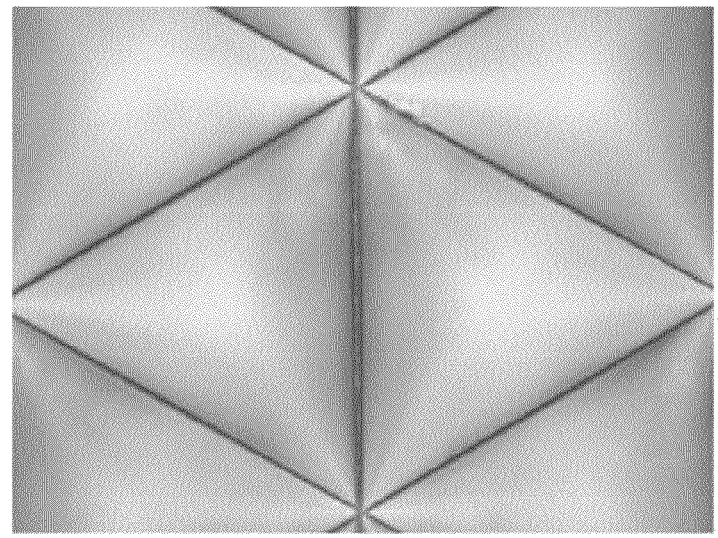
FIG. 25A is a top view showing an observation result of a wavelength-selective reflective layer of the optical film of Comparative Example 2.
Figure 25B:
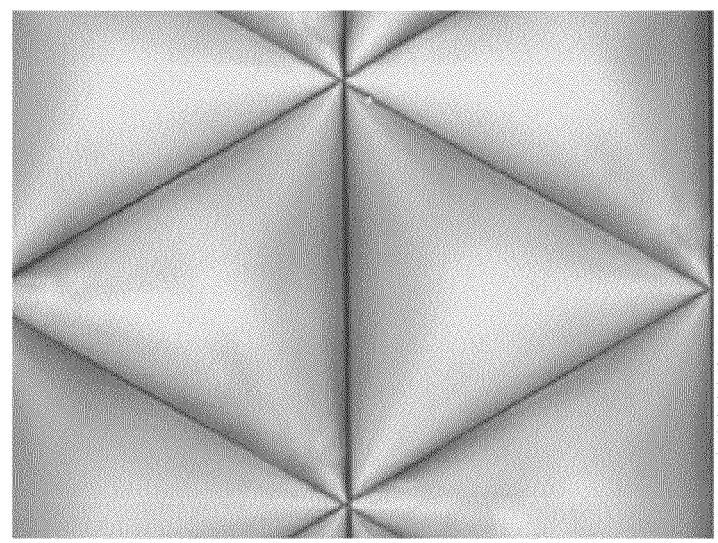
FIG. 25B is a top view showing an observation result of a wavelength-selective reflective layer of the optical film of Example 2.
Figure 26A:
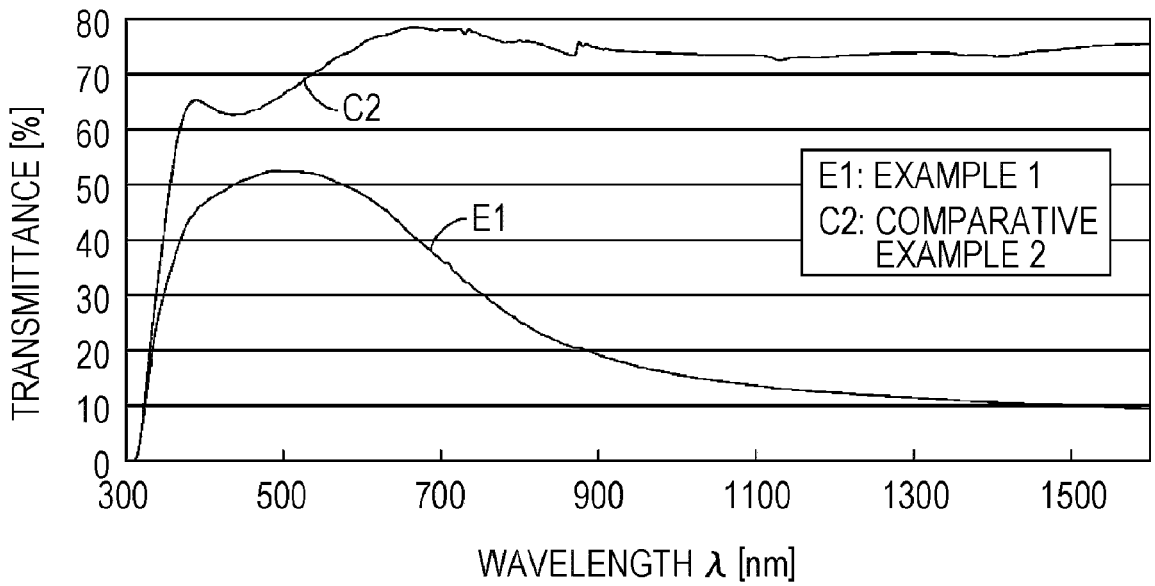
FIG. 26A is a graph showing transmission properties of the optical films of Example 1 and Comparative Example 2.
Figure 26B:
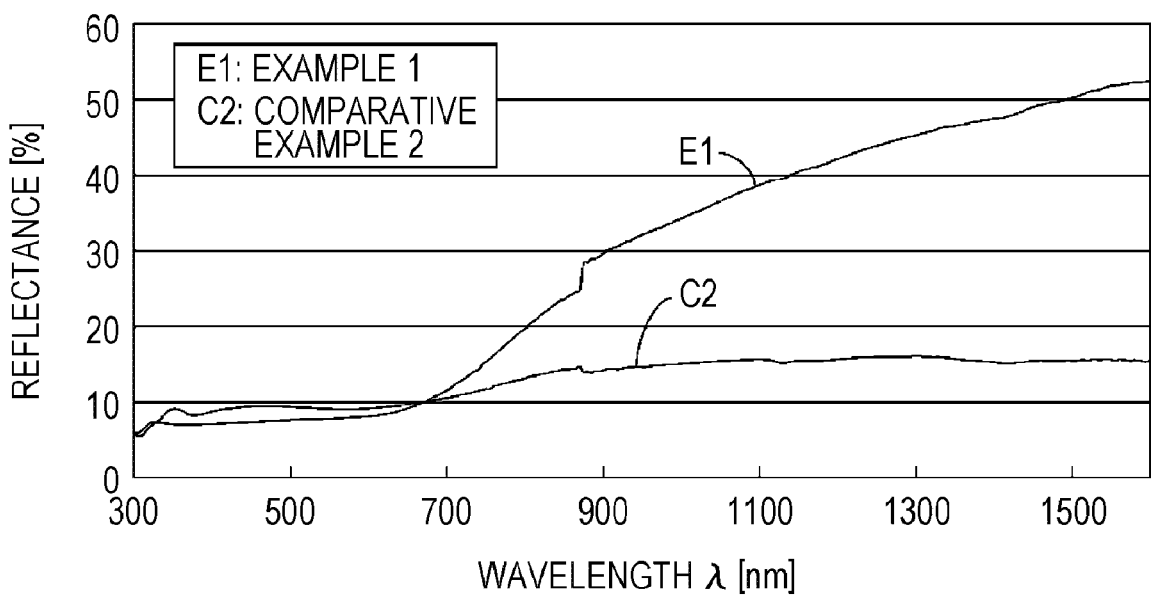
FIG. 26B is a graph showing reflection properties of the optical films of Example 1 and Comparative Example 2.
Figure 27A:
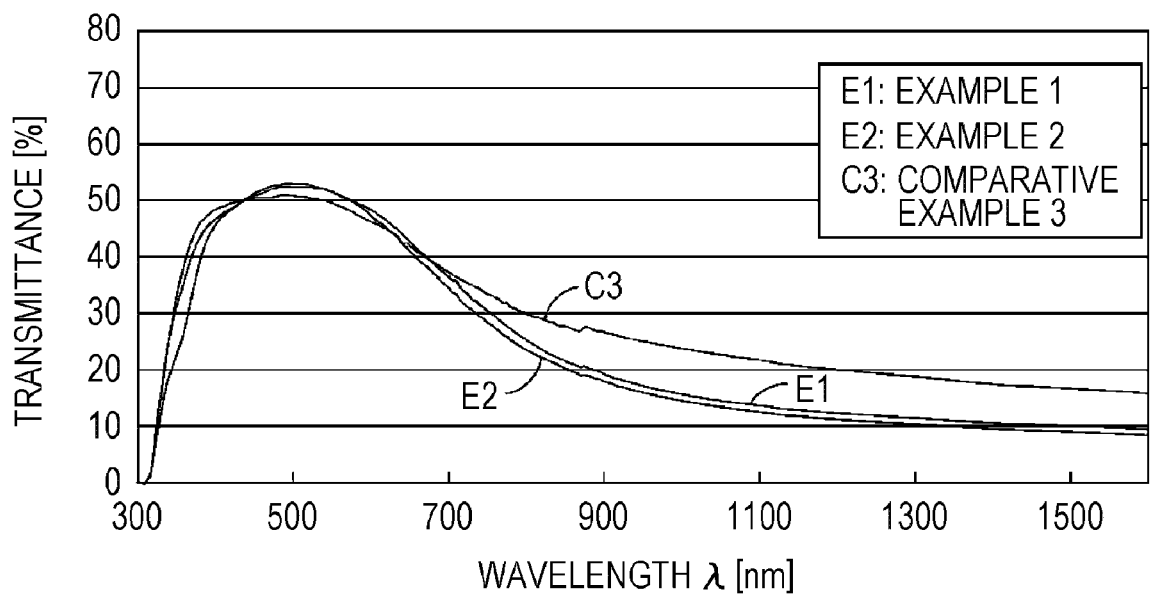
FIG. 27A is a graph showing transmission properties of the optical films of Example 1, Example 2, and Comparative Example 3.
Figure 27B:
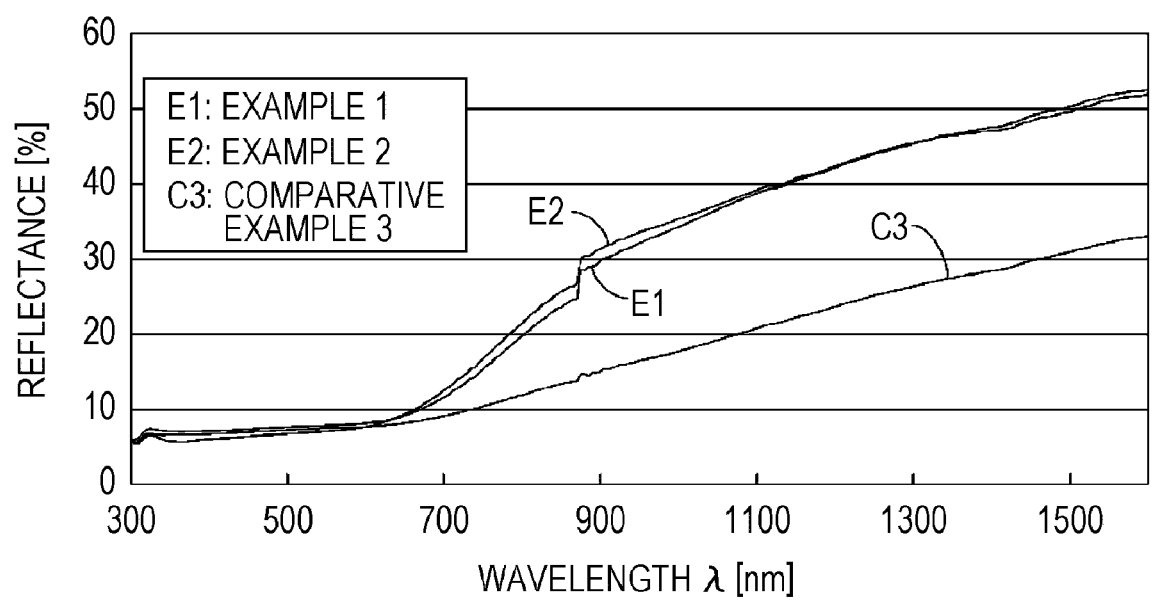
FIG. 27B is a graph showing reflection properties of the optical films of Example 1, Example 2, and Comparative Example 3.
Figure 28A:
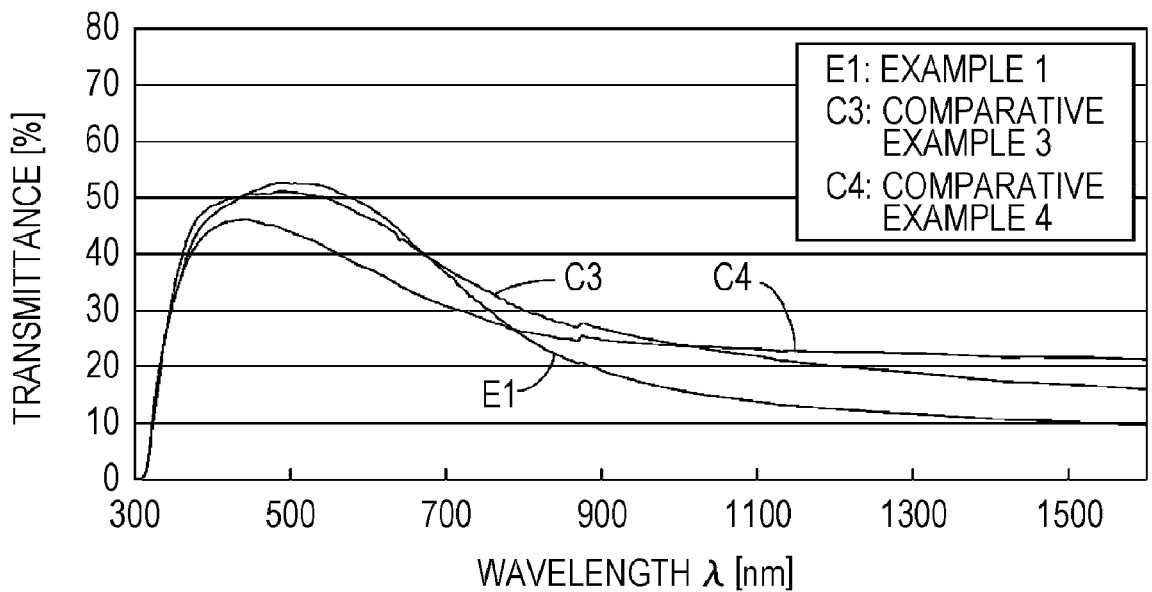
FIG. 28A is a graph showing transmission properties of the optical films of Example 1, Comparative Example 3, and Comparative Example 4.
Figure 28B:
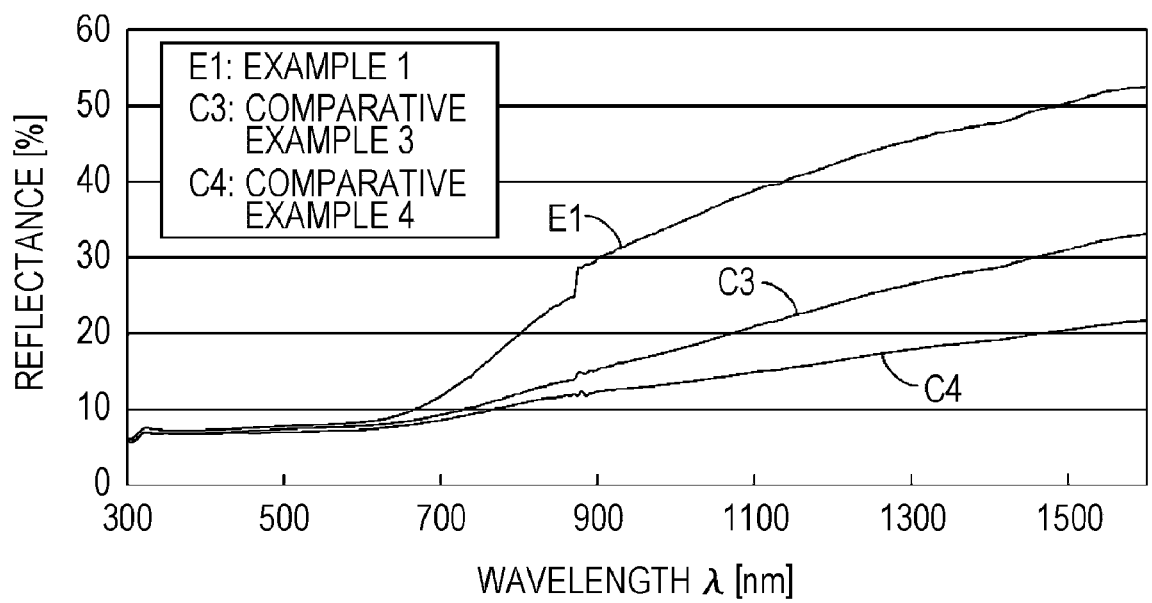
FIG. 28B is a graph showing reflection properties of the optical films of Example 1, Comparative Example 3, and Comparative Example 4.
Figure 29A:
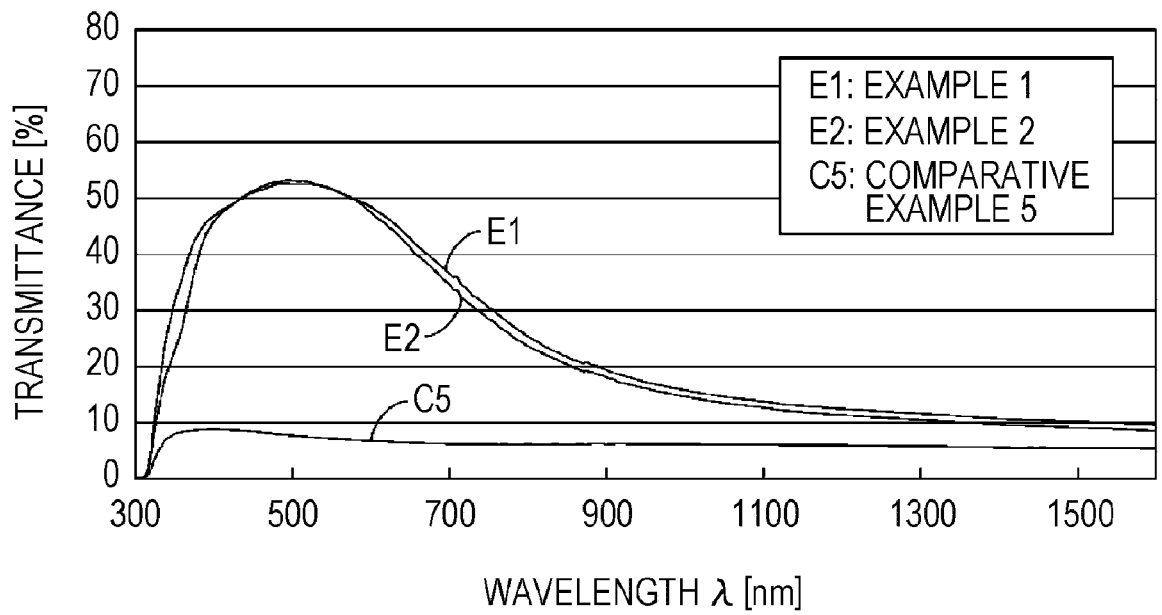
FIG. 29A is a graph showing transmission properties of the optical films of Example 1, Example 2, and Comparative Example 5.
Figure 29B:
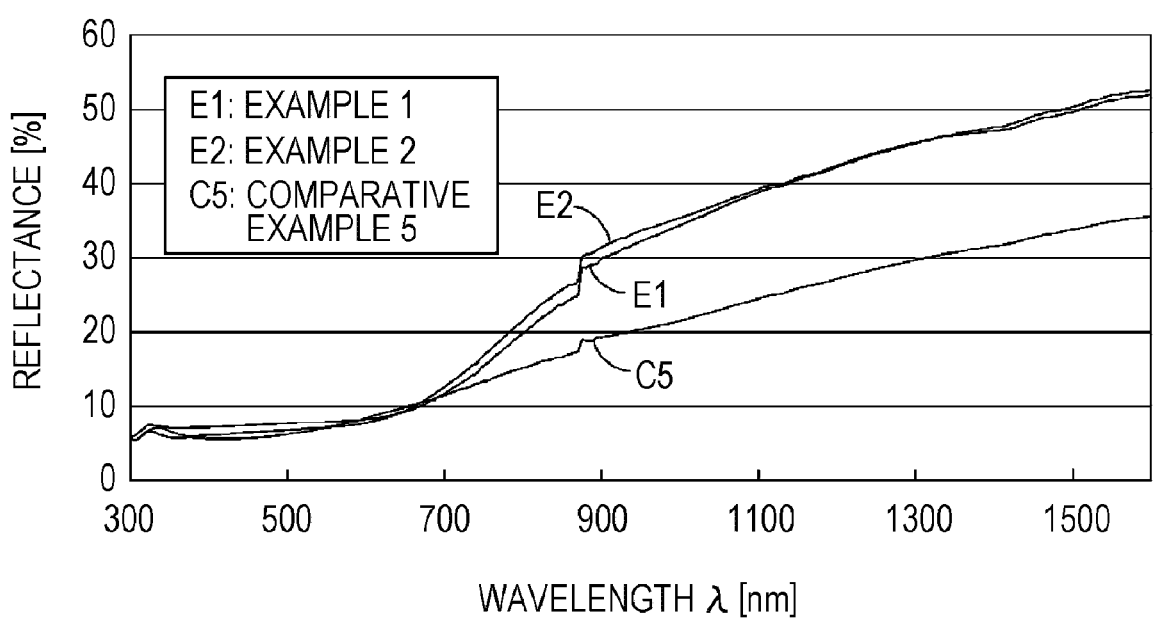
FIG. 29B is a graph showing reflection properties of the optical films of Example 1, Example 2, and Comparative Example 5.

First, the wavelength-selective reflective layer on the concavo-convex shape was observed at a magnification of 500 times using an optical microscope (MX61L, manufactured by Olympus Corp.), and the generation of crack and peeling along a ridgeline (hereinafter referred to as an "inspection standard ridgeline") between adjacent two triangular pyramid shapes was confirmed. When it was difficult to judge the generation using an optical microscope, the wavelength-selective reflective layer on the concavo-convex shape was observed at a magnification of 500 times using an analytical electron microscope (SEM-EDS XL30 FEG+E DAX, manufactured by Philips). Subsequently, in a manner similar to that of the above case using an optical microscope, the generation of ridgeline crack and peeling was again confirmed. Some of these observation results are shown in FIG. 23A (Example 1), FIG. 23B (Comparative Example 1), FIG. 25A (Comparative Example 2), and FIG. 25B (Example 2).

Next, when the length of the inspection standard ridgeline was represented by Ri, and the length of a portion at which the ridgeline crack and peeling was generated along the inspection standard ridgeline was represented by Rc, y obtained by the following formula (2) was regarded as the ratio of the ridgeline crack and peeling, and the generation state of the ridgeline crack and peeling was judged in accordance with the following criteria. The results are shown in Table 1.

$$y(\%)=Rc/Ri\times100 \qquad (2)$$

A: Ridgeline crack and peeling is less than 10 percent of the inspection standard ridgeline.

B: Ridgeline crack and peeling is 10 to less than 30 percent of the inspection standard ridgeline.

C: Ridgeline crack and peeling is 30 percent or more of the inspection standard ridgeline.

(Evaluation of Spectral Properties)

First, the transmittance and the reflectance at a measurement wavelength region of 300 to 2,600 nm were measured using a spectrophotometer (SolidSpec-3700DUV, manufactured by Shimadzu Corporation). The results are shown in FIGS. 26A to 32B. Next, the state of degradation (oxidation) of the metal layer was judged in accordance with the following criteria using the value of a reflectance at a wavelength of 1,200 nm. The results are shown in Table 1. In addition, for the measurement of the reflectance, a light source radiates light from a shaped resin layer side, and measurement was performed using an integrating sphere.

A: Reflectance is 35 percent or more.

B: Reflectance is 30 to less than 35 percent.

C: Reflectance is less than 30 percent.

Figure 33:
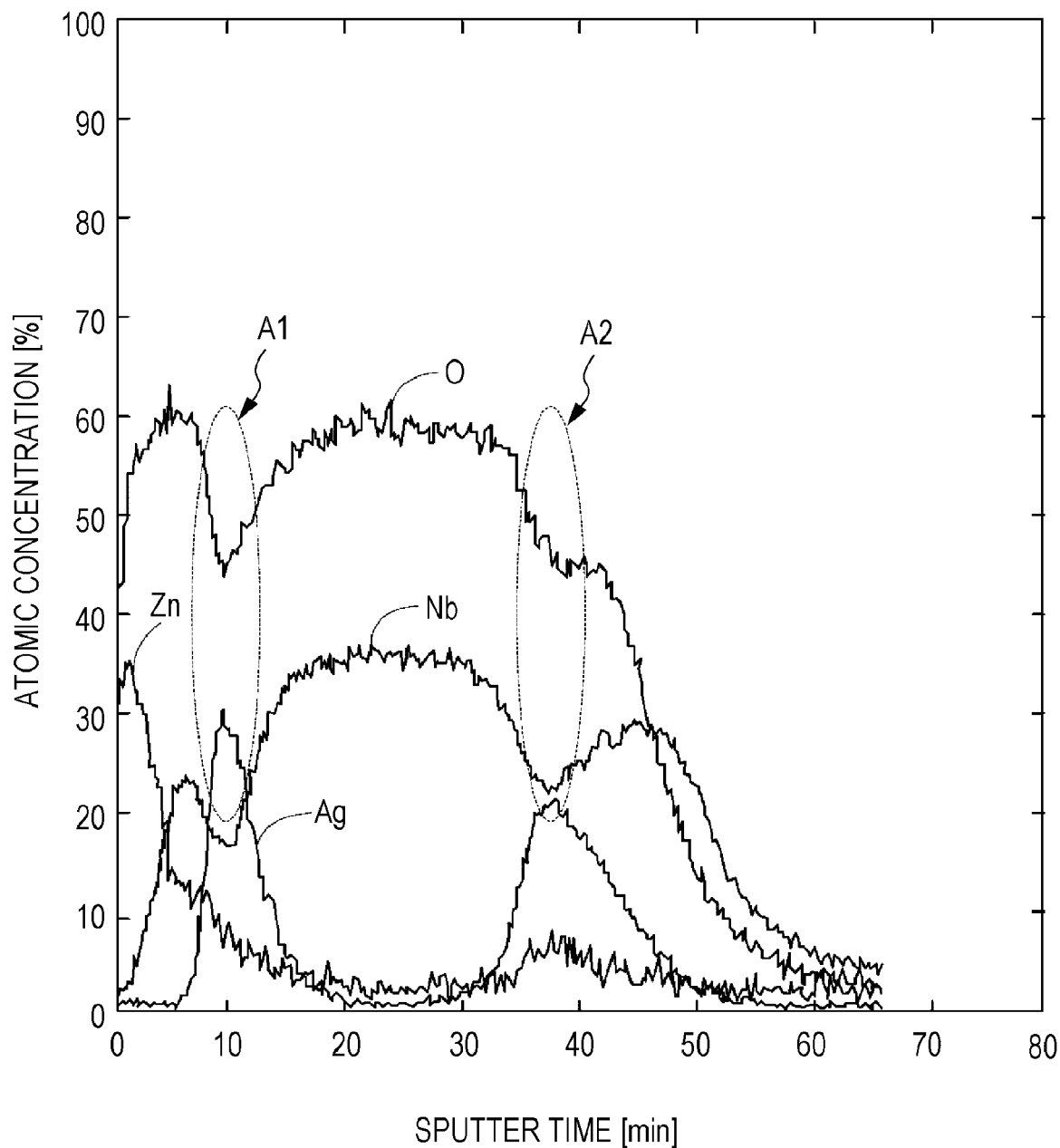
FIG. 33 is a view showing analysis results of the optical film of Example 7 obtained by auger electron spectroscopy.

However, when it was estimated that the decrease in reflectance was not caused by the degradation of the metal layer due to cracks, the degradation state of the metal layer was evaluated using an AES apparatus (Auger Electron Spectroscopy) (FE-AES PHI-7100, manufactured by ULVAC, Inc.). The results are shown in FIG. 33 (Example 7).

TABLE 1

| | FIRST LAYER | | SECOND LAYER | | THIRD LAYER | | FOURTH LAYER | | FIFTH LAYER | |
|---|---|---|---|---|---|---|---|---|---|---|
| | MATERIAL | FILM THICKNESS [nm] | MATERIAL | FILM THICKNESS [nm] | MATERIAL | FILM THICKNESS [nm] | MATERIAL | FILM THICKNESS [nm] | MATERIAL | FILM THICKNESS [nm] |
| EXAMPLE 1 | $Nb_2O_5$ | 21.0 | AgNdCu | 10.0 | GAZO | 4.0 | $Nb_2O_5$ | 42.0 | AgNdCu | 10.0 |
| EXAMPLE 2 | $Nb_2O_5$ | 21.0 | AgNdCu | 10.0 | GAZO | 12.0 | $Nb_2O_5$ | 33.0 | AgNdCu | 10.0 |
| EXAMPLE 3 | $Nb_2O_5$ | 21.0 | AgNdCu | 20.0 | GAZO | 4.0 | $Nb_2O_5$ | 42.0 | AgNdCu | 20.0 |
| EXAMPLE 4 | $Nb_2O_5$ | 21.0 | AgBi | 10.0 | GAZO | 4.0 | $Nb_2O_5$ | 42.0 | AgBi | 10.0 |
| EXAMPLE 5 | $Nb_2O_5$ | 21.0 | AgPdCu | 10.0 | GAZO | 4.0 | $Nb_2O_5$ | 42.0 | AgPdCu | 10.0 |
| EXAMPLE 6 | $Ta_2O_5$ | 22.0 | AgNdCu | 10.0 | GAZO | 4.0 | $Ta_2O_5$ | 44.0 | AgNdCu | 10.0 |
| EXAMPLE 7 | $Nb_2O_5$ | 44.0 | AgNdCu | 10.0 | GAZO | 8.0 | $Nb_2O_5$ | 89.0 | AgNdCu | 10.0 |
| EXAMPLE 8 | $Nb_2O_5$ | 9.8 | AgNdCu | 10.0 | GAZO | 4.0 | $Nb_2O_5$ | 22.0 | AgNdCu | 10.0 |
| COMPARATIVE EXAMPLE 1 | ZnO | 40.0 | AgNdCu | 9.0 | ZnO | 80.0 | AgNdCu | 9.0 | ZnO | 40.0 |
| COMPARATIVE EXAMPLE 2 | $Nb_2O_5$ | 40.0 | AgNdCu | 9.0 | $Nb_2O_5$ | 80.0 | AgNdCu | 9.0 | $Nb_2O_5$ | 40.0 |
| COMPARATIVE EXAMPLE 3 | $Nb_2O_5$ | 21.0 | AgNdCu | 10.0 | GAZO | 2.0 | $Nb_2O_5$ | 42.0 | AgNdCu | 10.0 |
| COMPARATIVE EXAMPLE 4 | $Nb_2O_5$ | 21.0 | AgNdCu | 10.0 | Ta | 2.0 | $Nb_2O_5$ | 42.0 | AgNdCu | 10.0 |
| COMPARATIVE EXAMPLE 5 | $Nb_2O_5$ | 21.0 | AgNdCu | 10.0 | Ta | 10.0 | $Nb_2O_5$ | 42.0 | AgNdCu | 10.0 |

| | SIXTH LAYER | | SEVENTH LAYER | | EIGHTH LAYER | | | SPECTRAL PROPERTIES | | DEGRADATION OF METAL LAYER OF |
|---|---|---|---|---|---|---|---|---|---|---|
| | MATERIAL | FILM THICKNESS [nm] | MATERIAL | FILM THICKNESS [nm] | MATERIAL | FILM THICKNESS [nm] | CRACKS | TRANSMITTANCE OF VISIBLE LIGHT | REFLECTANCE OF INFRARED LIGHT | WAVELENGTH-SELECTIVE REFLECTED LAYER |
| EXAMPLE 1 | GAZO | 4.0 | $Nb_2O_5$ | 21.0 | GAZO | 2.0 | A | 50 | 42 | A |
| EXAMPLE 2 | GAZO | 12.0 | $Nb_2O_5$ | 13.0 | GAZO | 2.0 | A | 50 | 42 | A |
| EXAMPLE 3 | GAZO | 4.0 | $Nb_2O_5$ | 21.0 | GAZO | 2.0 | A | 22 | 77 | A |
| EXAMPLE 4 | GAZO | 4.0 | $Nb_2O_5$ | 21.0 | GAZO | 2.0 | A | 50 | 42 | A |
| EXAMPLE 5 | GAZO | 4.0 | $Nb_2O_5$ | 21.0 | GAZO | 2.0 | A | 50 | 42 | A |
| EXAMPLE 6 | GAZO | 4.0 | $Ta_2O_5$ | 22.0 | GAZO | 2.0 | A | 48 | 43 | A |
| EXAMPLE 7 | GAZO | 8.0 | $Nb_2O_5$ | 44.0 | GAZO | 2.0 | A | 54 | 20 | A |
| EXAMPLE 8 | GAZO | 4.0 | $Nb_2O_5$ | 9.8 | GAZO | 2.0 | A | 42 | 48 | A |
| COMPARATIVE EXAMPLE 1 | — | — | — | — | — | — | C | 55 | 27 | C |
| COMPARATIVE EXAMPLE 2 | — | — | — | — | — | — | B | 71 | 15 | C |
| COMPARATIVE EXAMPLE 3 | GAZO | 2.0 | $Nb_2O_5$ | 21.0 | GAZO | 2.0 | A | 49 | 24 | C |
| COMPARATIVE EXAMPLE 4 | Ta | 2.0 | $Nb_2O_5$ | 21.0 | GAZO | 2.0 | A~B | 40 | 16 | C |
| COMPARATIVE EXAMPLE 5 | Ta | 10.0 | $Nb_2O_5$ | 21.0 | GAZO | 2.0 | A~B | 7 | 27 | A |

REFLECTANCE AT WAVELENGTH OF 1,200 nm

Figure 22:
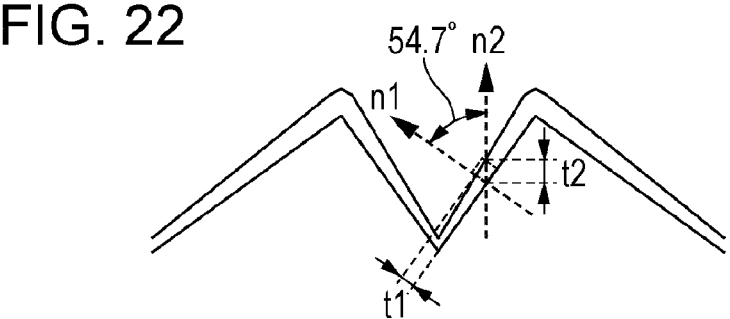
FIG. 22 is a cross-sectional view illustrating the thickness of a wavelength-selective reflective layer.

In Table 1, the average thicknesses of films of the wavelength-selective reflective layer of each of Examples 1 to 8 and Comparative Examples 1 to 5 formed on the concavo-convex surface were measured as described below. That is, after a wavelength-selective reflective layer was formed on a smooth film under the same conditions used for forming the wavelength-selective reflective layer on the shaped resin layer in each of Examples 1 to 8 and Comparative Examples 1 to 5, each sample was cut along the cross-section thereof using a focused ion beam (FIB) technique, and the thickness of each film of the sample was measured using a transmission electron microscope (TEM), so that the average thickness was obtained based on the measured values. In addition, it was confirmed that the average thickness thus measured coincided with an average thickness t2 measured at a middle point of an oblique line of a triangle forming a triangular pyramid of the shaped resin layer in an n2 direction (see FIG. 22). The reason the position on the triangular pyramid at which the measured average thickness coincides with the average thickness t2 is specified is that when the average thickness of the wavelength-selective reflective layer formed on the triangular pyramid of the shaped resin layer is measured, the above average thickness changes depending on the position on the triangle forming the triangular pyramid as shown in FIG. 22. In this case, an n1 direction and the n2 direction indicate the following directions shown in FIG. 22. The n1 direction indicates a direction perpendicular to the inclined surface of a prism shape of the PET film. The n2 direction indicates a direction perpendicular to the primary surface of the PET film (thickness direction of the PET film).

From Table 1, FIGS. 23A and 23B, and FIGS. 24A and 24B, the following can be found.

In Comparative Example 1, the high refractive index layer is formed of a ZnO-based material, and many cracks are generated along the ridgeline and in the inclined surface of the triangular pyramid. By this influence, the degradation of the metal layer is promoted, and the reflex function was degraded. On the other hand, when $Nb_2O_5$ or the like is used for the high refractive index layer, cracks were not frequently generated. Accordingly, a material such as $Nb_2O_5$ is preferably used for the high refractive index layer instead of only using a ZnO-based material.

From Table 1, FIGS. 25A and 25B, FIGS. 26A and 26B, and FIGS. 27A and 27B, the following can be found.

In Comparative Example 2, since no protective layer is provided, the metal layer is degraded when the high refractive index layer is formed by reactive sputtering. By this influence, the spectral properties are degraded.

In addition, in Comparative Example 3, since the protective layer is formed to have a small thickness, the metal layer is degraded when the high refractive index layer is formed by reactive sputtering. By this influence, the spectral properties are degraded. Although the protective layer is formed to have a large thickness in Example 2, there is no difference in spectral properties from the basic structural product of Example 1. No cracks are generated in this structure as that in Example 1. From this result, it is found that the protective layer is indispensable, and the thickness thereof on the concavo-convex shape is preferably in a range of 3 to 30 nm. Since the thickness of the protective layer at the vertex of the convex portion is approximately twice the thickness at the base, in order to obtain sufficient barrier properties even at the base, the protective layer preferably has a thickness of 3 nm or more.

From Table 1, FIGS. 28A and 28B, and FIGS. 29A and 29B, the following can be found.

In Comparative Example 4, Ta is used for the protective layer, and the thickness thereof is decreased to 2 nm. As a result, barrier properties on the concavo-convex shape are insufficient, and the metal layer is degraded when the high refractive index layer is formed by reactive sputtering. By this influence, the spectral properties are degraded. In Comparative Example 5, Ta is used for the protective layer as in Comparative Example 4, and the thickness thereof is increased to 10 nm. As a result, due to the influence of oxygen deficiency irregularity caused by a large Ta thickness, the spectral properties are considerably degraded by the absorption. In the structures described above, cracks are partially generated at a low level. As a result, in the metal layer on the concavo-convex shape, instead of using a metal, such as Ta, for the protective layer, a ZnO-based metal oxide, such as ZnO, GAZO, AZO, or GZO, having a thickness in a range of 3 to 30 nm is preferably used for the protective film.

Figure 30A:
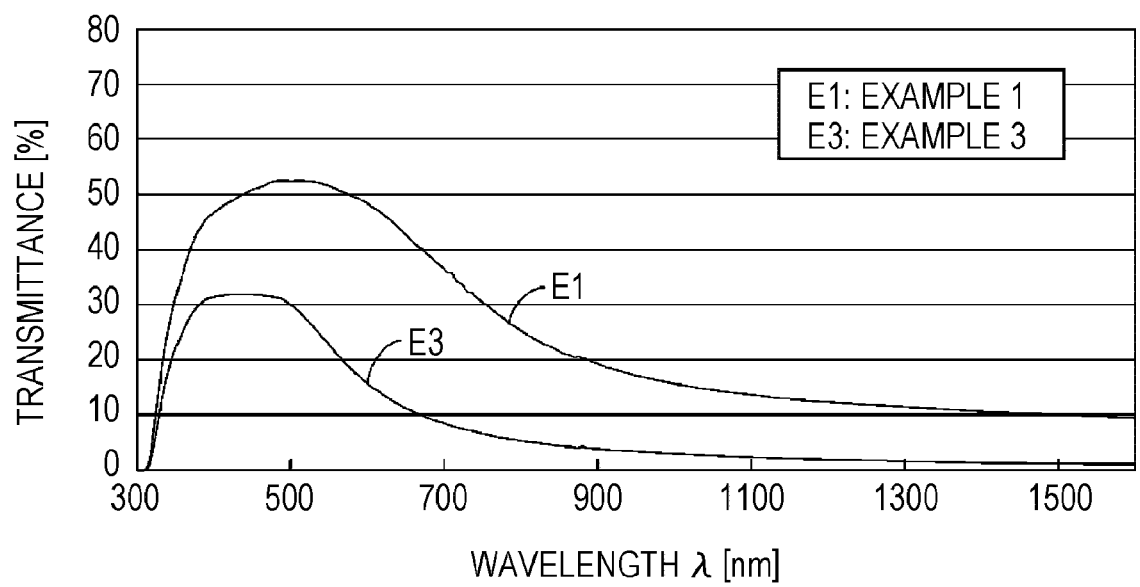
FIG. 30A is a graph showing transmission properties of the optical films of Example 1 and Example 3.
Figure 30B:
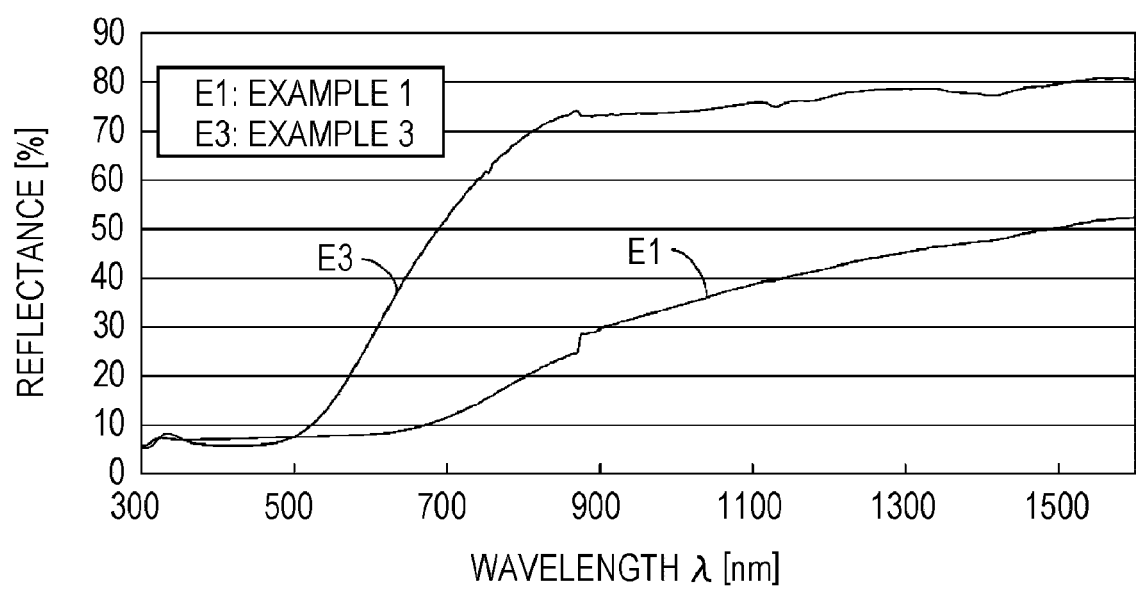
FIG. 30B is a graph showing reflection properties of the optical films of Example 1 and Example 3.

From Table 1 and FIGS. 30A and 30B, the following can be found.

In Example 3, since the thickness of AgNdCu used as the metal layer is increased, although the transmittance is decreased, the generation of cracks and the degradation of the metal layer do not occur, and the reflectance is satisfactory. Accordingly, the thickness of the metal layer is preferably set in a range of 6 to 30 nm.

From Table 1, the following can be found.

From Examples 4 and 5, since the properties between AgNdCu, AgPdCu, and AgBi, which are used for the metal layer, are not different from each other, these Ag alloys may be used.

Figure 31A:
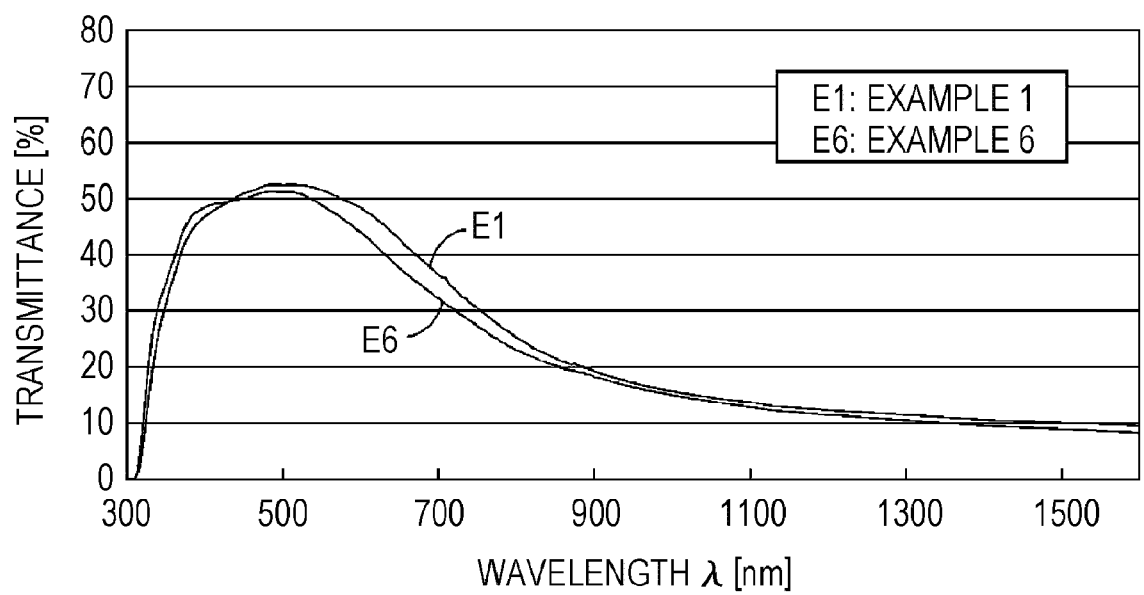
FIG. 31A is a graph showing transmission properties of the optical films of Example 1 and Example 6.
Figure 31B:
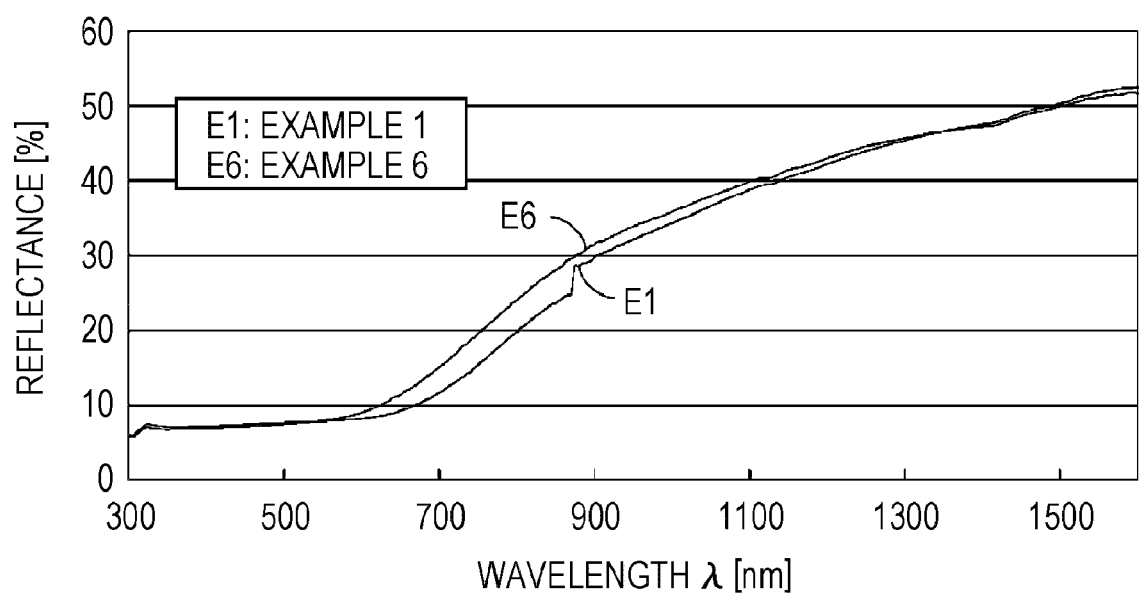
FIG. 31B is a graph showing reflection properties of the optical films of Example 1 and Example 6.

From Table 1 and FIGS. 31A and 31B, the following can be found.

From Example 6, the spectral properties are not different between niobium pentoxide and tantalum pentoxide, which are used for the high refractive index layer, and the generation of cracks is not observed. Accordingly, a material, such as titanium oxide, having properties similar to those of niobium pentoxide and tantalum pentoxide may also be used.

Figure 32A:
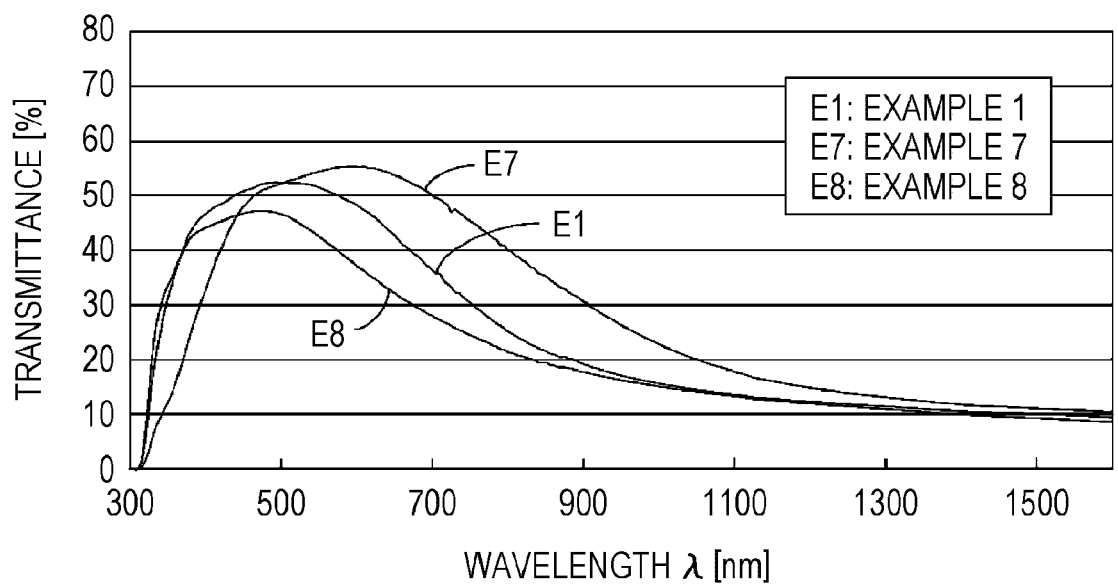
FIG. 32A is a graph showing transmission properties of the optical films of Example 1, Example 7, and Example 8.
Figure 32B:
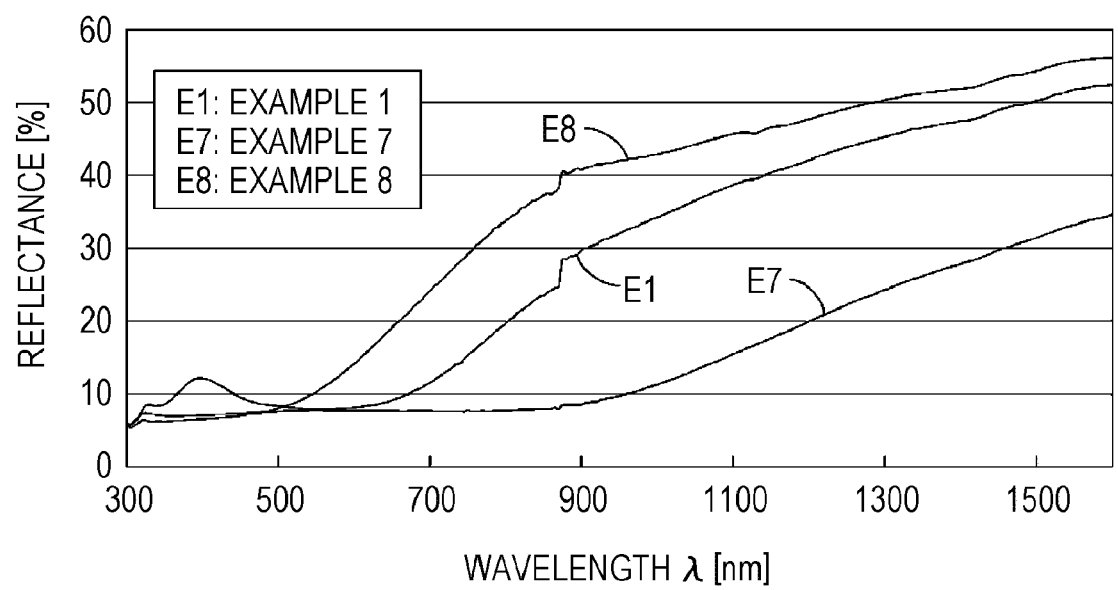
FIG. 32B is a graph showing reflection properties of the optical films of Example 1, Example 7, and Example 8.

From Table 1, FIGS. 32A and 32B, and FIG. 33, the following can be found.

In Example 7, the thickness of the high refractive index layer and that of the protective layer are increased. Since these thicknesses are increased, the peak wavelength of the transmittance and the rise-up wavelength of the reflectance are shifted to a longer wavelength side, and the value of a reflectance at 1,200 nm which is used for the degradation judgment of the metal layer is decreased. Since this phenomenon can be easily estimated also by a simulation, and no cracks are generated, it is estimated that the decrease of the value of a reflectance at 1,200 nm is not dependent on the degradation of the metal layer caused by the generation of cracks. The degradation of the metal layer was confirmed using an AES apparatus (FE-AES PHI-7100, manufactured by ULVAC, Inc.). FIG. 33 is a graph showing analytical results of Example 7 by auger electron spectroscopy (the data of C which appears is omitted for the convenience of measurement). As shown in FIG. 33, a decrease in intensity of Ag and an increase in oxygen, which are observed when the metal layer is degraded, are both not observed. That is, it was confirmed that the same result as that in Example 1 was obtained and that the decrease of the value of a reflectance at 1,200 nm was not caused by the degradation of the metal layer. In addition, in Example 8, the thickness of the high refractive index layer and that of the protective layer are decreased. Although the transmittance is slightly decreased, the generation of cracks and the degradation of the metal layer are not observed, and the reflectance is satisfactory. Accordingly, a high refractive index layer having a thickness of 10 to 120 nm and a protective layer having a thickness of 3 to 30 nm can be used in combination.

Heretofore, although the embodiments of the present invention have been particularly described, the present invention is not limited to the above embodiments, and various modifications may be made without departing from the technical scope of the present invention.

For example, the structures, methods, shapes, materials, numerical values, and the like described in the above embodiments are only used by way of example, and if necessary, for example, different structures, methods, shapes, materials, and numerical values from those described above may also be used.

In addition, the structures of the above embodiments may be used in combination without departing from the spirit of the present invention.

In addition, in the above embodiments, although the case in which the present invention is applied to an optical film having directional reflection properties has been described by way of example, the present invention is not limited to this example, and as long as an optical film has a concavo-convex interface, the present invention may also be applied thereto. As the optical film described above, for example, there may be mentioned a window film, a display film, a projector screen, an optical filter, or a solar battery.

In addition, in the above embodiments, although the numerical value range of the pitch of the concavo-convex interface has been described using an optical film having directional reflection properties by way of example, the numerical value range of the pitch of the concavo-convex interface is not limited to that of this example. For example, the present invention is applicable also to a concavo-convex shape having a pitch in a range of approximately several micrometers transferred by a so-called nanoimprint to approximately several tens of micrometers.

In addition, in the above embodiments, although the optical element in the form of a film has been described by way of example, besides the above optical element, the present invention may also be applied to other optical elements having a plate shape and the like.

Furthermore, in the above embodiments, although the case in which the optical element (directional reflection element) according to each embodiment of the present invention is applied to a window material or the like has been described by way of example, the optical element according to each embodiment of the present invention is applicable to all applications for buildings, vehicles, and the like as an exterior member and an interior member.

For example, the present invention may be applied to a blind, a roll curtain, or the like. As the blind or the roll curtain to which an optical element is applied, for example, there may be mentioned a blind or a roll curtain formed of the optical element itself, or a blind or a roll curtain which is formed of a transparent base material to which the optical element is adhered. When the blind or the roll curtain as described above is installed indoors, in the vicinity of a window, for example, only infrared light can be directionally reflected outdoors, and visible light can be introduced indoors. Therefore, also when the blind or the roll curtain is installed, the degree of necessity for indoor illumination is reduced. In addition, since no scatter reflection occurs by the blind or the roll curtain, an increase in ambient temperature can also be suppressed. Furthermore, when the degree of necessity for heat ray reflection is low, for example, in winter, the blind or the roll curtain may be lifted up; hence, it is advantageous that a heat ray reflex function may be easily used in accordance with the conditions. On the other hand, since a related blind and a roll curtain for shielding infrared light is applied with an infrared reflective paint or the like and has an appearance of white, gray, cream, or the like, when it is intended to shield infrared light, visible light is simultaneously shielded, and hence interior illumination may be necessary.

In addition, the optical element according an embodiment of the present invention may also be applied to a paper shielding door, such as a Japanese shoji. Furthermore, the optical element according to an embodiment of the present invention may be adhered to a wall.

Although not shown in the figure, a glass laminate may also be formed in which the optical element is provided between two pieces of glass facing each other. In this case, an optical layer is provided between each piece of glass and the optical element, and by performing thermocompression bonding or the like, the optical layer may function as an adhesive layer, so that the above glass laminate can be formed. As the optical layer described above, for example, a polyvinyl butyral (PVB) may be used. This optical layer also preferably has a scattering preventing function in consideration of the case in which the glass laminate is broken. When this glass laminate is used as a vehicle window, heat rays can be reflected by the optical element; hence, a rapid increase in temperature in a vehicle can be prevented. This glass laminate may be widely used, for example, for all the transportation measures, such as vehicles, electrical trains, airplanes, and boats and ships, and vehicles and the like in theme parks, and the two pieces of glass may be curved in accordance with the application thereof. In this case, the optical element preferably has flexibility to follow the curve of glass, and even when being curved, the optical element preferably has directional reflection properties and transmission properties to a certain extent. Since the glass laminate has to be transparent to a certain extent as a whole, the refractive index of a material (such as a resin) used for the optical layer and that of a resin contained in the optical element are preferably equal to or similar to each other. In addition, instead of using the optical layer, a resin contained in the optical element may also be used as an adhesive layer. In this case, for example, in a thermocompression bonding step performed for adhesion, a resin is preferably used which can maintain its shape as much as possible. The two base members facing each other are not limited to glass, and for example, at least one of the base members may be a resin film, a sheet, or a plate. For example, an engineering plastic or a reinforced plastic, each of which is lightweight and has flexibility, may also be used. In addition, the use of the glass laminate is not limited to a vehicle application.

In addition, in the above embodiments, although the structure in which the second optical layer is formed so as to fill a concavo-convex surface and in which the wavelength selection layer is covered with the second optical layer has been described, the structure in which the second optical layer is omitted, and the wavelength-selective reflective layer is exposed may also be formed.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The applition is claimed as follows:

1. An optical element comprising:
   a first optical layer having a concavo-convex surface;
   a wavelength-selective reflective layer provided on the concavo-convex surface of the first optical layer; and
   a second optical layer provided on the concavo-convex surface on which the wavelength-selective reflective layer is provided so as to fill the concavo-convex surface,
   wherein the wavelength-selective reflective layer includes
   a metal layer,
   a protective layer provided on the metal layer and containing a metal oxide as a primary component, and
   a high refractive index layer provided on the protective layer and containing a metal oxide other than zinc oxide as a primary component, and
   the wavelength-selective reflective layer selectively directionally reflects light in a specific wavelength band while transmitting light other than that in the specific wavelength band.

2. The optical element according to claim 1, wherein, of light incident on an incident surface at an incident angle $(\theta, \phi)$ (where, $\theta$ is an angle formed between a normal to the incident surface and incident light incident on the incident surface or reflected light emitted from the incident surface, and $\phi$ is an angle formed between a specific straight line within the incident surface and a component of the incident light or the reflected light projected on the incident surface), the optical element selectively directionally reflects light in a specific wavelength band in a direction other than a specular reflection direction $(-\theta, \phi+180°)$ while transmitting light other than that in the specific wavelength band and having transparency to the light other than that in the specific wavelength band.

3. The optical element according to claim 1, wherein the high refractive index layer contains at least one selected from the group consisting of niobium oxide, tantalum oxide, and titanium oxide.

4. The optical element according to claim 1, wherein the protective layer contains as a primary component a metal oxide at least containing zinc oxide.

5. The optical element according to claim 4, wherein the protective layer contains at least one metal oxide selected from the group consisting of zinc oxide (ZnO), Ga and Al-doped zinc oxide (GAZO), Al-doped zinc oxide (AZO), and Ga-doped zinc oxide (GZO).

6. The optical element according to claim 1, wherein the metal layer contains at least one selected from the group consisting of Au, Ag, Cu, Al, Ni, Cr, Ti, Pd, Co, Si, Ta, W, Mo, and Ge.

7. The optical element according to claim 1, wherein the protective layer has a thickness in a range of 3 to 30 nm.

8. The optical element according to claim 1, wherein the high refractive index layer has a thickness in a range of 10 to 120 nm.

9. The optical element according to claim 1, wherein the metal layer has a thickness in a range of 6 to 30 nm.

10. The optical element according to claim 1, wherein the concavo-convex surface of the first optical layer is formed of one-dimensionally or two-dimensionally arranged structures.

11. The optical element according to claim 10, wherein the structures each have a prism shape, a lenticular shape, a hemispherical shape, or a corner cube shape.

12. The optical element according to claim 1, wherein the wavelength-selective reflective layer includes at least two repeating units laminated to each other, the repeating units each containing the metal layer, the protective layer, and the high refractive index layer.

13. The optical element according to claim 1, further comprising another high refractive index layer between the concavo-convex surface of the first optical layer and the metal layer of the wavelength-selective reflective layer.

14. The optical element according to claim 13, wherein the another high refractive index layer contains at least one selected from the group consisting of niobium oxide, tantalum oxide, and titanium oxide.

15. A method for manufacturing an optical element comprising:
   forming a wavelength-selective reflective layer on a concavo-convex surface of a first optical layer; and
   forming a second optical layer on the concavo-convex surface on which the wavelength-selective reflective layer is formed so as to fill the concavo-convex surface,
   wherein the step of forming a wavelength-selective reflective layer includes the substeps of:
      forming a metal layer;
      forming a protective layer containing a metal oxide as a primary component on the metal layer; and
      forming a high refractive index layer containing a metal oxide other than zinc oxide as a primary component on the protective layer, and
   the wavelength-selective reflective layer selectively directionally reflects light in a specific wavelength band while transmitting light other than that in the specific wavelength band.

16. The method for manufacturing an optical element according to claim 15, wherein in the substep of forming a protective layer, the protective layer is formed by a sputtering method using a target containing the metal oxide as a primary component.

17. The method for manufacturing an optical element according to claim 15, wherein in the substep of forming a protective layer, the protective layer is formed by a sputtering method using only an inert gas as a process gas.

18. The method for manufacturing an optical element according to claim 15, wherein the high refractive index layer contains at least one selected from the group consisting of niobium oxide, tantalum oxide, and titanium oxide.

* * * * *